(12) United States Patent
Manolakos et al.

(10) Patent No.: US 12,464,498 B2
(45) Date of Patent: Nov. 4, 2025

(54) PATTERNS FOR REFERENCE SIGNALS USED FOR POSITIONING IN A WIRELESS COMMUNICATIONS SYSTEM

(71) Applicant: QUALCOMM Incorporated, San Diego, CA (US)

(72) Inventors: Alexandros Manolakos, Escondido, CA (US); Sony Akkarakaran, Poway, CA (US); Joseph Binamira Soriaga, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 17/099,572

(22) Filed: Nov. 16, 2020

(65) Prior Publication Data

US 2021/0070451 A1    Mar. 11, 2021

Related U.S. Application Data

(63) Continuation of application No. 16/804,846, filed on Feb. 28, 2020, now Pat. No. 11,239,967.

(30) Foreign Application Priority Data

May 2, 2019   (GR) .............................. 20190100190

(51) Int. Cl.
*H04W 72/04* (2023.01)
*H04L 5/00* (2006.01)
*H04W 4/029* (2018.01)

(52) U.S. Cl.
CPC ........... *H04W 72/04* (2013.01); *H04L 5/0005* (2013.01); *H04L 5/0048* (2013.01); *H04L 5/0094* (2013.01); *H04W 4/029* (2018.02)

(58) Field of Classification Search
CPC ..... H04W 72/04; H04W 4/029; H04W 4/025; H04W 64/00; H04L 5/0005; H04L 5/0048; H04L 5/0094
See application file for complete search history.

(56) References Cited

U.S. PATENT DOCUMENTS 7,542,504 B2   6/2009   Chang et al.
8,000,273 B2   8/2011   He et al.
(Continued)

FOREIGN PATENT DOCUMENTS

CN   102124716 A   7/2011
CN   102422663 A   4/2012
(Continued)

OTHER PUBLICATIONS

Keating R., et al., "Overview of Positioning in 5G New Radio", 2019 16th International Symposium on Wireless Communication Systems (ISWCS), IEEE, Aug. 27, 2019 (Aug. 27, 2019), pp. 320-324. XP033636268, DOI: 10.1109/ISWCS.2019.8877160 [retrieved on Oct. 18, 2019] p. 323-p. 324.
(Continued)

*Primary Examiner* — Charles C Jiang
*Assistant Examiner* — Shawn D Miller
(74) *Attorney, Agent, or Firm* — Holland & Hart LLP

(57) ABSTRACT

Methods, systems, and devices for wireless communication are described. Generally, the described techniques provide for determining a suitable pattern for transmitting reference signals used for positioning on allocated resources. In particular, the pattern may be used to assign the reference signals to frequency tones across multiple symbols such that the frequency tones to which the reference signals are mapped in at least two consecutive symbols are non-adjacent (e.g., separated by at least one frequency tone). In some cases, a wireless device may determine the pattern used to
(Continued)

assign reference signals used for positioning autonomously (e.g., based on configured algorithms or a look-up table), and, in other cases, a wireless device (e.g., a user equipment (UE)) may determine the pattern used to assign reference signals used for positioning based on a configuration received from another wireless device (e.g., a base station).

30 Claims, 17 Drawing Sheets

(56) References Cited

U.S. PATENT DOCUMENTS

| | | | |
|---|---|---|---|
| 8,254,329 | B2 | 8/2012 | Ko et al. |
| 8,254,344 | B2 | 8/2012 | Akita et al. |
| 8,428,157 | B2 | 4/2013 | Kakura et al. |
| 8,654,727 | B2 | 2/2014 | Dai et al. |
| 8,675,752 | B2 | 3/2014 | Lahtonen et al. |
| 8,718,001 | B2 | 5/2014 | Zhang et al. |
| 8,750,870 | B2 | 6/2014 | Palanki et al. |
| 8,855,068 | B2 | 10/2014 | Qin et al. |
| 9,036,538 | B2 | 5/2015 | Palanki |
| 9,077,785 | B2 | 7/2015 | Shuman et al. |
| 9,326,283 | B2 | 4/2016 | Shin et al. |
| 9,369,250 | B2 | 6/2016 | Liu |
| 9,651,653 | B2 | 5/2017 | Fischer et al. |
| 9,755,712 | B1 | 9/2017 | Bultan et al. |
| 9,763,251 | B2 | 9/2017 | Papasakellariou et al. |
| 9,794,039 | B2 | 10/2017 | Kwak et al. |
| 9,814,015 | B2 | 11/2017 | Xiao et al. |
| 9,913,239 | B2 | 3/2018 | Tinnakornsrisuphap et al. |
| 10,021,667 | B2 | 7/2018 | Akkarakaran et al. |
| 10,171,210 | B2 | 1/2019 | Gong et al. |
| 10,333,670 | B2 | 6/2019 | Rico Alvarino et al. |
| 10,716,084 | B2 | 7/2020 | Wang et al. |
| 10,736,074 | B2 | 8/2020 | Edge et al. |
| 11,350,437 | B2 | 5/2022 | Xiong et al. |
| 11,777,764 | B2 | 10/2023 | Sun et al. |
| 2003/0215035 | A1 | 11/2003 | Amerga et al. |
| 2005/0271012 | A1 | 12/2005 | Agrawal et al. |
| 2006/0128416 | A1 | 6/2006 | Linebarger et al. |
| 2007/0002813 | A1 | 1/2007 | Tenny et al. |
| 2010/0130230 | A1 | 5/2010 | Aggarwal et al. |
| 2011/0003551 | A1 | 1/2011 | Kameno et al. |
| 2012/0021758 | A1 | 1/2012 | Gum et al. |
| 2012/0231809 | A1 | 9/2012 | Siomina et al. |
| 2012/0252487 | A1 | 10/2012 | Siomina et al. |
| 2012/0287882 | A1 | 11/2012 | Kim et al. |
| 2013/0029669 | A1 | 1/2013 | Boudreau et al. |
| 2013/0165052 | A1 | 6/2013 | Chuang |
| 2013/0265962 | A1 | 10/2013 | Ouchi et al. |
| 2013/0324154 | A1 | 12/2013 | Raghupathy et al. |
| 2014/0073356 | A1 | 3/2014 | Siomina et al. |
| 2014/0349582 | A1 | 11/2014 | Xiao et al. |
| 2015/0018010 | A1 | 1/2015 | Fischer |
| 2015/0063228 | A1 | 3/2015 | Aldana |
| 2015/0118678 | A1 | 4/2015 | Mandecki et al. |
| 2015/0124673 | A1 | 5/2015 | Ouchi et al. |
| 2015/0133173 | A1 | 5/2015 | Edge et al. |
| 2015/0188678 | A1 | 7/2015 | Wu et al. |
| 2015/0263837 | A1 | 9/2015 | Patel et al. |
| 2015/0289311 | A1 | 10/2015 | Chang et al. |
| 2015/0382205 | A1 | 12/2015 | Lee et al. |
| 2016/0065342 | A1 | 3/2016 | Mirbagheri et al. |
| 2016/0094326 | A1 | 3/2016 | Moon et al. |
| 2016/0095105 | A1 | 3/2016 | Chen et al. |
| 2016/0165458 | A1 | 6/2016 | Peng et al. |
| 2016/0192385 | A1 | 6/2016 | Tooher et al. |
| 2016/0226647 | A1 | 8/2016 | Wang et al. |
| 2017/0026794 | A1 | 1/2017 | Baker et al. |
| 2017/0104517 | A1 | 4/2017 | Kakishima et al. |
| 2017/0111880 | A1 | 4/2017 | Park et al. |
| 2017/0164315 | A1 | 6/2017 | Smith |
| 2017/0180194 | A1 | 6/2017 | Noh et al. |
| 2017/0201960 | A1 | 7/2017 | Park et al. |
| 2017/0238298 | A1 | 8/2017 | Wang et al. |
| 2017/0251497 | A1 | 8/2017 | Larsson et al. |
| 2017/0288830 | A1 | 10/2017 | Fischer |
| 2017/0324455 | A1 | 11/2017 | Soriaga et al. |
| 2018/0006787 | A1* | 1/2018 | Chen ................ H04W 72/20 |
| 2018/0020423 | A1 | 1/2018 | Wang et al. |
| 2018/0049151 | A1 | 2/2018 | Yoon et al. |
| 2018/0097596 | A1 | 4/2018 | Palanivelu et al. |
| 2018/0098314 | A1 | 4/2018 | Rico Alvarino et al. |
| 2018/0124787 | A1 | 5/2018 | Wang et al. |
| 2018/0192404 | A1 | 7/2018 | Maaref et al. |
| 2018/0198509 | A1 | 7/2018 | Nilsson et al. |
| 2018/0217228 | A1 | 8/2018 | Edge et al. |
| 2018/0287682 | A1 | 10/2018 | Kwak et al. |
| 2018/0295590 | A1 | 10/2018 | Abedini et al. |
| 2018/0324771 | A1 | 11/2018 | Hosseini et al. |
| 2018/0375710 | A1 | 12/2018 | Chae |
| 2019/0007152 | A1 | 1/2019 | Yi et al. |
| 2019/0013909 | A1 | 1/2019 | Li et al. |
| 2019/0020454 | A1 | 1/2019 | Kim et al. |
| 2019/0037529 | A1 | 1/2019 | Edge et al. |
| 2019/0052443 | A1 | 2/2019 | Cheng et al. |
| 2019/0053287 | A1 | 2/2019 | Lin et al. |
| 2019/0068315 | A1 | 2/2019 | Ryden et al. |
| 2019/0068346 | A1 | 2/2019 | Akkarakaran et al. |
| 2019/0081660 | A1 | 3/2019 | Han et al. |
| 2019/0159182 | A1 | 5/2019 | Ranta-Aho et al. |
| 2019/0165913 | A1 | 5/2019 | He et al. |
| 2019/0166514 | A1 | 5/2019 | Liu |
| 2019/0174440 | A1 | 6/2019 | Kwak et al. |
| 2019/0174454 | A1 | 6/2019 | Priyanto et al. |
| 2019/0178976 | A1 | 6/2019 | Xiong et al. |
| 2019/0182899 | A1 | 6/2019 | Ye et al. |
| 2019/0190669 | A1 | 6/2019 | Park et al. |
| 2019/0273587 | A1 | 9/2019 | Takeda et al. |
| 2019/0285722 | A1 | 9/2019 | Markhovsky et al. |
| 2019/0349898 | A1 | 11/2019 | Fu et al. |
| 2020/0036556 | A1 | 1/2020 | Wei et al. |
| 2020/0052845 | A1 | 2/2020 | Chuang et al. |
| 2020/0091608 | A1 | 3/2020 | Alpman et al. |
| 2020/0178202 | A1 | 6/2020 | Edge et al. |
| 2020/0213161 | A1 | 7/2020 | Zhang et al. |
| 2020/0220676 | A1 | 7/2020 | Xu et al. |
| 2020/0235877 | A1 | 7/2020 | Manolakos et al. |
| 2020/0267718 | A1 | 8/2020 | Park et al. |
| 2020/0275416 | A1 | 8/2020 | Haghighat et al. |
| 2020/0288482 | A1 | 9/2020 | Yi et al. |
| 2020/0296716 | A1 | 9/2020 | Lin et al. |
| 2020/0313732 | A1 | 10/2020 | Yang et al. |
| 2020/0313932 | A1 | 10/2020 | Sun et al. |
| 2020/0336264 | A1 | 10/2020 | Faxer et al. |
| 2020/0351045 | A1 | 11/2020 | Manolakos |
| 2020/0351818 | A1 | 11/2020 | Park et al. |
| 2021/0006372 | A1 | 1/2021 | Cha et al. |
| 2021/0021447 | A1 | 1/2021 | Sun |
| 2021/0036825 | A1 | 2/2021 | Choi et al. |
| 2021/0083827 | A1 | 3/2021 | Bao et al. |
| 2021/0105812 | A1 | 4/2021 | Rastegardoost et al. |
| 2021/0120522 | A1 | 4/2021 | Kim et al. |
| 2021/0144743 | A1 | 5/2021 | Rastegardoost et al. |
| 2021/0167924 | A1 | 6/2021 | Bao |
| 2021/0176687 | A1 | 6/2021 | Ko et al. |
| 2021/0195620 | A1 | 6/2021 | Yoshimura et al. |
| 2021/0211957 | A1 | 7/2021 | Kamohara et al. |
| 2021/0227509 | A1 | 7/2021 | Zhang |
| 2021/0311158 | A1 | 10/2021 | Akkarakaran et al. |
| 2021/0351887 | A1 | 11/2021 | Qi |
| 2022/0095304 | A1 | 3/2022 | Muruganathan et al. |
| 2022/0132620 | A1 | 4/2022 | Yoshimura et al. |
| 2022/0377701 | A1 | 11/2022 | Edge et al. |
| 2023/0080106 | A1 | 3/2023 | Ji et al. |
| 2024/0023059 | A1 | 1/2024 | Edge et al. |
| 2024/0113828 | A1 | 4/2024 | Manolakos et al. |
| 2024/0356700 | A1 | 10/2024 | Manolakos et al. |

FOREIGN PATENT DOCUMENTS

| | | |
|---|---|---|
| CN | 102461292 A | 5/2012 |
| CN | 103004267 A | 3/2013 |

(56) References Cited

FOREIGN PATENT DOCUMENTS

| | | | |
|---|---|---|---|
| CN | 103703814 A | 4/2014 | |
| CN | 103944685 A | 7/2014 | |
| CN | 104488345 A | 4/2015 | |
| CN | 104885554 A | 9/2015 | |
| CN | 105164930 A | 12/2015 | |
| CN | 106105073 A | 11/2016 | |
| CN | 106341882 A | 1/2017 | |
| CN | 107733549 A | 2/2018 | |
| CN | 107733563 A | 2/2018 | |
| EP | 2418887 A2 | 2/2012 | |
| EP | 2663144 A2 | 11/2013 | |
| EP | 3041301 A1 | 7/2016 | |
| EP | 3306337 A1 | 4/2018 | |
| EP | 3490319 A1 | 5/2019 | |
| JP | H07111675 A | 4/1995 | |
| JP | 2012523738 A | 10/2012 | |
| JP | 2012525724 A | 10/2012 | |
| JP | 2014216951 A | 11/2014 | |
| JP | 2016508217 A | 3/2016 | |
| JP | 2017098960 A | 6/2017 | |
| JP | 2020533860 A | 11/2020 | |
| KR | 20170030773 A | 3/2017 | |
| TW | 201828624 A | 8/2018 | |
| WO | WO2007022715 A1 | 3/2007 | |
| WO | WO-2009096319 A1 | 8/2009 | |
| WO | WO-2010059940 A1 | 5/2010 | |
| WO | WO2011085267 | 7/2011 | |
| WO | WO-2011139201 A1 | 11/2011 | |
| WO | WO-2013112972 A1 | 8/2013 | |
| WO | WO2013134724 | 9/2013 | |
| WO | WO-2014105324 A1 | 7/2014 | |
| WO | WO-2014123992 | 8/2014 | |
| WO | WO2014131349 A1 | 9/2014 | |
| WO | WO2015027118 A1 | 2/2015 | |
| WO | 2016036840 A1 | 3/2016 | |
| WO | WO-2016065368 A1 | 4/2016 | |
| WO | WO-2016122757 A1 | 8/2016 | |
| WO | WO2016155810 A1 | 10/2016 | |
| WO | WO2016164085 A1 | 10/2016 | |
| WO | WO-2017040075 A1 | 3/2017 | |
| WO | WO2017048064 A1 | 3/2017 | |
| WO | WO-2017126907 A1 | 7/2017 | |
| WO | WO-2017200708 A1 | 11/2017 | |
| WO | WO-2018013672 A1 | 1/2018 | |
| WO | WO-2018085145 A1 | 5/2018 | |
| WO | WO2018126356 A1 | 7/2018 | |
| WO | WO-2018127137 A1 | 7/2018 | |
| WO | WO-2018128401 A1 | 7/2018 | |
| WO | WO2019000180 A1 | 1/2019 | |
| WO | WO-2019047776 A1 | 3/2019 | |
| WO | WO2019212246 A1 | 11/2019 | |
| WO | WO2020001380 A1 | 1/2020 | |
| WO | WO2020145873 A1 | 7/2020 | |
| WO | WO-2021071570 A1 | 4/2021 | |

OTHER PUBLICATIONS

Xinwei: "Discussion on Indoor Positioning Enhancement Aided by EB/FD-MIMO", R1-154700, 3rd Generation Partnership Project (3GPP), Mobile Competence Centre, 650, Route Des Lucioles, F-06921 Sophia-Antipolis Cedex, France, vol. RAN WG1, No. Beijing, China, Aug. 24, 2015-Aug. 28, 2015, Aug. 14, 2015, XP050993741, 3 Pages.
Ericsson: "RAT Dependent NR Positioning Solutions", 3GPP Draft, 3GPP TSG-RAN WG1 #95, R1-1813592, RAT Dependent NR Positioning Solutions, 3rd Generation Partnership Project (3GPP), Mobile Competence Centre, 650, Route Des Lucioles, F-06921, Sophia-Antipolis Cedex, France, vol. RAN WG1. No. Spokane. United States, Nov. 12, 2018-Nov. 16, 2018, Nov. 11, 2018 (Nov. 11, 2018), XP051555648, 17 pages, Retrieved from the Internet: URL: http://www.3gpp.org/ftp/Meetings%5F3GPP%5FSYNC/RAN1/Docs/R1%2D1813592%2Ezip [retrieved on Nov. 11, 2018] p. 7-p. 15.

3GPP TS 38.211 version 15.2.0 Release 15, 2018, 98 pages.
CATT: "DL Reference Signals for NR Positioning", 3GPP TSG RAN WG1 #97, R1-1906305, Reno, USA, May 13-17, 2019, pp. 1-17.
Ericsson: "Downlink Positioning Solutions: Design and Evaluations", 3GPP Draft, 3GPP TSG RAN WG1 96, R1-1903139 DL Positioning Solutions, 3rd Generation Partnership Project (3GPP), Mobile Competence Centre, 650, Route Des Lucioles, F-06921 Sophia-Antipolis Cedex, France, vol. RAN WG1. No. Athens. Greece, Feb. 25, 2019-Mar. 1, 2019, Feb. 15, 2019 (Feb. 15, 2019), XP051600835, 28 Pages, Retrieved from the Internet: URL: http://www.3gpp.org/ftp/tsg%5Fran/WG1%5FRL1/TSGR1%5F96/Docs/R1%2D1903139%2Ezip, [retrieved on Feb. 15, 2019], Sections 1-5, figure 7.
Ericsson: "Uplink Positioning Solutions: Design and Evaluations", 3GPP Draft, 3GPP TSG RAN WG1 #96, R1-1903140 UL Positioning Solutions, , 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019 Feb. 15, 2019 (Feb. 15, 2019), XP051600836, 7 Pages, Retrieved from the Internet: URL:http://www.3gpp.org/ftp/tsg%5Fran/WG1%5FRL1/TSGR1%5F96/Docs/R1%2D1903140%2Ezip [retrieved on Feb. 15, 2019] figure 1 p. 3-p. 4.
ETSI TS 138 211 V16.2.0, "Physical Channels and Modulation", 5G, NR, 3GPP TS 38.211, version 16.2.0, Release 16, Jul. 2020, pp. 1-135.
Fischer S., "Observed Time Difference of Arrival (OTDOA) Positioning in 3GPP LTE", Qualcomm Technologies Inc, Jun. 6, 2014 (Jun. 6, 2014), pp. 1-62, XP055284784, Retrieved from the Internet: URL: http://www.terranautx.com/s/Qualcomm-OTDOA-positioning-in-LTE-June-2014.pdf, p. 9, chapter 3.1;p. 13, chapter 4.2.1;p. 15, chapter 5.1;p. 18, chapter 5.4;pp. 31-33, chapter 6.3;pp. 37-39, chapter 6.5;pp. 40-42, chapters 7.1.1-7.1.3.
Huawei, et al., "Downlink Based Solutions for NR Positioning", 3GPP Draft, R1-1900036, 3rd Generation Partnership Project (3GPP), Mobile Competence Centre, 650, Route Des Lucioles, F-06921 Sophia-Antipolis Cedex, France, vol. RAN WG1, No. Taipei, Jan. 21, 2019-Jan. 25, 2019, Jan. 20, 2019 (Jan. 20, 2019), XP051592962, 7 pages, Retrieved from the Internet: URL: http://www.3gpp.org/ftp/Meetings%5F3GPP%5FSYNC/RAN1/Docs/R1%2D1900036%2Ezip. [retrieved on Jan. 20, 2019] the whole document.
Indian Patent Application No. 201941012233, filed Mar. 28, 2019, 102 pages.
Intel Corporation: "DL Reference Signals for NR Positioning", 3GPP Draft; R1-1908659 Intel—NRPOS DLRS, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765267, 27 pages, Retrieved from the Internet: URL: http://www.3gpp.org/ftp/tsg_ran/WG1_RL_1/TSGR1_98/Docs/R1-1908659.zip. [retrieved on Aug. 17, 2019] the whole document.
Intel Corporation: "Offline Discussion Outcome on DL Reference Signals for NR", 3GPP TSG RAN WG1 Meeting #96bis, R1-1905847, Xi'an, China, Apr. 8-12, 2019, pp. 1-12.
International Search Report and Written Opinion—PCT/US2018/039677—ISA/EPO—dated Oct. 16, 2018 (174357WO).
International Search Report and Written Opinion—PCT/US2020/014404—ISA/EPO—dated Apr. 14, 2020 (191263WO).
International Preliminary Report On Patentability—PCT/US2018/039677, The International Bureau of WIPO—Geneva, Switzerland, dated Feb. 13, 2020 (174357WO).
International Search Report and Written Opinion—PCT/US2020/024617—ISA/EPO—dated Jun. 24, 2020 (191994WO).
International Search Report and Written Opinion—PCT/US2017/038723—ISA/EPO—dated Sep. 29, 2017 (163864WO).
International Search Report and Written Opinion—PCT/US2020/026024—ISAEPO—dated Jun. 16, 2020 (192465WO).
LG Electronics: "Discussion on Potential Enhancements for Indoor Positioning", 3GPP Draft, R1-150229 Discussion on potential enhancements for indoor positioning, 3rd Generation Partnership Project (3GPP), vol. RAN WG1, Athens, Greece; Feb. 8, 2015, pp. 1-4,

(56) References Cited

OTHER PUBLICATIONS

XP050933443, retrieved from the Internet: URL: http://www.3gpp.org/ftp/Meetings_3GPP_SYNC/RAN1/Docs/.

Media Tek Inc: "Views on Potential Positioning Techniques", R1-1812373, 3GPP TSG-RAN WG1 Meeting #95, Spokane, USA, Nov. 12-Nov. 16, 2018, Date of Publication: Nov. 3, 2018, 6 Pages, http://www.3gpp.Org/Ftp/Tsg_ran/WG1_RL1/TSGR1_95/Docs/R1-1812373.Zip.

Mediatek Inc: "On Downlink OTDOA and Angle based techniques", 3GPP TSG-RAN WG1 #96 Meeting, R1-1903239, Athens, Greece, Feb. 25-Mar. 1, 2019, 8 Pages.

Mediatek Inc: "On downlink OTDOA Technique: Potential Reference Signal Design", 3GPP Draft, 3GPP TSG-RAN WG1 Ad-Hoc Meeting 1901, R1-1900203 On downlink OTDOA Technique_Final, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593127, 6 Pages, Retrieved from the Internet: URL: http://www.3gpp.org/ftp/Meetings%5F3GPP%5FSYNC/RAN1/Docs/R1%2D1900203%2Ezip, [retrieved on Jan. 20, 2019], Sections 1-5, figures 4-5.

Mediatek Inc: "Reference Signal Design for NR Positioning", 3GPP Draft, 3GPP TSG-RAN WG1 #96bis Meeting, R1-1904500 DL RS Design_Final, 3rd Generation Partnership Project (3GPP), Mobile Competence Centre , 650, Route Des Lucioles, F-06921 Sophia-Antipolis Cedex, France, vol. RAN WG1. No. Xi'an, China, Apr. 8, 2019-Apr. 12, 2019, Apr. 3, 2019 (Apr. 3, 2019), XP051707240, 24 Pages, Retrieved from the Internet: URL: http://www.3gpp.org/ftp/tsg%5Fran/WG1%5FRL1/TSGR1%5F96b/Docs/R1%2D1904500%2Ezip, [retrieved on Apr. 3, 2019], Sections 1-4, figures 2e, 2f.

Nextnav: "Synchronization for OTDOA Simulations", R1-150691, 3GPP TSG RAN WG1 Meeting #80, Athens, Greece, Feb. 9-13, 2015, 3 Pages.

Nokia, et al., "Views on DL and UL Reference Signals for NR Positioning", 3GPP Draft, 3GPP TSG RAN WG1 #96bis, R1-1905262 RS for NR Positioning, 3rd Generation Partnership Project (3GPP), Mobile Competence Centre, 650, Route Des Lucioles, F-06921 Sophia-Anti Polis Cedex, France, vol. RAN WG1, No. Xi'an, China, Apr. 8, 2019-Apr. 12, 2019, Apr. 2, 2019 (Apr. 2, 2019), XP051707399, 8 pages, Retrieved from the Internet: URL: http://www.3gpp.org/ftp/tsg%5Fran/WG1%5FRL1/TSGR1%5F96b/Docs/R1%2D1905262%2Ezip, [retrieved on Apr. 2, 2019], Sections 1-3, figure 3.

Shin et al., "Sounding Reference Signal Measurement in LTE System", 18th International Conference on Advanced Communication Technology (ICACT), Mar. 3, 2016, pp. 755-758, https://ieeexplore.ieee.org/stamp/stamp.jsp?tp=&arnumber=7423548.

Vivo: "Discussion on DL RS for NR Positioning", R1-1908174, 3GPP TSG RAN WG1 #98, Prague, CZ, Aug. 26-30, 2019, 13 Pages.

White Paper: "An overview of LTE Positioning", Feb. 2012, Spirent, 16 Pages.

Ericsson, "DL Reference Signals for NR Positioning", R1-1909424, 3GPP TSG-RAN WG1 Meeting #98, Prague, CZ, Aug. 26-30, 2019 (Year: 2019), 28 Pages.

European Search Report—EP23151386—Search Authority—Berlin—dated Mar. 15, 2023 (195178EPD1).

Intel Corporation: "Design of Downlink Reference Signals for NR Positioning", 3GPP TSG RAN WG1 Meeting #97, R1-1906821, Reno, USA, May 13-17, 2019, pp. 1-17.

Ericsson: "DL Reference Signals for NR Positioning", 3GPP TSG RAN WG1 Meeting #97, R1-1907508, Reno, NV, USA, May 13-17, 2019, 27 Pages.

Taiwan Search Report—TW109111072—TIPO—dated Aug. 29, 2023 (192465TW).

Specification of U.S. Appl. No. 62/726,480, filed Sep. 4, 2018, 28 Pages.

Specification of U.S. Appl. No. 62/740,459, filed Oct. 3, 2018, 12 Pages.

SONY: "Discussion on OTDOA NR Positioning", 3GPP TSG RAN WG2 Meeting #104, R2-1817081, Spokane, USA, Nov. 12-16, 2018, 3 pages.

3GPP: "3rd Generation Partnership Project, Technical Specification Group Radio Access Network, NR, Physical Layer Procedures for Data (Release 16)", 3GPP TS 38.214, 3rd Generation Partnership Project, Mobile Competence Centre, 650, Route Des Lucioles, F-06921 Sophia-Antipolis Cedex, France, vol. RAN WG1, No. V16.0.0, Dec. 2019, Jan. 14, 2020, XP051860777, pp. 1-147, Sec 5.2, Table 6.2.3.1-1, Table 6.2.3.1-2, Table 6.2.3.1-3, Sec 5.1.6.2, p. 41.

Ericsson: "DL and UL Reference Signals for NR Positioning", 3GPP TSG RAN WG1 96, R1-1905461, Xi'an, P.R. China, Apr. 8, 2019-Apr. 12, 2019, Apr. 3, 2019, pp. 1-15.

U.S. Appl. No. 62/740,459, inventor Chiao-Yao; Chuang, filed on Oct. 3, 2018.

Ericsson: "DFT size for Uplink Transmissions", 3GPP TSG-RAN WG1 #47, R1-063127, Riga, Latvia, Nov. 6, 2006-Nov. 10, 2006, 2 Pages, Nov. 1, 2006.

VIVO: "Views on NR Downlink Positioning Techniques", 3GPP TSG RAN WG1 Ad-Hoc Meeting 1901, R1-1900149, Taipei, Jan. 21-25, 2019, 6 Pages.

ERICSSON: "Uplink Positioning Solutions: Design and Evaluations", 3GPP TSG RAN WG1 96, R1-1903140, Athens, Greece, Feb. 25, 2019-Mar. 1, 2019, Feb. 15, 2019, 6 Pages.

NOKIA, et al., "Potential Positioning Techniques—UL Based Solutions", 3GPP TSG RAN WG1 Meeting #96, R1-1901848, Athens, Greece, Feb. 25, 2019-Mar. 1, 2019, Feb. 15, 2019, 6 Pages.

Intel Corporation: "Downlink and Uplink Reference Signals for NR Positioning", 3GPP TSG RAN WG1 Meeting #96bis, R1-1904320, Xi'an, China, Apr. 8, 2019-Apr. 12, 2019, Apr. 3, 2019, pp. 1-15.

\* cited by examiner

PATTERNS FOR REFERENCE SIGNALS USED FOR POSITIONING IN A WIRELESS COMMUNICATIONS SYSTEM

CROSS REFERENCE

The present Application for Patent is a Continuation of U.S. patent application Ser. No. 16/804,846 by MANOLAKOS et al., entitled "Patterns For Reference Signals Used For Positioning in a Wireless Communications System" and filed Feb. 28, 2020, which claims the benefit of Greek Patent Application No. 20190100190 by MANOLAKOS et al., entitled "Patterns for Reference Signals Used for Positioning in a Wireless Communications System" and filed May 2, 2019, each of which is assigned to the assignee hereof and expressly incorporated by reference herein.

BACKGROUND

The following relates generally to wireless communications, and more specifically to patterns for reference signals used for positioning in a wireless communications system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a wireless device may identify its position or geographic location based on reference signals received from another wireless device. For example, a UE may measure reference signals received from one or more base stations and may perform multi-lateral positioning to identify its position or geographic location. In some aspects, conventional techniques for transmitting reference signals to be used for positioning may be deficient.

SUMMARY

The described techniques relate to improved methods, systems, devices, and apparatuses that support patterns for reference signals used for positioning in a wireless communications system. Generally, the described techniques provide for determining a suitable pattern for transmitting reference signals used for positioning on allocated resources. In particular, the pattern may be used to assign the reference signals to frequency tones across multiple symbols such that the frequency tones to which the reference signals are mapped in at least two consecutive symbols are non-adjacent (e.g., separated by at least one frequency tone). In some cases, a wireless device may determine the pattern used to assign reference signals used for positioning autonomously (e.g., based on configured algorithms or a look-up table), and, in other cases, a wireless device (e.g., a user equipment (UE)) may determine the pattern used to assign reference signals used for positioning based on a configuration received from another wireless device (e.g., a base station).

A method of wireless communication at a transmitting device is described. The method may include determining a pattern for a set of time-frequency resources that includes a set of symbols and a set of frequency tones, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, mapping the reference signals to a subset of the set of time-frequency resources based on the pattern, and transmitting the reference signals via the subset of the set of time-frequency resources.

An apparatus for wireless communication at a transmitting device is described. The apparatus may include one or more transceivers, one or more memory, and one or more processors electronically coupled to one or more memory and one or more transceivers. The one or more processors may be configured to determine a pattern for a set of time-frequency resources that includes a set of symbols and a set of frequency tones, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, map the reference signals to a subset of the set of time-frequency resources based on the pattern, and transmit, via the one or more transceivers, the reference signals via the subset of the set of time-frequency resources.

Another apparatus for wireless communication at a transmitting device is described. The apparatus may include means for determining a pattern for a set of time-frequency resources that includes a set of symbols and a set of frequency tones, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, mapping the reference signals to a subset of the set of time-frequency resources based on the pattern, and transmitting the reference signals via the subset of the set of time-frequency resources.

A non-transitory computer-readable medium storing code for wireless communication at a transmitting device is described. The code may include instructions executable by a processor to determine a pattern for a set of time-frequency resources that includes a set of symbols and a set of frequency tones, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, map the reference signals to a subset of the set of time-frequency resources based on the pattern, and transmit the reference signals via the subset of the set of time-frequency resources.

In some examples of the method, apparatuses, and non-transitory computer-readable medium described herein, determining the pattern may include operations, features, means, or instructions for identifying a comb level configured for transmitting the reference signals, determining a sequence of offsets for the pattern based on the comb level, where each offset in the sequence may be used to assign a reference signal to a frequency tone within a symbol, and determining the pattern based on the sequence of offsets.

In some examples of the method, apparatuses, and non-transitory computer-readable medium described herein, determining the sequence of offsets may include operations, features, means, or instructions for determining binary representations of each number in a sequence of numbers from zero to one less than a value of the comb level, where each binary representation includes a same number of bits, reversing the binary representation of each number in the sequence of numbers, determining a decimal value corresponding to each reversed binary representation, where each decimal value may be included in a sequence of decimal values that corresponds to the sequence of numbers from zero to one less than the comb level, and determining the sequence of offsets to be equal to the sequence of decimal values.

In some examples of the method, apparatuses, and non-transitory computer-readable medium described herein, determining the sequence of offsets may include operations, features, means, or instructions for identifying a circular buffer including a sequence of numbers from zero to one less than a value of the comb level, selecting a first value from the circular buffer to include as a first value in the sequence of offsets, performing a floor or ceiling operation on half of a size of the circular buffer, adding a result of the floor or ceiling operation performed on half of the size of the circular buffer to the first value selected from the circular buffer to identify a second value from the circular buffer to include as a second value in the sequence of offsets, recursively segmenting the circular buffer into segmented circular buffers and performing a floor or ceiling operation on half of a size of each segmented circular buffer to identify a next value from the circular buffer to include as a next value in the sequence of offsets until a size of each segmented circular buffer may be equal to one, and including remaining values in the circular buffer as remaining values in the sequence of offsets.

In some examples of the method, apparatuses, and non-transitory computer-readable medium described herein, recursively performing the floor or ceiling operation may include operations, features, means, or instructions for interchanging between floor operations and ceiling operations in the recursion. In some examples of the method, apparatuses, and non-transitory computer-readable medium described herein, determining the sequence of offsets may include operations, features, means, or instructions for rounding a value of the comb level up or down to a power of two, determining binary representations of each number in a sequence of numbers from zero to one less than the rounded value, where each binary representation includes a same number of bits, reversing the binary representation of each number in the sequence of numbers, determining a decimal value corresponding to each reversed binary representation, where each decimal value may be included in a sequence of decimal values that corresponds to the sequence of numbers from zero to one less than the comb level, and determining the sequence of offsets to include a subset of the sequence of decimal values that may be below the value of the comb level or include the sequence of decimal values and other decimal values that may be below the value of the comb level and may be excluded from the sequence of decimal values.

In some examples of the method, apparatuses, and non-transitory computer-readable medium described herein, rounding the value of the comb level up or down to the power of two may include operations, features, means, or instructions for determining that the value of the comb level may be closer to a closest higher power of two than to a closest lower power of two, and rounding the value of the comb level up to the closest higher power of two. In some examples of the method, apparatuses, and non-transitory computer-readable medium described herein, rounding the value of the comb level up or down to the power of two may include operations, features, means, or instructions for determining that the value of the comb level may be closer to a closest lower power of two than to a closest higher power of two, and rounding the value of the comb level down to the closest lower power of two.

Some examples of the method, apparatuses, and non-transitory computer-readable medium described herein may further include operations, features, means, or instructions for identifying a value of a counter used for identifying offset values from the sequence of offsets, indexing the sequence of offsets using the identified counter value, and determining an offset for assigning a reference signal to frequency tones in a symbol based on the indexing. In some examples of the method, apparatuses, and non-transitory computer-readable medium described herein, the counter may be associated with a resource used to transmit the reference signals used for positioning, the counter may be associated with a resource set used to transmit the reference signals used for positioning, the counter may be associated with a resource configuration or setting used to transmit the reference signals used for positioning, the counter may be associated with the transmitting device, or the counter may be a shared counter associated with all resource sets used to transmit the reference signals used for positioning.

In some examples of the method, apparatuses, and non-transitory computer-readable medium described herein, the counter may be associated with a resource used to transmit reference signals used for positioning and the counter may be reset after every slot, the counter may be associated with the resource used to transmit reference signals used for positioning and the counter may be reset after every resource occasion, the counter may be associated with the resource used to transmit reference signals used for positioning and the counter may be reset after every frame, the counter may be associated with the resource used to transmit reference signals used for positioning and the counter may be reset when the resource may be reconfigured, the counter may be associated with a resource set used to transmit reference signals used for positioning and the counter may be reset when the resource set may be reconfigured, the counter may be associated with a resource configuration or setting used to transmit reference signals used for positioning and the counter may be reset when the resource configuration or setting may be reconfigured; or, and the counter may be associated with a report configuration or setting and the counter may be reset when the report configuration or setting may be reconfigured.

In some examples of the method, apparatuses, and non-transitory computer-readable medium described herein, each offset in the sequence of offsets indicates an offset from a reference resource and indicates a location of a resource element on which to transmit a reference signal in the set of time-frequency resources. In some examples of the method, apparatuses, and non-transitory computer-readable medium described herein, determining the pattern may include operations, features, means, or instructions for determining the pattern based on referencing a look-up table with a comb level configured for transmitting the reference signals. In some examples of the method, apparatuses, and non-transitory computer-readable medium described herein, at least {0, 2, 1, 3} for a configured comb level of four, at least {0, 3, 1, 4, 2, 5} for a configured comb level of six, at least {0, 4, 2, 6, 1, 5, 3, 7} for a configured comb level of eight, or at least {0, 8, 4, 12, 2, 10, 6, 14, 1, 9, 5, 13, 3, 11, 7, 15} for a configured comb level of 16.

In some examples of the method, apparatuses, and non-transitory computer-readable medium described herein, the transmitting device may be a UE, and determining the pattern may include operations, features, means, or instructions for receiving, from a base station, an indication of a sequence of offsets used to determine the pattern. In some examples of the method, apparatuses, and non-transitory computer-readable medium described herein, receiving the indication of the pattern may include operations, features, means, or instructions for determining that the sequence of offsets includes one value, and determining to use a default pattern to assign the reference signals used for positioning to the set of time-frequency resources based on determining that the sequence of offsets includes one value. In some examples of the method, apparatuses, and non-transitory computer-readable medium described herein, a value of a comb level configured for transmitting the reference signals may be greater than four, and frequency tones to which reference signals may be assigned in all groups of two consecutive symbols in the set of time-frequency resources may be non-adjacent.

In some examples of the method, apparatuses, and non-transitory computer-readable medium described herein, the first set of frequency tones and the second set of frequency tones may be uniformly spaced in frequency in the first symbol and the second symbol respectively based on a value of a comb level configured for transmitting the reference signals. In some examples of the method, apparatuses, and non-transitory computer-readable medium described herein, the first symbol and the second symbol may be physically consecutive and consecutive in the pattern or the first symbol and the second symbol may be consecutive in the pattern. In some examples of the method, apparatuses, and non-transitory computer-readable medium described herein, determining the pattern may include operations, features, means, or instructions for determining whether the set of time-frequency resources may be protected from puncturing, preemption, rate-matching, dropping, or de-prioritization to facilitate transmissions on other physical channels, and determining the pattern based on whether the set of time-frequency resources may be protected.

In some examples of the method, apparatuses, and non-transitory computer-readable medium described herein, the reference signals used for positioning include positioning reference signals (PRSs), channel state information reference signals (CSI-RSs), tracking reference signals (TRSs), sounding reference signals (SRSs), or physical random access channel (PRACH) signals. In some examples of the method, apparatuses, and non-transitory computer-readable medium described herein, mapping the reference signals used for positioning to the subset of the set of time-frequency resources based on the pattern may include operations, features, means, or instructions for mapping the reference signals used for positioning to the subset of the set of time-frequency resources based on partially repeating the pattern across the set of symbols.

A method of wireless communication at a receiving device is described. The method may include receiving a set of reference signals used for positioning via a subset of a set of time-frequency resources, where the set of time-frequency resources includes a set of symbols and a set of frequency tones, identifying the set of reference signals based on a pattern for the set of time-frequency resources, where the pattern comprises an assignment of reference signals to a first set of frequency tones within a first symbol of the set of time-frequency resources and to a second set of frequency tones within a second symbol of the set of time-frequency resources, and each frequency tone of the first set is separated in frequency from each frequency tone of the second set by at least one frequency tone of the plurality of frequency tones, the first symbol and the second symbol being consecutive, decoding the reference signals, and estimating a location of the receiving device based on the decoded reference signals.

An apparatus for wireless communication at a receiving device is described. The apparatus may include one or more transceivers, one or more memory, and one or more processors electronically coupled to one or more memory and one or more transceivers. The one or more processors may be configured to receive, via the one or more transceivers, a set of reference signals used for positioning via a subset of a set of time-frequency resources, where the set of time-frequency resources includes a set of symbols and a set of frequency tones, identify the set of reference signals based on a pattern for the set of time-frequency resources, where the pattern comprises an assignment of reference signals to a first set of frequency tones within a first symbol of the set of time-frequency resources and to a second set of frequency tones within a second symbol of the set of time-frequency resources, and each frequency tone of the first set is separated in frequency from each frequency tone of the second set by at least one frequency tone of the plurality of frequency tones, decode the reference signals, and estimate a location of the receiving device based on the decoded reference signals.

Another apparatus for wireless communication at a receiving device is described. The apparatus may include means for receiving a set of reference signals used for positioning via a subset of a set of time-frequency resources, where the set of time-frequency resources includes a set of symbols and a set of frequency tones, identifying the set of reference signals based on a pattern for the set of time-frequency resources, where the pattern comprises an assignment of reference signals to a first set of frequency tones within a first symbol of the set of time-frequency resources and to a second set of frequency tones within a second symbol of the set of time-frequency resources, and each frequency tone of the first set is separated in frequency from each frequency tone of the second set by at least one frequency tone of the plurality of frequency tones, decoding the reference signals, and estimating a location of the receiving device based on the decoded reference signals.

A non-transitory computer-readable medium storing code for wireless communication at a receiving device is described. The code may include instructions executable by a processor to receive a set of reference signals used for positioning via a subset of a set of time-frequency resources, where the set of time-frequency resources includes a set of symbols and a set of frequency tones, identify the set of reference signals based on a pattern for the set of time-frequency resources, where the pattern comprises an assignment of reference signals to a first set of frequency tones within a first symbol of the set of time-frequency resources and to a second set of frequency tones within a second symbol of the set of time-frequency resources, and each frequency tone of the first set is separated in frequency from each frequency tone of the second set by at least one frequency tone of the plurality of frequency tones, decode the reference signals, and estimate a location of the receiving device based on the decoded reference signals.

Some examples of the method, apparatuses, and non-transitory computer-readable medium described herein may further include operations, features, means, or instructions for identifying a comb level configured for the set of reference signals, determining a sequence of offsets for the pattern based on the comb level, where each offset in the sequence may be used to assign a reference signal to a frequency tone within a symbol, and determining the pattern based on the sequence of offsets. In some examples of the method, apparatuses, and non-transitory computer-readable medium described herein, determining the sequence of offsets may include operations, features, means, or instructions for determining binary representations of each number in a sequence of numbers from zero to one less than a value of the comb level, where each binary representation includes a same number of bits, reversing the binary representation of each number in the sequence of numbers, determining a decimal value corresponding to each reversed binary representation, where each decimal value may be included in a sequence of decimal values that corresponds to the sequence of numbers from zero to one less than the comb level, and determining the sequence of offsets to be equal to the sequence of decimal values.

In some examples of the method, apparatuses, and non-transitory computer-readable medium described herein, determining the sequence of offsets may include operations, features, means, or instructions for identifying a circular buffer including a sequence of numbers from zero to one less than a value of the comb level, selecting a first value from the circular buffer to include as a first value in the sequence of offsets, performing a floor or ceiling operation on half of a size of the circular buffer, adding a result of the floor or ceiling operation performed on half of the size of the circular buffer to the first value selected from the circular buffer to identify a second value from the circular buffer to include as a second value in the sequence of offsets, recursively segmenting the circular buffer into segmented circular buffers and performing a floor or ceiling operation on half of a size of each segmented circular buffer to identify a next value from the circular buffer to include as a next value in the sequence of offsets until a size of each segmented circular buffer may be equal to one, and including remaining values in the circular buffer as remaining values in the sequence of offsets.

In some examples of the method, apparatuses, and non-transitory computer-readable medium described herein, recursively performing the floor or ceiling operation may include operations, features, means, or instructions for interchanging between floor operations and ceiling operations in the recursion. In some examples of the method, apparatuses, and non-transitory computer-readable medium described herein, determining the sequence of offsets may include operations, features, means, or instructions for rounding a value of the comb level up or down to a power of two, determining binary representations of each number in a sequence of numbers from zero to one less than the rounded value, where each binary representation includes a same number of bits, reversing the binary representation of each number in the sequence of numbers, determining a decimal value corresponding to each reversed binary representation, where each decimal value may be included in a sequence of decimal values that corresponds to the sequence of numbers from zero to one less than the comb level, and determining the sequence of offsets to include a subset of the sequence of decimal values that may be below the value of the comb level or include the sequence of decimal values and other decimal values that may be below the value of the comb level and may be excluded from the sequence of decimal values.

In some examples of the method, apparatuses, and non-transitory computer-readable medium described herein, rounding the value of the comb level up or down to the power of two may include operations, features, means, or instructions for determining that the value of the comb level may be closer to a closest higher power of two than to a closest lower power of two, and rounding the value of the comb level up to the closest higher power of two. In some examples of the method, apparatuses, and non-transitory computer-readable medium described herein, rounding the value of the comb level up or down to the power of two may include operations, features, means, or instructions for determining that the value of the comb level may be closer to a closest lower power of two than to a closest higher power of two, and rounding the value of the comb level down to the closest lower power of two.

Some examples of the method, apparatuses, and non-transitory computer-readable medium described herein may further include operations, features, means, or instructions for identifying a value of a counter used for identifying offset values from the sequence of offsets, indexing the sequence of offsets using the identified counter value, and determining an offset for assigning a reference signal to frequency tones in a symbol based on the indexing. In some examples of the method, apparatuses, and non-transitory computer-readable medium described herein, the counter may be associated with a resource on which the receiving device receives at least a subset of the set of reference signals used for positioning, the counter may be associated with a resource set including resources on which the receiving device receives at least a subset of the set of reference signals used for positioning, the counter may be associated with a resource configuration or setting used to receive at least a subset of the set of reference signals used for positioning, the counter may be associated with the receiving device, or the counter may be a shared counter associated with all resource sets including resources on which the receiving device receives at least a subset of the set of reference signals used for positioning.

In some examples of the method, apparatuses, and non-transitory computer-readable medium described herein, the counter may be associated with a resource used to transmit reference signals used for positioning and the counter may be reset after every slot, the counter may be associated with the resource used to transmit reference signals used for positioning and the counter may be reset after every resource occasion, the counter may be associated with the resource used to transmit reference signals used for positioning and the counter may be reset after every frame, the counter may be associated with the resource used to transmit reference signals used for positioning and the counter may be reset when the resource may be reconfigured, the counter may be associated with a resource set used to transmit reference signals used for positioning and the counter may be reset when the resource set may be reconfigured, the counter may be associated with a resource configuration or setting used to transmit reference signals used for positioning and the counter may be reset when the resource configuration or setting may be reconfigured; or, and the counter may be associated with a report configuration or setting and the counter may be reset when the report configuration or setting may be reconfigured.

In some examples of the method, apparatuses, and non-transitory computer-readable medium described herein, each offset in the sequence of offsets indicates an offset from a reference resource and indicates a location of a resource element that includes a reference signal in the set of time-frequency resources. Some examples of the method, apparatuses, and non-transitory computer-readable medium described herein may further include operations, features, means, or instructions for determining the pattern based on referencing a look-up table with a comb level configured for the set of reference signals. In some examples of the method, apparatuses, and non-transitory computer-readable medium described herein, at least {0, 2, 1, 3} for a configured comb level of four, at least {0, 3, 1, 4, 2, 5} for a configured comb level of six, at least {0, 4, 2, 6, 1, 5, 3, 7} for a configured comb level of eight, or at least {0, 8, 4, 12, 2, 10, 6, 14, 1, 9, 5, 13, 3, 11, 7, 15} for a configured comb level of 16.

In some examples of the method, apparatuses, and non-transitory computer-readable medium described herein, the receiving device may be a UE, and determining the pattern may include operations, features, means, or instructions for receiving, from a base station, an indication of a sequence of offsets used to determine the pattern. In some examples of the method, apparatuses, and non-transitory computer-readable medium described herein, receiving the indication of the sequence of offsets used to determine the pattern may include operations, features, means, or instructions for determining that the sequence of offsets includes one value, and determining to use a default pattern to assign the reference signals used for positioning to the set of time-frequency resources based on determining that the sequence of offsets includes one value. In some examples of the method, apparatuses, and non-transitory computer-readable medium described herein, a value of a comb level configured for transmitting the reference signals may be greater than four, and frequency tones to which reference signals may be assigned in all groups of two consecutive symbols in the set of time-frequency resources may be non-adjacent.

In some examples of the method, apparatuses, and non-transitory computer-readable medium described herein, the first set of frequency tones and the second set of frequency tones may be uniformly spaced in frequency in the first symbol and the second symbol respectively based on a value of a comb level configured for the set of reference signals. In some examples of the method, apparatuses, and non-transitory computer-readable medium described herein, the first symbol and the second symbol may be physically consecutive and consecutive in the pattern or the first symbol and the second symbol may be consecutive in the pattern. Some examples of the method, apparatuses, and non-transitory computer-readable medium described herein may further include operations, features, means, or instructions for determining whether the set of time-frequency resources may be protected from puncturing, preemption, rate-matching, dropping, or de-prioritization to facilitate transmissions on other physical channels, and determining the pattern based on whether the set of time-frequency resources may be protected.

In some examples of the method, apparatuses, and non-transitory computer-readable medium described herein, the reference signals used for positioning include positioning reference signals (PRSs), channel state information reference signals (CSI-RSs), tracking reference signals (TRSs), sounding reference signals (SRSs), or physical random access channel (PRACH) signals. In some examples of the method, apparatuses, and non-transitory computer-readable medium described herein, identifying the set of reference signals may include operations, features, means, or instructions for identifying the set of reference signals based on partially repeating the pattern across the set of symbols.

A method of wireless communication at a transmitting device is described. The method may include determining a pattern for a set of time-frequency resources that includes a set of symbols and a set of frequency tones, where the pattern includes an assignment of a set of reference signals used for positioning to frequency tones for a subset of the set of symbols, mapping the set of reference signals to a subset of the set of time-frequency resources based on at least partially repeating the pattern across the set of symbols, and transmitting the set of reference signals via the subset of the set of time-frequency resources.

An apparatus for wireless communication at a transmitting device is described. T The apparatus may include one or more transceivers, one or more memory, and one or more processors electronically coupled to one or more memory and one or more transceivers. The one or more processors may be configured to determine a pattern for a set of time-frequency resources that includes a set of symbols and a set of frequency tones, where the pattern includes an assignment of a set of reference signals used for positioning to frequency tones for a subset of the set of symbols, map the set of reference signals to a subset of the set of time-frequency resources based on at least partially repeating the pattern across the set of symbols, and transmit, via the one or more transceivers, the set of reference signals via the subset of the set of time-frequency resources.

Another apparatus for wireless communication at a transmitting device is described. The apparatus may include means for determining a pattern for a set of time-frequency resources that includes a set of symbols and a set of frequency tones, where the pattern includes an assignment of a set of reference signals used for positioning to frequency tones for a subset of the set of symbols, mapping the set of reference signals to a subset of the set of time-frequency resources based on at least partially repeating the pattern across the set of symbols, and transmitting the set of reference signals via the subset of the set of time-frequency resources.

A non-transitory computer-readable medium storing code for wireless communication at a transmitting device is described. The code may include instructions executable by a processor to determine a pattern for a set of time-frequency resources that includes a set of symbols and a set of frequency tones, where the pattern includes an assignment of a set of reference signals used for positioning to frequency tones for a subset of the set of symbols, map the set of reference signals to a subset of the set of time-frequency resources based on at least partially repeating the pattern across the set of symbols, and transmit the set of reference signals via the subset of the set of time-frequency resources.

In some examples of the method, apparatuses, and non-transitory computer-readable medium described herein, the reference signals used for positioning may be assigned to a first set of frequency tones within a first symbol of the set of time-frequency resources and to a second set of frequency tones within a second symbol of the set of time-frequency resources, the first symbol and the second symbol being consecutive, and each frequency tone of the first set may be separated in frequency from each frequency tone of the second set by at least one frequency tone of the set of frequency tones. In some examples of the method, apparatuses, and non-transitory computer-readable medium described herein, determining the pattern may include operations, features, means, or instructions for identifying a comb level configured for transmitting the reference signals, determining a sequence of offsets for the pattern based on the comb level, where each offset in the sequence may be used to assign a reference signal to a frequency tone within a symbol, and determining the pattern based on the sequence of offsets.

A method of wireless communication at a receiving device is described. The method may include receiving a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols, identifying the set of reference signals based on at least partially repeating the pattern across the set of symbols, decoding the set of reference signals, and estimating a location of the receiving device based on the decoded reference signals.

An apparatus for wireless communication at a receiving device is described. The apparatus may include one or more transceivers, one or more memory, and one or more processors electronically coupled to one or more memory and one or more transceivers. The one or more processors may be configured to receive, via the one or more transceivers, a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols, identify the set of reference signals based on at least partially repeating the pattern across the set of symbols, decode the set of reference signals, and estimate a location of the receiving device based on the decoded reference signals.

Another apparatus for wireless communication at a receiving device is described. The apparatus may include means for receiving a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols, identifying the set of reference signals based on at least partially repeating the pattern across the set of symbols, decoding the set of reference signals, and estimating a location of the receiving device based on the decoded reference signals.

A non-transitory computer-readable medium storing code for wireless communication at a receiving device is described. The code may include instructions executable by a processor to receive a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols, identify the set of reference signals based on at least partially repeating the pattern across the set of symbols, decode the set of reference signals, and estimate a location of the receiving device based on the decoded reference signals.

In some examples of the method, apparatuses, and non-transitory computer-readable medium described herein, the reference signals used for positioning may be assigned to a first set of frequency tones within a first symbol of the set of time-frequency resources and to a second set of frequency tones within a second symbol of the set of time-frequency resources, the first symbol and the second symbol being consecutive, and each frequency tone of the first set may be separated in frequency from each frequency tone of the second set by at least one frequency tone of the set of frequency tones. Some examples of the method, apparatuses, and non-transitory computer-readable medium described herein may further include operations, features, means, or instructions for identifying a comb level configured for the set of reference signals, determining a sequence of offsets for the pattern based on the comb level, where each offset in the sequence may be used to assign a reference signal to a frequency tone within a symbol, and determining the pattern based on the sequence of offsets.

DETAILED DESCRIPTION

Figure 1:
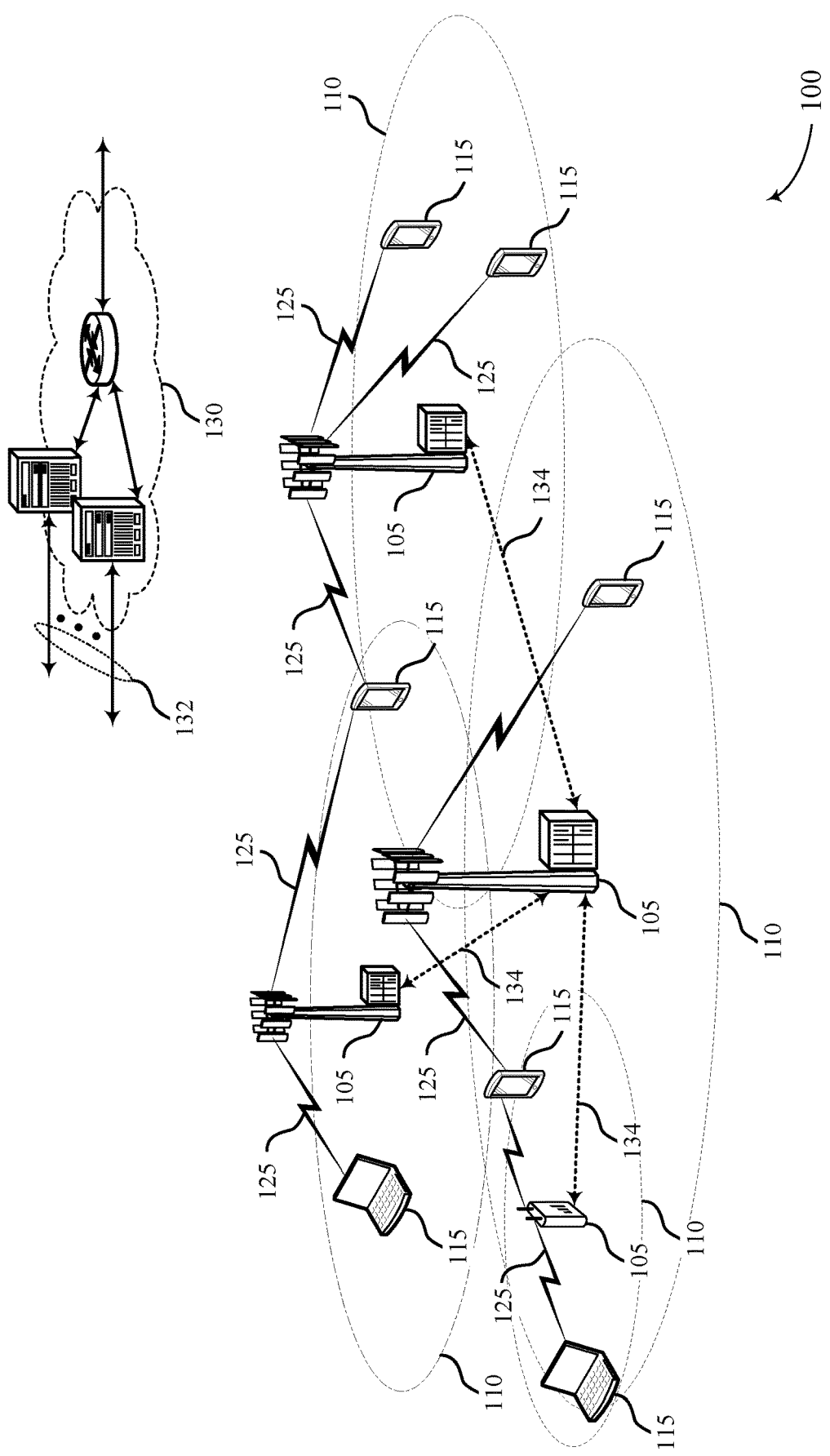
FIG. 1 illustrates an example of a wireless communications system that supports patterns for reference signals used for positioning in a wireless communications system in accordance with aspects of the present disclosure.

In some wireless communications systems, it a wireless device may estimate (determine, identify) its position or geographic location (e.g., to use for navigation). Accordingly, in such systems, a first wireless device may perform measurements on reference signals received from a second wireless device to estimate its position or geographic location (e.g., the position or geographic location of the first wireless device). Such reference signals may include positioning reference signals (PRSs), channel state information reference signals (CSI-RSs), tracking reference signals (TRSs), sounding reference signals (SRSs), or physical random access channel (PRACH) reference signals, and the second wireless device may transmit the reference signals used for positioning based on a comb level configured for the reference signals (e.g., every sixth symbol for a comb level of six).

In some aspects, the second wireless device may transmit the reference signals used for positioning based on a fixed, staircase pattern, where reference signals are mapped to adjacent frequency tones in consecutive symbols. In some cases, however, if consecutive symbols allocated for transmitting reference signals used for positioning are punctured for another transmission (e.g., a low latency transmission), the reference signals may not be transmitted on multiple, adjacent frequency tones, which may limit the frequency diversity of the reference signal transmission. In addition, if a pattern for transmitting reference signals used for positioning is fixed, a transmitting device may not be able to adapt to varying conditions in a wireless communications system (e.g., different resource allocations for transmitting reference signals used for positioning in different instances).

As described herein, a wireless device may support techniques for determining a suitable pattern for transmitting reference signals used for positioning on allocated resources. In particular, the pattern may be used to assign the reference signals to frequency tones across multiple symbols such that the frequency tones to which the reference signals are mapped in at least two consecutive symbols are non-adjacent (e.g., separated by at least one frequency tone). In some cases, a wireless device may determine the pattern used to assign reference signals used for positioning autonomously (e.g., based on configured algorithms or a look-up table), and, in other cases, a wireless device (e.g., a user equipment (UE)) may determine the pattern used to assign reference signals used for positioning based on a configuration received from another wireless device (e.g., a base station).

Aspects of the disclosure introduced above are described below in the context of a wireless communications system. Examples of processes and signaling exchanges that support patterns for reference signals used for positioning in a wireless communications system are then described. Aspects of the disclosure are further illustrated by and described with reference to apparatus diagrams, system diagrams, and flowcharts that relate to patterns for reference signals used for positioning in a wireless communications system.

FIG. 1 illustrates an example of a wireless communications system 100 that supports patterns for reference signals used for positioning in a wireless communications system in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles (e.g., automobile, bicycle, etc.), meters, wearables (e.g., watches, glasses, clothing, shoes, jewelry, head mounted displays), home devices (e.g., locks, lights, displays), video/audio devices (e.g., televisions, speakers, etc.), health diagnostic devices, therapeutic devices or the like.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing.

The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In wireless communications system 100 (e.g., which may be an example of a low frequency FR1 system or a high frequency FR2 system), a wireless device may be configured to identify its position or geographic location (e.g., to use for navigation) based on reference signals received from another wireless device.

Figure 2:
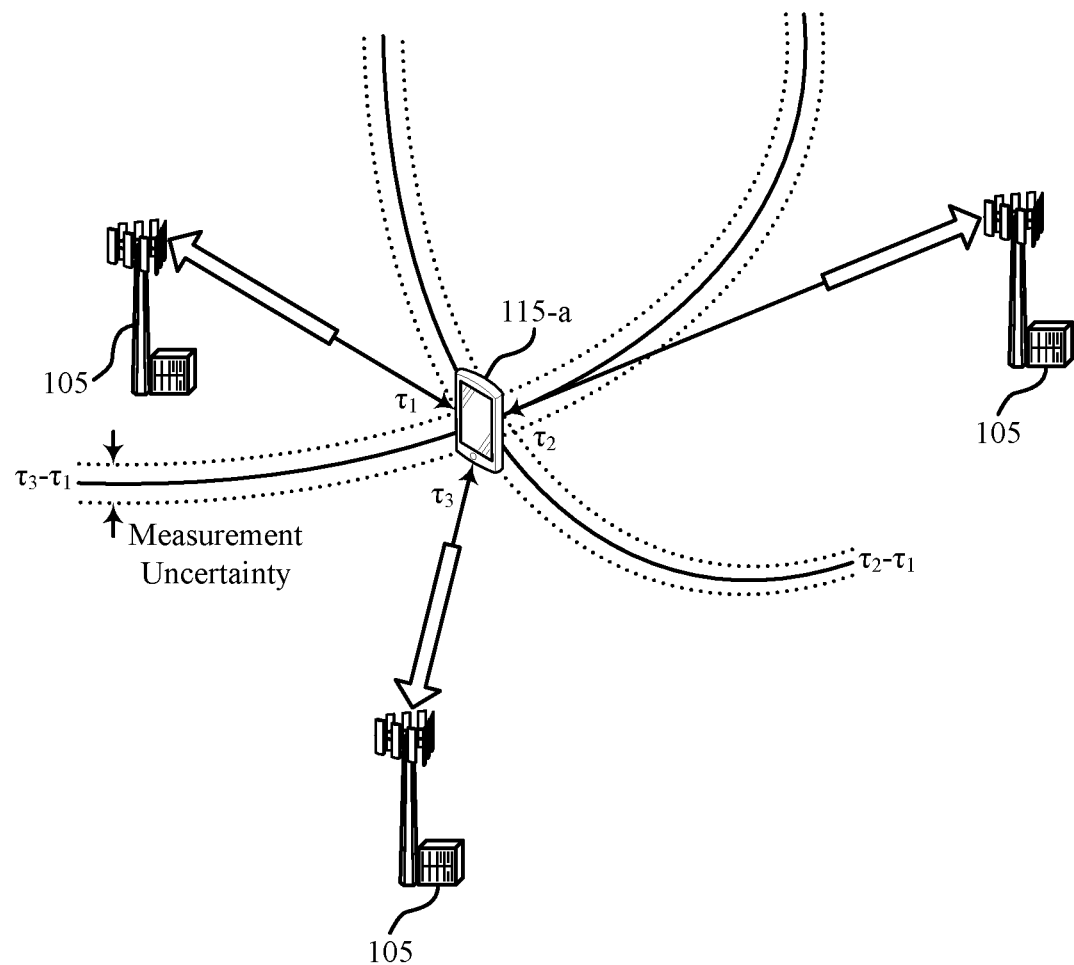
FIG. 2 illustrates an example of multi-lateral positioning based on reference signals in accordance with aspects of the present disclosure.

FIG. 2 illustrates an example of multi-lateral positioning 200 based on reference signals in accordance with aspects of the present disclosure. In the example of FIG. 2, a UE 115 may receive PRSs from base stations 105 (e.g., downlink reference signals from multiple cells), and the UE may measure a reference signal time difference (RSTD) or an observed time difference of arrival (OTDOA) of the reference signals (e.g., with respect to a reference cell) and use these measurements to determine the position or geographic location of the UE. In some implementations, the RSTD may be calculated as follows:

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1)$$

Transmit/receive beamforming at a base station or a UE may enable wideband transmissions to cell edge UEs for increased precision, and beam refinements may also leverage channel reciprocity procedures (e.g., in NR). Further, though FIG. 2 illustrates an example of multi-lateral positioning at a UE based on RSTDs of multiple cells, in other examples, a base station may perform multi-lateral positioning based on uplink reference signals (e.g., SRSs) from UE 115-a (e.g., based on uplink time difference of arrival (UTDOA) measurements).

Figure 3:
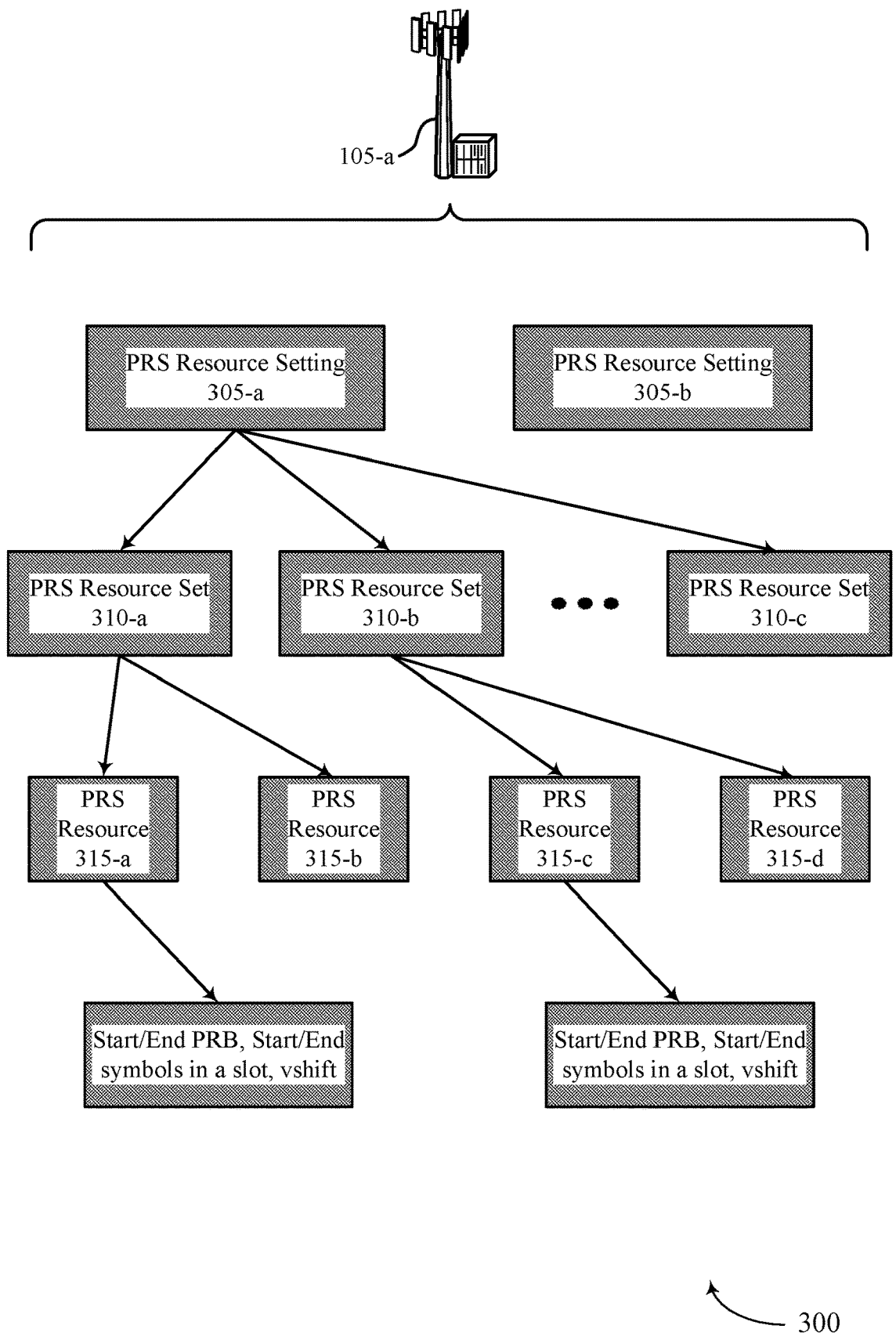
FIG. 3 illustrates an example of a configuration for transmitting reference signals used for positioning in accordance with aspects of the present disclosure.

FIG. 3 illustrates an example of a configuration 300 for transmitting reference signals used for positioning in accordance with aspects of the present disclosure. As illustrated in FIG. 3, a base station 105-a (or other transmitting device, such as a UE 115) may be configured with PRS resource settings 305-a and 305-b each indicating a periodicity, comb level, etc. for PRS transmissions from the transmitting device. Each PRS resource setting may be associated with PRS resource sets which may each be used to transmit PRSs with a particular transmit beam. For instance, PRS resource setting 305-a may be associated with PRS resource sets 310-a, 310-b, . . . , and 310-c, which may each be used to transmit PRSs with a transmit beam 1, transmit beam 2, . . . , and transmit beam $N_{Tx,B}$ respectively. In addition, each PRS resource set may be associated with PRS resources, where a receiving device may receive a PRS on each PRS resource with a particular receive beam. For instance, a receiving device may receive PRSs transmitted on PRS resources 315-a, . . . , and 315-b using a receive beam 1, . . . , and a receive beam $N_{Rx,B}$ respectively. Similarly, a receiving device may receive PRSs transmitted on PRS resources 315-c, . . . , and 315-d using a receive beam 1, . . . , and a receive beam $N_{Rx,B}$ respectively.

Each initial PRS resource in a PRS resource set (e.g., PRS resource 315-a and PRS resource 315-c) may include a PRS transmitted on a port within a slot, where a periodicity of the transmission and a slot offset may be configured. For instance, the transmitting device may be configured with a starting and ending physical resource block (PRB), a starting and ending symbol, and a value (e.g., vshift) which may indicate the specific resource element of the initial PRS resource (e.g., offset from the configured starting PRB and starting symbol). After identifying the configuration, the base station 105-a may transmit PRSs on PRS resources within PRS resource sets associated with PRS resource settings. A UE 115 may then receive the PRSs and may perform measurements on the PRSs to determine the position of the UE. In some cases, the UE 115 report a time of arrival (TOA), an RSTD, a reference signal received power (RSRP), an angle, a UE receive or transmit beam, a reference signal signal-to-interference-plus-noise ratio, a reference signal received quantity (RSRQ), or any combination thereof based on the received PRSs. The report may be for each PRS resource, PRS resource set, PRS resource setting, or each base station 105.

Thus, as described with reference to FIG. 2 and FIG. 3, a first wireless device may perform measurements on reference signals received from a second wireless device to identify its position (e.g., the position of the first wireless device). In some aspects, the second wireless device may transmit the reference signals based on a comb level configured for the reference signals (e.g., every sixth symbol for a comb level of six).

Figure 4:
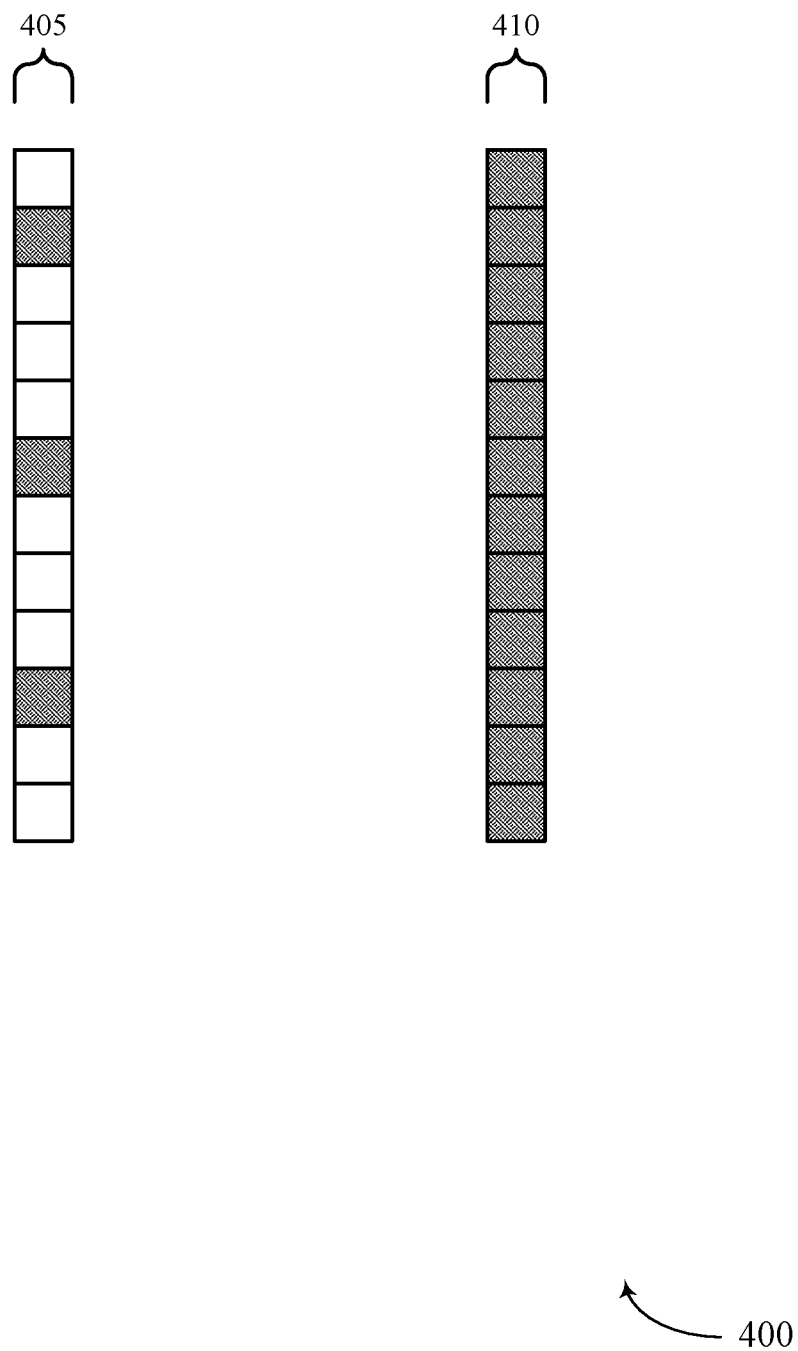
FIG. 4 illustrates an example of reference signals transmitted with a comb level of four in accordance with aspects of the present disclosure.

FIG. 4 illustrates an example of reference signals 400 transmitted with a comb level 405 of four (e.g., every fourth symbol) in accordance with aspects of the present disclosure. In some cases, however, if a comb level is used for transmitting reference signals, and the frequency gap between reference signals is large (e.g., above a threshold), a receiving device may experience aliasing. In the example of FIG. 4, the aliasing of a comb-4 pattern (e.g., without additional symbols with staggering) may result in an increase of a 90% percentile distance error from approximately 2.3 m to 4.3 m with no significant change in the 50% percentile distance error (e.g., compared to a reference signal transmission with a comb level 410 of one). To correct the aliasing error described with reference to FIG. 4, the second wireless device may transmit the reference signals used for positioning based on a fixed, staircase pattern, where reference signals are mapped to adjacent frequency tones in consecutive symbols. In some cases, however, if consecutive symbols allocated for transmitting reference signals used for positioning are punctured for another transmission (e.g., a low latency transmission), the reference signals may not be transmitted on multiple, adjacent frequency tones.

As a result, there may be a large frequency gap between reference signals used for positioning, which may limit the frequency diversity of the reference signal transmission and potentially result in the aliasing error described with reference to FIG. 4. In addition, if the pattern for transmitting reference signals used for positioning is fixed, a transmitting device may not be able to adapt to varying conditions in a wireless communications system. For instance, if five or three symbols are allocated for a reference signal transmission with a comb level of four, the transmitting device may not be able to determine a pattern for transmitting the reference signals. Further, if resource allocations for transmitting reference signals used for positioning are divided in time, the transmitting device may not be able to determine a pattern for transmitting the reference signals on resources across different sets or in a different occasion of a same resource. In wireless communications system, a wireless device may support techniques for determining a suitable pattern for transmitting reference signals used for positioning on allocated resources.

Figure 5:
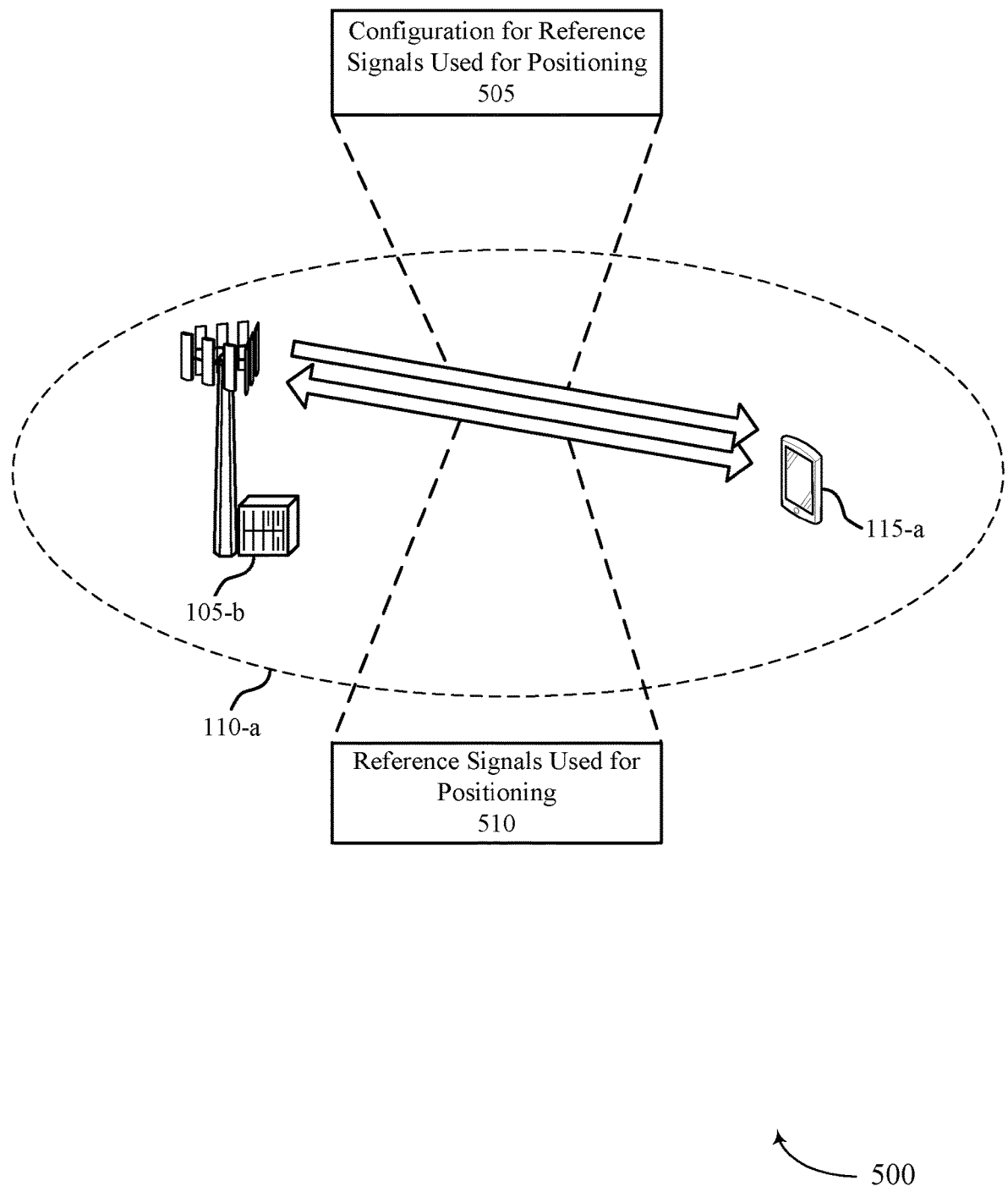
FIG. 5 illustrates an example of a wireless communications system that supports patterns for reference signals used for positioning in a wireless communications system in accordance with aspects of the present disclosure.

FIG. 5 illustrates an example of a wireless communications system 500 that supports patterns for reference signals used for positioning in a wireless communications system in accordance with aspects of the present disclosure. Wireless communications system 500 includes base station 105-*b*, which may be an example of a base station 105 described with reference to FIGS. 1-4. Wireless communications system 500 included UE 115-*a*, which may be an example of a UE 115 described with reference to FIGS. 1-4. Base station 105-*a* may provide communication coverage for a geographical coverage area 110-*a*, which may be an example of a coverage area 110 described with reference to FIG. 1. Wireless communications system 500 may implement aspects of wireless communications system 100. For instance, base station 105-*b* and UE 115-*a* in wireless communications system 500 may support techniques for determining a suitable pattern for transmitting reference signals used for positioning on allocated resources.

Specifically, the pattern may be used to assign the reference signals to frequency tones across multiple symbols such that the frequency tones to which the reference signals are mapped in at least two consecutive symbols are non-adjacent (e.g., separated by at least one frequency tone). For instance, the pattern may assign the reference signals to frequency tones as uniformly as possible such that frequency tones occupied in consecutive symbols are separated as much as possible given the frequency tones already used. In some cases, base station 105-*b* and UE 115-*a* may autonomously determine the pattern used to assign reference signals used for positioning to frequency tones across multiple symbols (e.g., based on configured algorithms or a look-up table). In other cases, a UE 115-*a* may determine the pattern used to assign reference signals used for positioning to frequency tones across multiple symbols based on a configuration 505 received from base station 105-*b*.

In some examples, if the UE 115-*a* is configured to determine the pattern used to assign reference signals used for positioning to frequency tones across multiple symbols based on a configuration 505, base station 105-*b* may transmit an explicit indication of the pattern in the configuration 505. For instance, the base station 105-*b* may transmit an explicit indication of the sequence of offsets that represents the pattern used to assign the reference signals used for positioning to resources. In other examples, the base station 105-*b* may transmit an indication of a default sequence of offsets that represents the pattern used to assign reference signals used for positioning to resources. In such examples, the base station 105-*b* may transmit an indication of a sequence with a single value (e.g., {0}) indicating that either the comb offset of zero is to be used for transmitting a reference signal used for positioning or a default comb offset sequence is used to transmit reference signals used for positioning (e.g., starting from the configured comb offset). In some aspects, (e.g., for a relatively small) comb level (e.g., value of N), look-up tables accessible by a wireless device may be defined with sequences of comb offsets (e.g., such that the UE 115-*a* may determine which comb offset to select for different comb levels (e.g., value of N) and different initial comb offset values.

Once base station 105-*b* and UE 115-*a* determines the pattern, the base station 105-*b* and UE 115-*a* may exchange reference signals used for positioning based on the pattern. For example, base station 105-*b* may transmit PRSs to UE 115-*a* on particular resource elements in a set of resources based on the pattern, and the UE 115-*a* may identify the resource elements used to transmit the PRSs based on the pattern before performing measurements on the PRSs to determine its position. Similarly, UE 115-*aa* may transmit SRSs to base station 105-*b* on particular resource elements in a set of resources based on the pattern, and the base station 105-*b* may identify the resource elements used to transmit the SRSs based on the pattern before performing measurements on the SRSs to determine its position.

Figure 6:
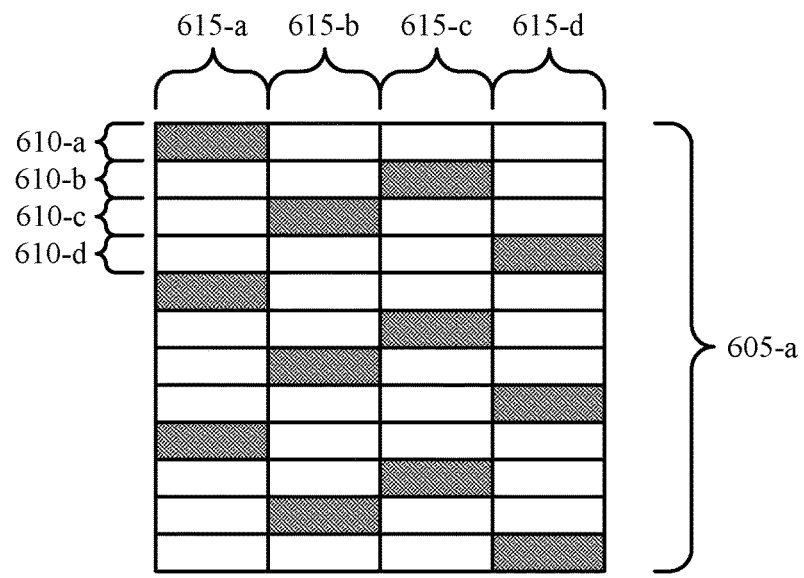
FIG. 6 illustrates examples of patterns used to transmit reference signals used for positioning in accordance with aspects of the present disclosure.
Figure 6:
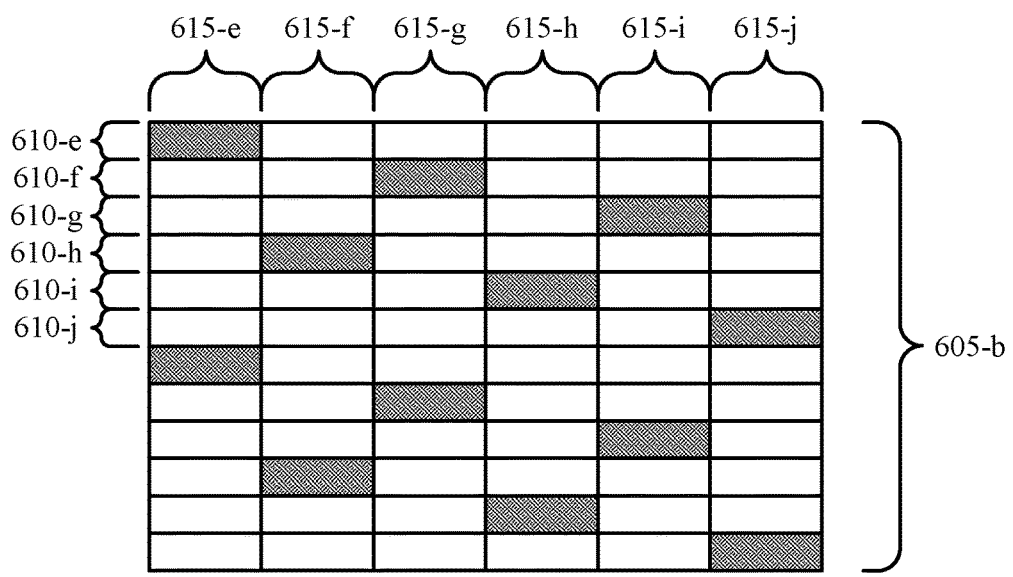

FIG. 6 illustrates examples of patterns 600 used to transmit reference signals used for positioning in accordance with aspects of the present disclosure.

In example pattern 600-*a*, a wireless device may identify the set of resources 605-*a* on which to transmit reference signals used for positioning based on a starting PRB, a starting symbol, and a vshift value that indicates an offset from the starting PRB and the starting symbol to the first frequency tone 610-*a* and the first symbol 615-*a* of the set of resources 605-*a*. The wireless device may then determine that a comb level of four is to be used for transmitting the reference signals used for positioning. Based on the determined comb level of four, the wireless device may determine a pattern for the set of resources that may be used to assign the reference signals to resource elements (e.g., frequency tone and symbol combinations) in the set of resources 605-*a*. In particular, for each symbol, the wireless device may determine a comb offset (e.g., measured from the first frequency tone 610-*a*) which may correspond to the frequency tone within which the wireless device may transmit a reference signal in the symbol (e.g., where a comb offset of zero corresponds to the first frequency tone 610-*a* and a comb offset of two corresponds to the third frequency tone 610-*c*).

As described with reference to FIG. 5, the pattern may include an assignment of reference signals to the set of resources 605-*a* such that the frequency tones to which the reference signals are mapped in at least two consecutive symbols are non-adjacent. In example pattern 600-*a*, a reference signal may be mapped to a first frequency tone 610-*a* in a first symbol 615-*a*, a third frequency tone 610-*c* in a second symbol 615-*b*, a second frequency tone 610-*b* in a third symbol 615-*c*, and a fourth frequency tone 610-*d* in a fourth symbol 615-*d*. That is, the sequence of comb offsets that represent the pattern used to map reference signals to the set of resources 605-*a* may be {0, 2, 1, 3}. Thus, reference signals may be mapped to non-adjacent frequency tones 610-*a* and 610-*c* in consecutive symbols 615-*a* and 615-*b*, and reference signals may be mapped to non-adjacent frequency tones 610-*b* and 610-*d* in consecutive symbols 615-*c* and 615-*d*.

In example pattern 600-*b*, a wireless device may also identify the set of resources 605-*b* on which to transmit reference signals used for positioning based on a starting PRB, a starting symbol, and a vshift value that indicates an offset from the starting PRB and the starting symbol to the first frequency tone 610-*e* and the first symbol 615-*e* of the set of resources 605-*b*. The wireless device may then determine that a comb level of six is to be used for transmitting the reference signals used for positioning. Based on the determined comb level of six, the wireless device may determine a pattern for the set of resources that may be used to assign the reference signals to resource elements (e.g., frequency tone and symbol combinations) in the set of resources 605-*b*. In particular, for each symbol, the wireless device may determine a comb offset (e.g., measured from the first frequency tone 610-*e*) which may correspond to the frequency tone within which the wireless device may transmit a reference signal in the symbol (e.g., where a comb offset of zero corresponds to the first frequency tone 610-*a* and a comb offset of two corresponds to the third frequency tone 610-*c*).

As described with reference to FIG. 5, the pattern may include an assignment of reference signals to the set of resources 605-*b* such that the frequency tones to which the reference signals are mapped in at least two consecutive symbols are non-adjacent. In example pattern 600-*b*, a reference signal may be mapped to a first frequency tone 610-*e* in a first symbol 615-*e*, a fourth frequency tone 610-*h* in a second symbol 615-*f*, a second frequency tone 610-*f* in a third symbol 615-*g*, a fifth frequency tone 610-*i* in a fourth symbol 615-*h*, a third frequency tone 610-*g* in a fifth symbol 615-*i*, and a sixth frequency tone 610-*j* in a sixth symbol 610-*j*. That is, the sequence of comb offsets that represent the pattern used to map reference signals to the set of resources 605-*b* may be {0, 3, 1, 4, 2, 5}. Thus, for a comb level of six and all comb levels greater than four, reference signals may be mapped to non-adjacent frequency tones in any group of two consecutive symbols (e.g., non-adjacent frequency tones 610-*e* and 610-*g* in consecutive symbols 615-*e* and 615-*f* in the set of resources 605-*b*).

In accordance with the examples described above, a pattern used to transmit reference signals used for positioning on a set of resources may assign the reference signals to the set of resources such that there is separation (e.g., at least one frequency tone) between frequency tones to which reference signals are mapped in consecutive symbols. As mentioned above, the pattern may be represented by a sequence of offsets, where each value in the sequence corresponds to a frequency tone to which a reference signal is mapped in a symbol. In some cases, regardless of whether the pattern or the sequence of offsets that represent the pattern is determined based on internal calculations at a wireless device, based on accessing a look-up table, or based on an indication received from another wireless device, the pattern or the sequence of offsets that represent the pattern may be determined or derived based on an algorithm.

In one example, for a comb level of $N=2^k$ (e.g., a power of two), the sequence of comb offsets may be chosen according to a bit-reversal permutation. The bit-reversal permutation may be performed by reversing the binary representations of each number in a sequence of numbers from zero to one less than a comb level (e.g., where the binary representations of each number may be padded such that each binary representation has the same length (k)). A decimal value corresponding to each reversed binary representation may then be determined, and the sequence of comb offsets may be equal to the sequence of these decimal values (e.g., where each value in the resulting sequence derived from a corresponding value in the original sequence is in a same position in the resulting sequence as the corresponding value in the original sequence). As an example, for a comb level of four, the binary representations of each number in a sequence of numbers from zero to three ({00, 01, 10, 11} with a length of k=2 may be reversed ({00, 10, 01, 11}), and the sequence of comb offsets may be equal to the sequence of the decimal values that correspond to the reversed binary representations ({0, 2, 1, 3}, in accordance with example pattern 600-*a*). For a comb level of eight and a binary representation length of k=3, the sequence of comb offsets may be equal to {0, 4, 2, 6, 1, 5, 3, 7}, and, for a comb level of sixteen and a binary representation length of k=4, the sequence of comb offsets may be equal to {0, 8, 4, 12, 2, 10, 6, 14, 1, 9, 5, 13, 3, 11, 7, and 15}.

In another example, for a comb level of $N \neq 2^k$ (e.g., different from a power of two), the comb level may be rounded up or down to a closest power of two, and the sequence of comb offsets may be chosen according to a bit-reversal permutation performed based on the rounded value. In this example, the bit reversal permutation may be performed by reversing the binary representations of each number in a sequence of numbers from zero to one less than the rounded value and determining a decimal value corresponding to each reversed binary representation. The sequence comb offsets may then be determined to include a subset of the sequence of decimal values that are below the value of the comb level or include the sequence of decimal values and other decimal values that are below the value of the comb level and are excluded from the sequence of decimal values. That is, if the comb level is rounded up, the sequence of comb offsets may be determined by removing values from the sequence of decimal values that are greater than or equal to the comb level (N−1), and, if the comb level is rounded down, the sequence of comb offsets may be determined by appending, to the sequence of decimal values, other values that are less than the comb level and are excluded from the sequence of decimal values as uniformly as possible (e.g., appending each other value between values with a smallest gap in the sequence).

As an example, if a comb level of six is rounded up to eight, and the sequence of decimal values determined based on performing bit reversal permutation is {0, 4, 2, 6, 1, 5, 3, 7}, the sequence of comb offsets may be determined by removing values from the sequence of decimal values that are greater than or equal to six (e.g., rejecting the out-of-bound entries), resulting in a sequence of offsets of {0, 4, 2, 1, 5, 3}. Alternatively, if a comb level of six is rounded down to four, and the sequence of decimal values determined based on performing bit reversal permutation is {0, 2, 1, 3}, the sequence of comb offsets may be determined by appending, to the sequence of decimal values, other values that are less than six and are excluded from the sequence of decimal values (i.e., {4, 5}) as uniformly as possible, resulting in a sequence of offsets of {0, 2, 4, 1, 3, 5}, if, for example, the other values are appended to the end of the sequence of decimal values. In some cases, the comb level may be rounded up if a closest higher power of two is closer to the comb level than a closest lower power of two, and the comb level may be rounded down if a closest lower power of two is closer to the comb level than a closest higher power of two.

In yet another example, for any comb level, the sequence of comb offsets may be chosen based on one or more circular buffers, where values that are furthest apart in the circular buffers are added as successive values in the sequence of comb offsets. In this example, the values zero to one less than the comb level may be marked on a circle or added to a circular buffer, and a first comb offset may be selected (e.g., f(0)=0), where all later f(i) values (e.g., values in the sequence of comb offsets, where f(0) corresponds to a first value in the sequence, f(1) corresponds to a second value in the sequence, etc.) are shifted circularly by the first comb offset (e.g., such that the first comb offset is a first value in the circular buffer). A value furthest away from the first comb offset on the circle or in the circular buffer is then selected as a next value in the sequence of comb offsets. For instance, with a reference of the start and end of the current circular portion including all the values from zero to one less than the comb level, a floor or ceiling operation is performed on the size of the circle or circular buffer to determine the next value in the sequence of comb offsets.

The circle or circular buffer is then segmented into two with a first circle or circular buffer including the values from f(0) through to f(1) (e.g., not including f(1)) and a second circle or circular buffer including the values from f(1) back to f(0) (e.g., not including f(0)), where each segmented circle or circular buffer includes the same number of values or one circle or circular buffer includes one less value than the other. The midpoint of the first circle or circular buffer is then selected as a next value in the sequence of comb offsets (i.e., f(2)) by performing a floor or ceiling operation on the size of the first circle or circular buffer, and the midpoint of the second circle or circular buffer is then selected as a next value in the sequence of comb offsets (i.e., f(3)) by performing a floor or ceiling operation on the size of the second circle or circular buffer.

The remaining circles or circular buffers are then segmented into four circles or circular buffers, with a first circle or circular buffer including the values from f(0) to f(2) (e.g., not including f(2)), a second circle or circular buffer including the values from f(2) to f(1) (e.g., not including f(1)), a third circle or circular buffer including the values from f(1) to f(3) (e.g., not including f(3)), and a fourth circle or circular buffer including the values from f(3) back to f(0) (e.g., not including f(0)). The midpoint of the first circle or circular buffer is then selected as a next value in the sequence of comb offsets (i.e., f(4)=f(0)–f(2) midpoint) by performing a floor or ceiling operation on the size of the first circle or circular buffer, the midpoint of the second circle or circular buffer is then selected as a next value in the sequence of com offsets (i.e., f(5)=f(1)–f(3) midpoint) by performing a floor or ceiling operation on the size of the second circle or circular buffer, the midpoint of the third circle or circular buffer is then selected as a next value in the sequence of com offsets (i.e., f(6)=f(2)–f(1) midpoint) by performing a floor or ceiling operation on the size of the third circle or circular buffer, and the midpoint of the fourth circle or circular buffer is then selected as a next value in the sequence of com offsets (i.e., f(7)=f(3)–f(0) midpoint) by performing a floor or ceiling operation on the size of the second circle or circular buffer. In some examples, following the bit-reversal techniques described above, the midpoint values are picked based on performing the bit-reversal.

The remaining circles or circular buffers are then recursively segmented until each segmented circle or circular buffer includes one value (e.g., a size of each segmented circular buffer is equal to one) and/or until all values in the original circle or circular buffer are included in the sequence of offsets. Using these techniques, if the comb level is a power of two, the resulting sequence of offsets may be equal to the sequence of offsets produced by performing bit-permutation reversal as described above (e.g., all the midpoints of the circles or circular buffers are integers (i.e., a floor and ceiling operation performed on each of the sizes of the circles or circular buffers yield the same result). If, however, the comb level is not a power of two, there may be remaining circles or circular buffers with more than one value at a point when other circles or circular buffers include a single value. In such cases, no further segmentation is performed on the circles or circular buffers with one value, while other circles or circular buffers are recursively segmented until these circles or circular buffers include a single value. In some cases, the determination to perform a floor or ceiling operation may be based on previous choices (e.g., alternating pattern of floor and ceiling operations, etc.)

Using any of the algorithms described above, a wireless device may determine a pattern for transmitting reference signals used for positioning on a set of resources such that there is separation (e.g., at least one frequency tone) between frequency tones to which reference signals are mapped in consecutive symbols. Accordingly, if the set of resources used for transmitting the reference signals are punctured for another transmission (e.g., a low latency transmission), there may not be a large gap between frequency tones used to transmit the reference signals.

Figure 7:
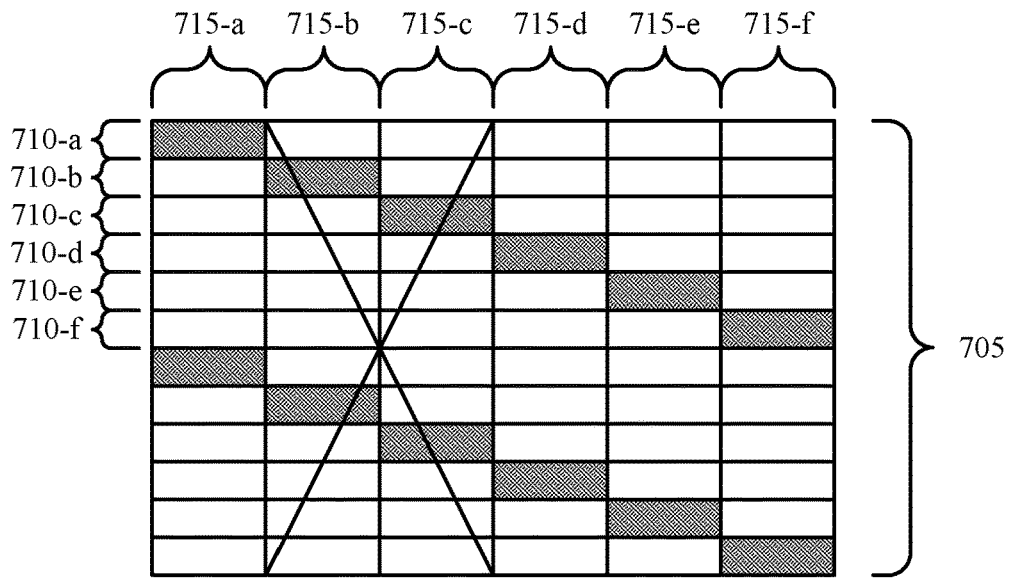
FIGS. 7 and 8 illustrate the results of puncturing sets of resources allocated for reference signals used for positioning when different patterns are used to transmit reference signals in accordance with aspects of the present disclosure.
Figure 7:
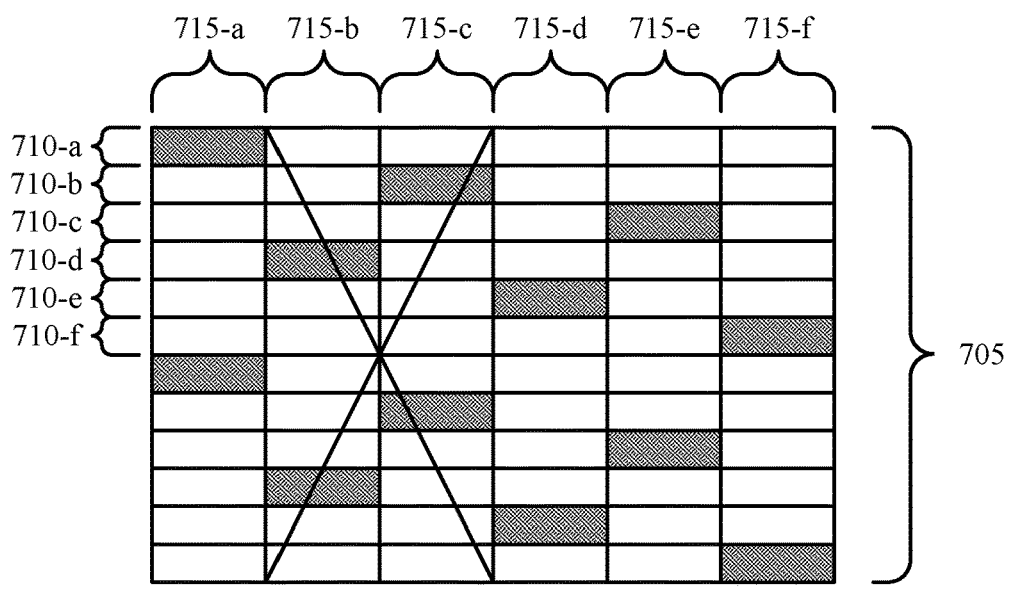
Figure 8:
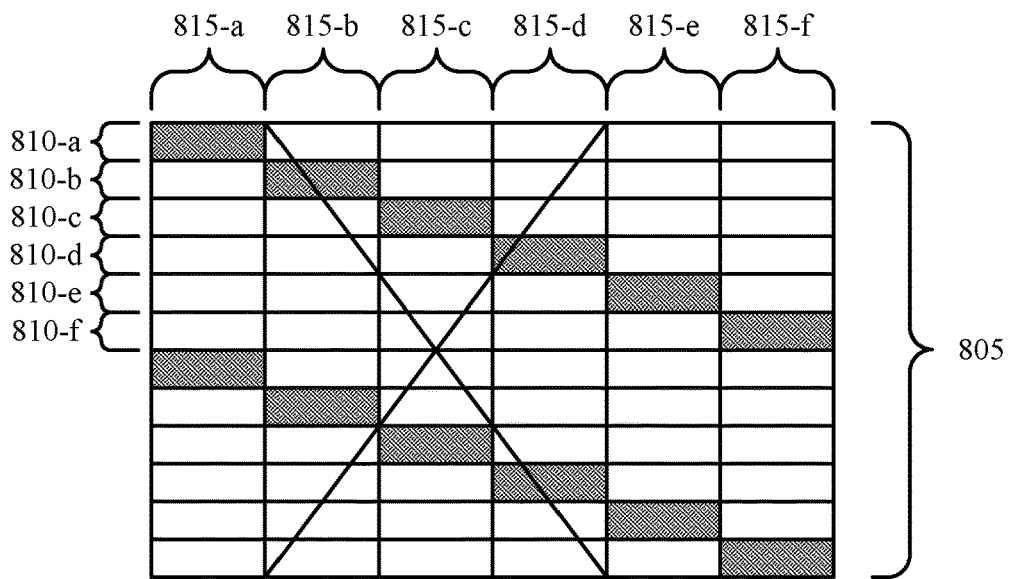
Figure 8:
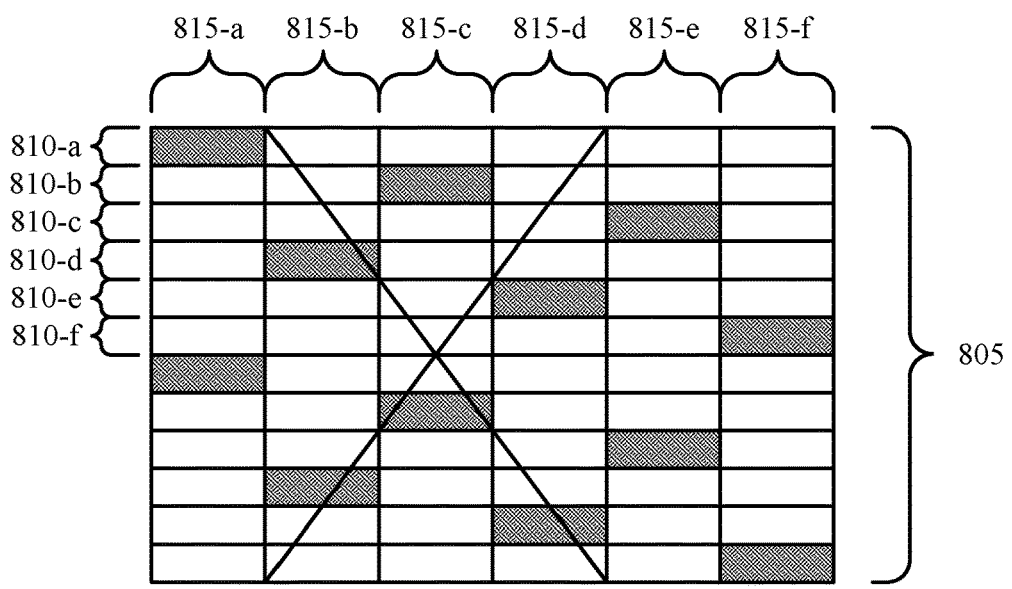

FIGS. 7 and 8 illustrate the results (e.g., in patterns 700 and 800) of puncturing sets of resources allocated for reference signals used for positioning when different patterns are used to transmit the reference signals (e.g., a staircase pattern versus a pattern derived using the techniques described herein).

In the example of FIG. 7, a second symbol 715-*b* and a third symbol 715-*c* in a set of resources 705 allocated for transmitting reference signals used for positioning may be punctured for (or may collide with) another transmission (e.g., a low latency transmission). As a result, in example pattern 700-a, a wireless device may transmit reference signals on frequency tones 710-a, 710-d, 710-e, and 710-f in symbols 715-a, 715-d, 715-e, and 715-f, and there may be no reference signals transmitted on frequency tones 710-b and 710-c. That is, there may be a gap of two frequency tones between reference signal transmissions in example pattern 700-a (e.g., two consecutive frequency tones may not be sampled). In example pattern 700-b, however, a wireless device may transmit reference signals on frequency tones 710-a, 710-c, 710-e, and 710-f. Thus, rather than a gap of two frequency tones, there may be a gap of one frequency tone between reference signal transmissions (e.g., the two punctured frequency tones may not be consecutive), resulting in increased frequency diversity and a lower chance for aliasing errors.

In the example of FIG. 8, a second symbol 815-b, a third symbol 815-c, and a fourth symbol 815-d in a set of resources 805 allocated for transmitting reference signals used for positioning may be punctured for (or may collide with) another transmission (e.g., a low latency transmission). As a result, in example pattern 800-a, a wireless device may transmit reference signals on frequency tones 810-a, 810-e, and 810-f in symbols 815-a, 815-e, and 815-f, and there may be no reference signals transmitted on frequency tones 810-b, 810-c, and 810-d. That is, there may be a gap of three frequency tones between reference signal transmissions in example pattern 800-a (e.g., three consecutive frequency tones may not be sampled). In example pattern 800-b, however, a wireless device may transmit reference signals on frequency tones 810-a, 810-c, and 810-f. Thus, rather than a gap of three frequency tones, there may be a gap of two frequency tones between reference signal transmissions (e.g., the three punctured frequency tones may not be consecutive), resulting in increased frequency diversity and a lower chance for aliasing errors.

As can be seen in the examples described with reference to FIGS. 7 and 8, by assigning reference signals to non-adjacent frequency tones in consecutive symbols, reference signal transmissions may be more robust. In some cases, however, resources allocated for transmitting reference signals used for positioning may be protected from puncturing, preemption, rate-matching, dropping, or de-prioritization (e.g., low-interference resources, such as a low-interference subframe). In such cases, a staircase pattern with a sequence of comb offsets in ascending order from zero to one less than the comb level may be used to assign reference signals used for positioning to resources (e.g., since such a pattern may be easier to derive). Thus, the pattern used to assign reference signals used for positioning to resources may be dynamic (e.g., may change depending on varying conditions, such as the resources allocated for transmitting the reference signals).

In some examples, the choice between the staircase pattern and the pattern described herein with reference signals mapped to non-adjacent frequency tones in consecutive symbols may be configured or may be implicit based on resources being declared as low-interference resources. Additionally, or alternatively, the comb offsets may be selected for a pattern that maps reference signals to non-adjacent frequency tones in consecutive symbols, but these comb offsets may be ordered differently. For example, the comb offsets may be ordered from lowest to highest in ascending order to produce the staircase pattern across time and frequency, which, as mentioned above, may be more natural or simple than other patterns (e.g., at least for the case of uniform stair-height across the pattern).

In the examples described above, consecutive symbols may be used to refer to physically consecutive symbols next to each other in a set of resources allocated for transmitting reference signals used for positioning. In other examples, however, consecutive symbols may refer to consecutive symbols in a pattern even if the symbols are not physical consecutive and next to each other in a set of resources. For instance, if a first offset in a comb offset sequence (e.g., with an index of n) is used to transmit a reference signal in a first symbol, and a second offset immediately the first offset in the comb offset sequence (e.g., with an index of n+1) is used to transmit a reference signal in a second symbol, the first symbol and the second symbol may be consecutive symbols. Such consecutive symbols may be used to transmit reference signals according to a determined pattern if the resources allocated for transmitting the reference signals are separated.

In some aspects, the offset used to determine the frequency tone on which to transmit a reference signal in a symbol may be determined based on indexing a comb offset sequence with a counter value (e.g., 0, 1, 2, 3, . . . , N−1 for a comb level of N). For instance, after first reference signal transmission, a wireless device may increment a counter value and may index a comb offset sequence with the incremented counter value to determine the frequency tone for a next reference signal transmission in a subsequent symbol. If the value of the counter exceeds the size of the comb offset sequence, the value used to index the comb offset sequence may be determined as the counter value modulo the size of the comb offset sequence (e.g., the sequence repeats from the beginning). Thus, if K symbols are allocated for transmitting reference signals used for positioning, a sequence of comb offsets of length M is configured for transmitting the reference signals, and M is less than K, the sequence of comb-offsets may be repeated from the beginning after M reference signal transmissions. For instance, for a comb level of six, a PRS resource with eight symbols (K=8), and a comb offset sequence of {0, 2, 4, 1, 3, 5}, the comb offsets used for reference signal transmissions may be {0, 2, 4, 1, 3, 5, 0, 2}.

In some cases, the counter described above may be associated with one or more PRS resources, one or more PRS resource sets (e.g., with all PRS resource sets of the same transmitting device sharing the same counter or having different counters), PRS resource setting, or a transmitting device. If the counter is associated with a PRS resource, the counter may be reset after every slot, after every resource occasion (e.g., transmission of a reference signal with a particular transmit beam that is received on a particular receive beam), after every frame, or after the PRS resource is reconfigured. If the counter is associated with a PRS resource set, the counter may be reset after the PRS resource set is reconfigured. If the counter is associated with a PRS resource setting, the counter may be reset when the PRS resource setting is reconfigured. And if the counter is associated with a PRS report configuration or setting, the counter may be rest when the PRS report configuration or setting is reconfigured.

Figure 9:
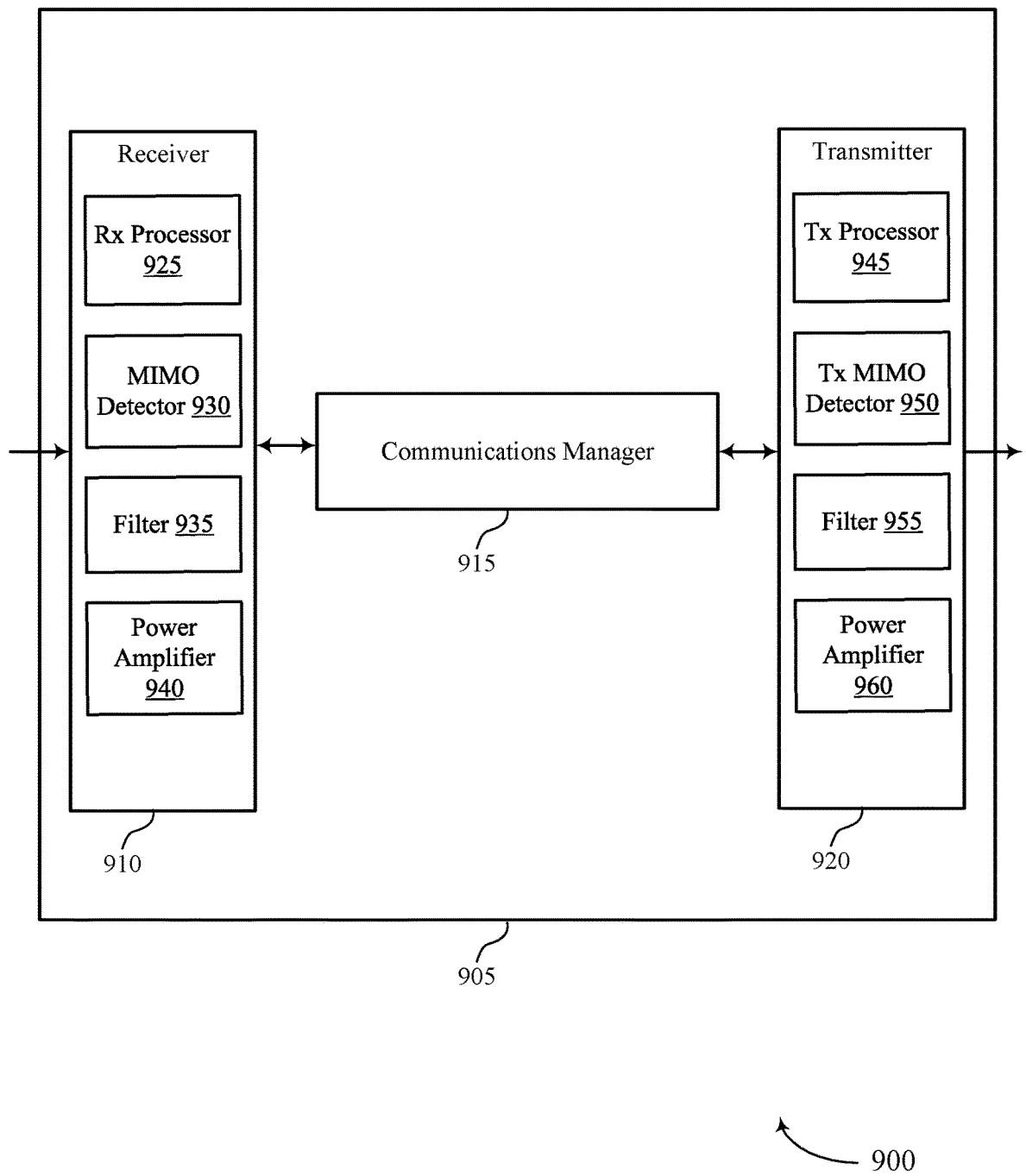
FIGS. 9 and 10 show block diagrams of devices that support patterns for reference signals used for positioning in a wireless communications system in accordance with aspects of the present disclosure.

FIG. 9 shows a block diagram 900 of a device 905 that supports patterns for reference signals used for positioning in a wireless communications system in accordance with aspects of the present disclosure. The device 905 may be an example of aspects of a UE 115 or base station 105 as described herein. The device 905 may include a receiver 910, a communications manager 915, and a transmitter 920. The device 905 may also include a processor. Each of these components may be in communication with one another (e.g., via one or more buses).

The receiver 910 may include an Rx processor 925, a MIMO detector 930, a filter 935, and a power amplifier 940. The receiver 910 may receive information such as packets, user data, or control information associated with various information channels (e.g., control channels, data channels, and information related to group delay timing accuracy for positioning in NR, etc.). Information may be passed on to other components of the device 905. The receiver 910 may be an example of aspects of the transceiver 1220 or 1320 as described with reference to FIGS. 12 and 13. The receiver 910 may utilize a single antenna or a set of antennas. Each of these sub-components of the receiver 910 may be in communication with one another (e.g., via one or more buses). The receiver 910, or its sub-components, may be physically located at various positions, including being distributed such that portions of functions are implemented at different physical locations by one or more physical components. In some examples, the receiver 910, or its sub-components, may be a separate and distinct component in accordance with various aspects of the present disclosure.

The receiver 910 may receive signals from a wireless device and may provide the received signals to one or more demodulators (not shown). In some cases, the demodulator may be included in the Rx processor 925. A demodulator may condition (e.g., filter, amplify, downconvert, and digitize) a respective received signal to obtain input samples, and process the input samples (e.g., for OFDM, etc.) to obtain received symbols. A MIMO detector 920 may obtain received symbols from all the Rx processor 925, perform MIMO detection on the received symbols if applicable, and provide detected symbols. The Rx processor 925 may further process (e.g., demodulate, deinterleave, and decode) the detected symbols, providing decoded data for a receiving device to a data output, and providing decoded control information to the communications manager 915.

The communications manager 915 may determine a pattern for a set of time-frequency resources that includes a set of symbols and a set of frequency tones, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, map the reference signals to a subset of the set of time-frequency resources based on the pattern, and transmit the reference signals via the subset of the set of time-frequency resources.

The communications manager 915 may also receive a set of reference signals used for positioning via a subset of a set of time-frequency resources, where the set of time-frequency resources includes a set of symbols and a set of frequency tones, identify the set of reference signals based on a pattern for the set of time-frequency resources, where the pattern comprises an assignment of reference signals to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, decode the reference signals, and estimate a location of the receiving device based on the decoded reference signals.

The communications manager 915 may also determine a pattern for a set of time-frequency resources that includes a set of symbols and a set of frequency tones, where the pattern includes an assignment of a set of reference signals used for positioning to frequency tones for a subset of the set of symbols, map the set of reference signals to a subset of the set of time-frequency resources based on at least partially repeating the pattern across the set of symbols, and transmit the set of reference signals via the subset of the set of time-frequency resources.

The communications manager 915 may also receive a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols, identify the set of reference signals based on at least partially repeating the pattern across the set of symbols, decode the set of reference signals, and estimate a location of the receiving device based on the decoded reference signals. The communications manager 915 may be an example of aspects of the communications manager 1210 or 1310 as described herein.

The actions performed by the communications manager 915 as described herein may be implemented to realize one or more potential advantages. One implementation may allow a wireless device to save power and increase battery life and improve user experience since the wireless device may be able to identify its position or geographic location sooner (e.g., since there may be less aliasing errors when resources allocated for transmitting reference signals used for positioning are punctured). Further, because the wireless device may be able to dynamically determine a pattern for transmitting or receiving reference signals used for puncturing, the wireless device may be able to adapt to changing conditions (e.g., varying resource allocations in different occasions). Additionally, because there may be smaller gaps between reference signals used for positioning when resources used to transmit these reference signals are punctured, a processor at communications manager 915 may experience fewer aliasing errors resulting in lower computational complexity at the processor.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a field programmable gate array (FPGA) or other programmable logic device, discrete gate or transistor logic, discrete hardware components, or any combination thereof designed to perform the functions described in the present disclosure. It may be understood that the communications manager 915, or its sub-components, may be implemented without a modem baseband or a processor. The communications manager 915, or its sub-components, may be implemented using a transceiver, a sensor core, an application processor, or any combination thereof. Additionally, or alternatively, one or more components included in the communications manager 915 may be implemented in the transceiver, the sensor core, the application processor, or any combination thereof.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or any combination thereof in accordance with various aspects of the present disclosure.

The transmitter 920 may include an Tx processor 945, a Tx MIMO detector 950, a filter 955, and a power amplifier 960. The transmitter 920 may transmit signals generated by other components of the device 905 (such as communications manager 915). In some examples, the transmitter 920 may be collocated with a receiver 910 in a transceiver module. For example, the transmitter 920 may be an example of aspects of the transceiver 1220 or 1320 as described with reference to FIGS. 12 and 13. The transmitter 920 may utilize one or more antennas. Each of these sub-components of the transmitter 920 may be in communication with one another (e.g., via one or more buses). The transmitter 920, or its sub-components, may be physically located at various positions, including being distributed such that portions of functions are implemented at different physical locations by one or more physical components. In some examples, the transmitter 920, or its sub-components, may be a separate and distinct component in accordance with various aspects of the present disclosure.

In some cases, the Tx processor 945 may receive and process data from a data source. In some cases, the data source may be a positioning reference signal transmitted from the communications manager 915. The Tx processor 945 may also generate reference symbols for the reference signal. The symbols from the Tx processor 945 may be precoded by a Tx MIMO processor. In some cases, the Tx MIMO processor may be included in the Tx processor 945. The symbols may then be transmitted to a base station.

Figure 10:
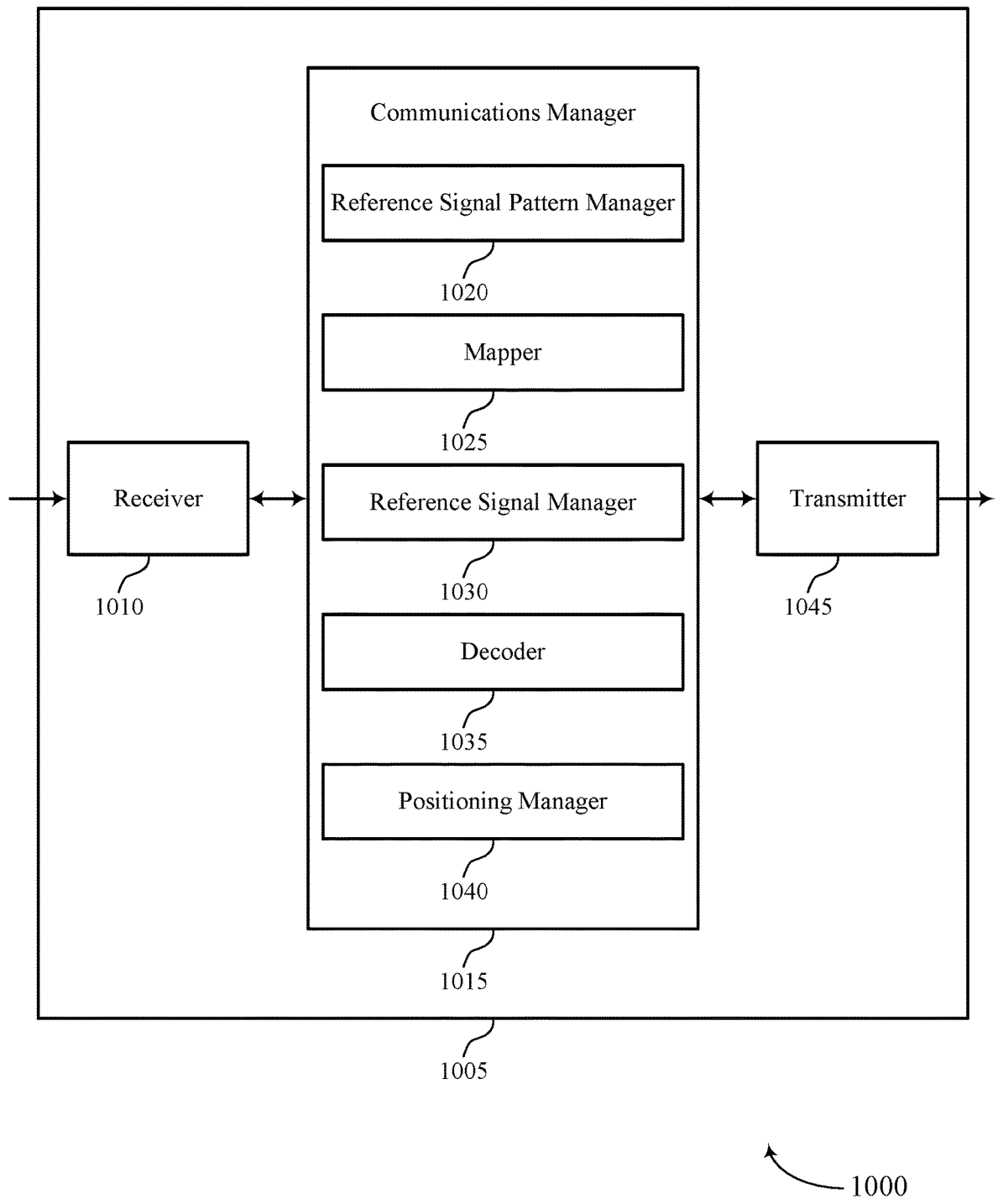

FIG. 10 shows a block diagram 1000 of a device 1005 that supports patterns for reference signals used for positioning in a wireless communications system in accordance with aspects of the present disclosure. The device 1005 may be an example of aspects of a device 905, a UE 115, or a base station 105 as described herein. The device 1005 may include a receiver 1010, a communications manager 1015, and a transmitter 1045. The device 1005 may also include a processor. Each of these components may be in communication with one another (e.g., via one or more buses).

Receiver 1010 may receive information such as packets, user data, or control information associated with various information channels (e.g., control channels, data channels, and information related to patterns for reference signals used for positioning in a wireless communications system, etc.). Information may be passed on to other components of the device 1005. The receiver 1010 may be an example of aspects of the transceiver 1220 or 1320 as described with reference to FIGS. 12 and 13. The receiver 1010 may utilize one or more antennas.

The communications manager 1015 may be an example of aspects of the communications manager 915 as described herein. The communications manager 1015 may include a reference signal pattern manager 1020, a mapper 1025, a reference signal manager 1030, a decoder 1035, and a positioning manager 1040. The communications manager 1015 may be an example of aspects of the communications manager 1210 or 1310 as described herein.

The reference signal pattern manager 1020 may determine a pattern for a set of time-frequency resources that includes a set of symbols and a set of frequency tones, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones. The mapper 1025 may map the reference signals to a subset of the set of time-frequency resources based on the pattern. The reference signal manager 1030 may transmit the reference signals via the subset of the set of time-frequency resources.

The reference signal manager 1030 may receive a set of reference signals used for positioning via a subset of a set of time-frequency resources, where the set of time-frequency resources includes a set of symbols and a set of frequency tones. The reference signal pattern manager 1020 may identify the set of reference signals based on a pattern for the set of time-frequency resources, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones. The decoder 1035 may decode the reference signals. The positioning manager 1040 may estimate a location of the receiving device based on the decoded reference signals.

The reference signal pattern manager 1020 may determine a pattern for a set of time-frequency resources that includes a set of symbols and a set of frequency tones, where the pattern includes an assignment of a set of reference signals used for positioning to frequency tones for a subset of the set of symbols. The mapper 1025 may map the set of reference signals to a subset of the set of time-frequency resources based on at least partially repeating the pattern across the set of symbols.

The reference signal manager 1030 may transmit the set of reference signals via the subset of the set of time-frequency resources. The reference signal manager 1030 may receive a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols. The reference signal pattern manager 1020 may identify the set of reference signals based on at least partially repeating the pattern across the set of symbols. The decoder 1035 may decode the set of reference signals. The positioning manager 1040 may estimate a location of the receiving device based on the decoded reference signals.

Transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 or 1320 as described with reference to FIGS. 12 and 13. The transmitter 1045 may utilize one or more antennas.

Figure 11:
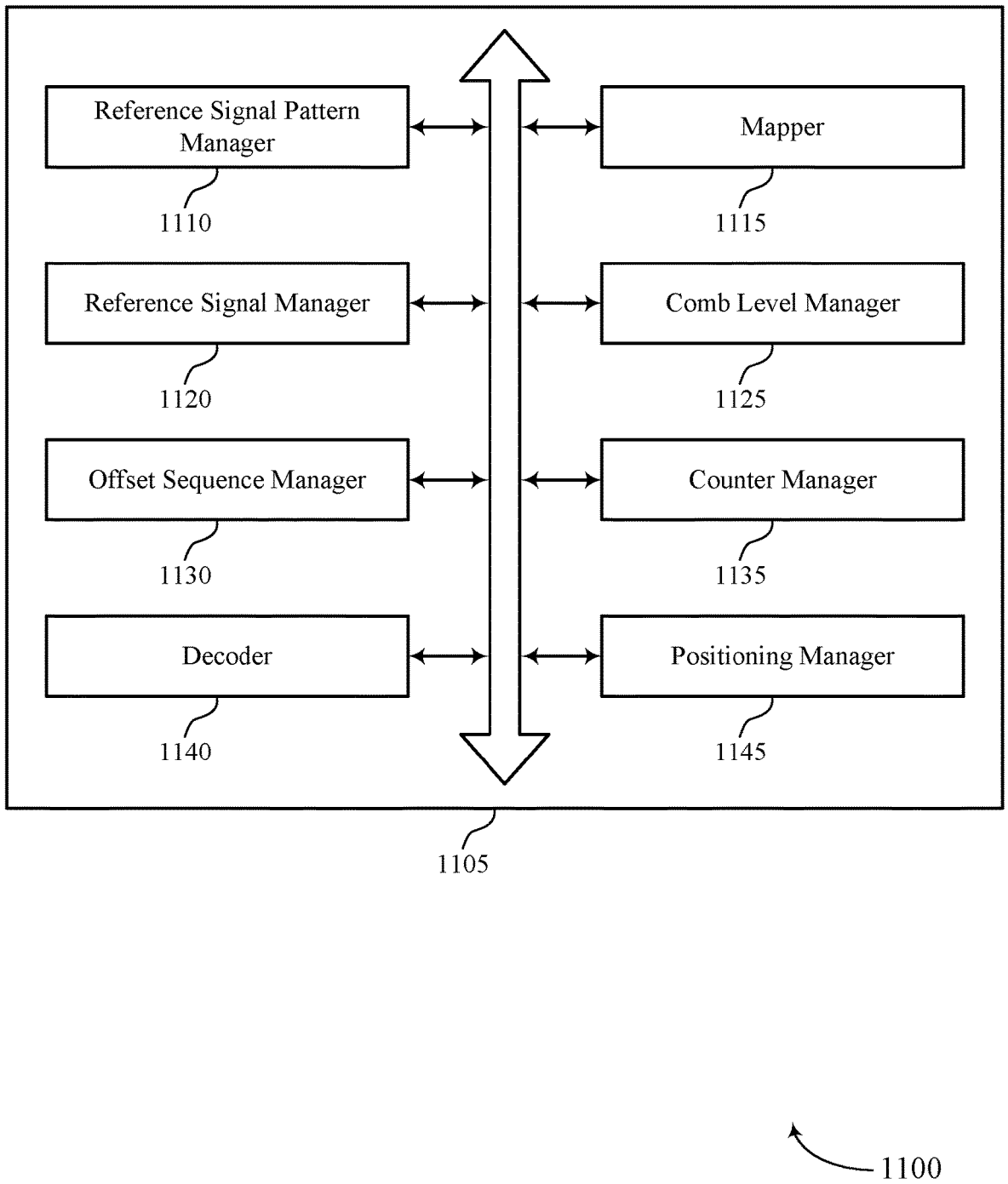
FIG. 11 shows a block diagram of a communications manager that supports patterns for reference signals used for positioning in a wireless communications system in accordance with aspects of the present disclosure.

FIG. 11 shows a block diagram 1100 of a communications manager 1105 that supports patterns for reference signals used for positioning in a wireless communications system in accordance with aspects of the present disclosure. The communications manager 1105 may be an example of aspects of a communications manager 915, a communications manager 1015, or a communications manager 1210 described herein. The communications manager 1105 may include a reference signal pattern manager 1110, a mapper 1115, a reference signal manager 1120, a comb level manager 1125, an offset sequence manager 1130, a counter manager 1135, a decoder 1140, and a positioning manager 1145. Each of these modules may communicate, directly or indirectly, with one another (e.g., via one or more buses).

The reference signal pattern manager 1110 may determine a pattern for a set of time-frequency resources that includes a set of symbols and a set of frequency tones, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones.

In some examples, the reference signal pattern manager 1110 may identify the set of reference signals based on a pattern for the set of time-frequency resources, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones.

In some examples, determining a pattern for a set of time-frequency resources that includes a set of symbols and a set of frequency tones, where the pattern includes an assignment of a set of reference signals used for positioning to frequency tones for a subset of the set of symbols. In some examples, the reference signal pattern manager 1110 may identify the set of reference signals based on at least partially repeating the pattern across the set of symbols. In some examples, the reference signal pattern manager 1110 may determine the pattern based on the sequence of offsets. In some examples, the reference signal pattern manager 1110 may determine the pattern based on referencing a look-up table with a comb level configured for transmitting the reference signals. In some examples, the reference signal pattern manager 1110 may receive, from a base station, an indication of a sequence of offsets used to determine the pattern.

In some examples, the reference signal pattern manager 1110 may determine to use a default pattern to assign the reference signals used for positioning to the set of time-frequency resources based on determining that the sequence of offsets includes one value. In some examples, the reference signal pattern manager 1110 may determine whether the set of time-frequency resources is protected from puncturing, preemption, rate-matching, dropping, or de-prioritization to facilitate transmissions on other physical channels. In some examples, the reference signal pattern manager 1110 may determine the pattern based on whether the set of time-frequency resources is protected. In some examples, the reference signal pattern manager 1110 may determine the pattern based on the sequence of offsets. In some examples, the reference signal pattern manager 1110 may determine the pattern based on referencing a look-up table with a comb level configured for the set of reference signals.

In some examples, the reference signal pattern manager 1110 may receive, from a base station, an indication of a sequence of offsets used to determine the pattern. In some examples, the reference signal pattern manager 1110 may determine to use a default pattern to assign the reference signals used for positioning to the set of time-frequency resources based on determining that the sequence of offsets includes one value. In some examples, the reference signal pattern manager 1110 may determine whether the set of time-frequency resources is protected from puncturing, preemption, rate-matching, dropping, or de-prioritization to facilitate transmissions on other physical channels. In some examples, the reference signal pattern manager 1110 may determine the pattern based on whether the set of time-frequency resources is protected. In some examples, the reference signal pattern manager 1110 may identify the set of reference signals based on partially repeating the pattern across the set of symbols.

In some examples, the reference signal pattern manager 1110 may determine the pattern based on the sequence of offsets. In some examples, the reference signal pattern manager 1110 may determine the pattern based on the sequence of offsets. In some cases, at least $\{0, 2, 1, 3\}$ for a configured comb level of four, at least $\{0, 3, 1, 4, 2, 5\}$ for a configured comb level of six, at least $\{0, 4, 2, 6, 1, 5, 3, 7\}$ for a configured comb level of eight, or at least $\{0, 8, 4, 12, 2, 10, 6, 14, 1, 9, 5, 13, 3, 11, 7, 15\}$ for a configured comb level of 16. In some cases, a value of a comb level configured for transmitting the reference signals is greater than four, and frequency tones to which reference signals are assigned in all groups of two consecutive symbols in the set of time-frequency resources are non-adjacent.

In some cases, the first set of frequency tones and the second set of frequency tones are uniformly spaced in frequency in the first symbol and the second symbol respectively based on a value of a comb level configured for transmitting the reference signals. In some cases, the first symbol and the second symbol are physically consecutive and consecutive in the pattern or the first symbol and the second symbol are consecutive in the pattern. In some cases, at least $\{0, 2, 1, 3\}$ for a configured comb level of four, at least $\{0, 3, 1, 4, 2, 5\}$ for a configured comb level of six, at least $\{0, 4, 2, 6, 1, 5, 3, 7\}$ for a configured comb level of eight, or at least $\{0, 8, 4, 12, 2, 10, 6, 14, 1, 9, 5, 13, 3, 11, 7, 15\}$ for a configured comb level of 16. In some cases, a value of a comb level configured for transmitting the reference signals is greater than four, and frequency tones to which reference signals are assigned in all groups of two consecutive symbols in the set of time-frequency resources are non-adjacent.

In some cases, the reference signals used for positioning are assigned to a first set of frequency tones within a first symbol of the set of time-frequency resources and to a second set of frequency tones within a second symbol of the set of time-frequency resources, the first symbol and the second symbol being consecutive. In some cases, each frequency tone of the first set is separated in frequency from each frequency tone of the second set by at least one frequency tone of the set of frequency tones. In some cases, the reference signals used for positioning are assigned to a first set of frequency tones within a first symbol of the set of time-frequency resources and to a second set of frequency tones within a second symbol of the set of time-frequency resources, the first symbol and the second symbol being consecutive. In some cases, each frequency tone of the first set is separated in frequency from each frequency tone of the second set by at least one frequency tone of the set of frequency tones.

The mapper 1115 may map the reference signals to a subset of the set of time-frequency resources based on the pattern. In some examples, the mapper 1115 may map the set of reference signals to a subset of the set of time-frequency resources based on at least partially repeating the pattern across the set of symbols. In some examples, the mapper 1115 may map the reference signals used for positioning to the subset of the set of time-frequency resources based on partially repeating the pattern across the set of symbols. The reference signal manager 1120 may transmit the reference signals via the subset of the set of time-frequency resources. In some examples, the reference signal manager 1120 may receive a set of reference signals used for positioning via a subset of a set of time-frequency resources, where the set of time-frequency resources includes a set of symbols and a set of frequency tones. In some examples, the reference signal manager 1120 may transmit the set of reference signals via the subset of the set of time-frequency resources.

In some examples, receiving a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols. In some cases, the reference signals used for positioning include PRSs, CSI-RSs, TRSs, SRSs, or PRACH signals. In some cases, the first set of frequency tones and the second set of frequency tones are uniformly spaced in frequency in the first symbol and the second symbol respectively based on a value of a comb level configured for the set of reference signals. In some cases, the first symbol and the second symbol are physically consecutive and consecutive in the pattern or the first symbol and the second symbol are consecutive in the pattern. In some cases, the reference signals used for positioning include PRSs, CSI-RSs, TRSs, SRSs, or PRACH signals.

The decoder 1140 may decode the reference signals. In some examples, the decoder 1140 may decode the set of reference signals. The positioning manager 1145 may estimate a location of the receiving device based on the decoded reference signals. In some examples, the positioning manager 1145 may estimate a location of the receiving device based on the decoded reference signals. The comb level manager 1125 may identify a comb level configured for transmitting the reference signals. In some examples, the comb level manager 1125 may determine that the value of the comb level is closer to a closest higher power of two than to a closest lower power of two. In some examples, the comb level manager 1125 may determine that the value of the comb level is closer to a closest lower power of two than to a closest higher power of two. In some examples, the comb level manager 1125 may identify a comb level configured for the set of reference signals.

In some examples, the comb level manager 1125 may determine that the value of the comb level is closer to a closest higher power of two than to a closest lower power of two. In some examples, the comb level manager 1125 may determine that the value of the comb level is closer to a closest lower power of two than to a closest higher power of two. In some examples, the comb level manager 1125 may identify a comb level configured for transmitting the reference signals. In some examples, the comb level manager 1125 may identify a comb level configured for the set of reference signals. The offset sequence manager 1130 may determine a sequence of offsets for the pattern based on the comb level, where each offset in the sequence is used to assign a reference signal to a frequency tone within a symbol. In some examples, determining binary representations of each number in a sequence of numbers from zero to one less than a value of the comb level, where each binary representation includes a same number of bits.

In some examples, the offset sequence manager 1130 may reverse the binary representation of each number in the sequence of numbers. In some examples, the offset sequence manager 1130 may determine a decimal value corresponding to each reversed binary representation, where each decimal value is included in a sequence of decimal values that corresponds to the sequence of numbers from zero to one less than the comb level. In some examples, the offset sequence manager 1130 may determine the sequence of offsets to be equal to the sequence of decimal values. In some examples, the offset sequence manager 1130 may identify a circular buffer including a sequence of numbers from zero to one less than a value of the comb level. In some examples, the offset sequence manager 1130 may select a first value from the circular buffer to include as a first value in the sequence of offsets. In some examples, the offset sequence manager 1130 may perform a floor or ceiling operation on half of a size of the circular buffer.

In some examples, the offset sequence manager 1130 may add a result of the floor or ceiling operation performed on half of the size of the circular buffer to the first value selected from the circular buffer to identify a second value from the circular buffer to include as a second value in the sequence of offsets. In some examples, the offset sequence manager 1130 may recursively segment the circular buffer into segmented circular buffers and performing a floor or ceiling operation on half of a size of each segmented circular buffer to identify a next value from the circular buffer to include as a next value in the sequence of offsets until a size of each segmented circular buffer is equal to one. In some examples, the offset sequence manager 1130 may include remaining values in the circular buffer as remaining values in the sequence of offsets. In some examples, the offset sequence manager 1130 may interchange between floor operations and ceiling operations in the recursion.

In some examples, the offset sequence manager 1130 may round a value of the comb level up or down to a power of two. In some examples, determining binary representations of each number in a sequence of numbers from zero to one less than the rounded value, where each binary representation includes a same number of bits. In some examples, the offset sequence manager 1130 may determine the sequence of offsets to include a subset of the sequence of decimal values that are below the value of the comb level or include the sequence of decimal values and other decimal values that are below the value of the comb level and are excluded from the sequence of decimal values. In some examples, the offset sequence manager 1130 may round the value of the comb level up to the closest higher power of two. In some examples, the offset sequence manager 1130 may round the value of the comb level down to the closest lower power of two.

In some examples, the offset sequence manager 1130 may index the sequence of offsets using the identified counter value. In some examples, the offset sequence manager 1130 may determine an offset for assigning a reference signal to frequency tones in a symbol based on the indexing. In some examples, the offset sequence manager 1130 may determine that the sequence of offsets includes one value. In some examples, the offset sequence manager 1130 may determine a sequence of offsets for the pattern based on the comb level, where each offset in the sequence is used to assign a reference signal to a frequency tone within a symbol. In some examples, determining binary representations of each number in a sequence of numbers from zero to one less than a value of the comb level, where each binary representation includes a same number of bits. In some examples, the offset sequence manager 1130 may reverse the binary representation of each number in the sequence of numbers.

In some examples, the offset sequence manager 1130 may determine a decimal value corresponding to each reversed binary representation, where each decimal value is included in a sequence of decimal values that corresponds to the sequence of numbers from zero to one less than the comb level. In some examples, the offset sequence manager 1130 may determine the sequence of offsets to be equal to the sequence of decimal values. In some examples, the offset sequence manager 1130 may identify a circular buffer including a sequence of numbers from zero to one less than a value of the comb level. In some examples, the offset sequence manager 1130 may select a first value from the circular buffer to include as a first value in the sequence of offsets. In some examples, the offset sequence manager 1130 may perform a floor or ceiling operation on half of a size of the circular buffer.

In some examples, the offset sequence manager 1130 may add a result of the floor or ceiling operation performed on half of the size of the circular buffer to the first value selected from the circular buffer to identify a second value from the circular buffer to include as a second value in the sequence of offsets. In some examples, the offset sequence manager 1130 may recursively segment the circular buffer into segmented circular buffers and performing a floor or ceiling operation on half of a size of each segmented circular buffer to identify a next value from the circular buffer to include as a next value in the sequence of offsets until a size of each segmented circular buffer is equal to one. In some examples, the offset sequence manager 1130 may include remaining values in the circular buffer as remaining values in the sequence of offsets. In some examples, the offset sequence manager 1130 may interchange between floor operations and ceiling operations in the recursion.

In some examples, the offset sequence manager 1130 may round a value of the comb level up or down to a power of two. In some examples, determining binary representations of each number in a sequence of numbers from zero to one less than the rounded value, where each binary representation includes a same number of bits. In some examples, the offset sequence manager 1130 may determine the sequence of offsets to include a subset of the sequence of decimal values that are below the value of the comb level or include the sequence of decimal values and other decimal values that are below the value of the comb level and are excluded from the sequence of decimal values. In some examples, the offset sequence manager 1130 may round the value of the comb level up to the closest higher power of two. In some examples, the offset sequence manager 1130 may round the value of the comb level down to the closest lower power of two.

In some examples, the offset sequence manager 1130 may index the sequence of offsets using the identified counter value. In some examples, the offset sequence manager 1130 may determine an offset for assigning a reference signal to frequency tones in a symbol based on the indexing. In some examples, the offset sequence manager 1130 may determine that the sequence of offsets includes one value. In some examples, the offset sequence manager 1130 may determine a sequence of offsets for the pattern based on the comb level, where each offset in the sequence is used to assign a reference signal to a frequency tone within a symbol. In some cases, each offset in the sequence of offsets indicates an offset from a reference resource and indicates a location of a resource element on which to transmit a reference signal in the set of time-frequency resources.

In some cases, each offset in the sequence of offsets indicates an offset from a reference resource and indicates a location of a resource element that includes a reference signal in the set of time-frequency resources. The counter manager 1135 may identify a value of a counter used for identifying offset values from the sequence of offsets. In some examples, the counter manager 1135 may identify a value of a counter used for identifying offset values from the sequence of offsets. In some cases, the counter is associated with a resource used to transmit the reference signals used for positioning, the counter is associated with a resource set used to transmit the reference signals used for positioning, the counter is associated with a resource configuration or setting used to transmit the reference signals used for positioning, the counter is associated with the transmitting device, or the counter is a shared counter associated with all resource sets used to transmit the reference signals used for positioning.

In some cases, the counter is associated with a resource used to transmit reference signals used for positioning and the counter is reset after every slot. In some cases, the counter is associated with the resource used to transmit reference signals used for positioning and the counter is reset after every resource occasion. In some cases, the counter is associated with the resource used to transmit reference signals used for positioning and the counter is reset after every frame. In some cases, the counter is associated with the resource used to transmit reference signals used for positioning and the counter is reset when the resource is reconfigured. In some cases, the counter is associated with a resource set used to transmit reference signals used for positioning and the counter is reset when the resource set is reconfigured. In some cases, the counter is associated with a resource configuration or setting used to transmit reference signals used for positioning and the counter is reset when the resource configuration or setting is reconfigured. In some cases, the counter is associated with a report configuration or setting and the counter is reset when the report configuration or setting is reconfigured.

In some cases, the counter is associated with a resource on which the receiving device receives at least a subset of the set of reference signals used for positioning, the counter is associated with a resource set including resources on which the receiving device receives at least a subset of the set of reference signals used for positioning, the counter is associated with a resource configuration or setting used to receive at least a subset of the set of reference signals used for positioning, the counter is associated with the receiving device, or the counter is a shared counter associated with all resource sets including resources on which the receiving device receives at least a subset of the set of reference signals used for positioning.

In some cases, the counter is associated with a resource used to transmit reference signals used for positioning and the counter is reset after every slot. In some cases, the counter is associated with the resource used to transmit reference signals used for positioning and the counter is reset after every resource occasion. In some cases, the counter is associated with the resource used to transmit reference signals used for positioning and the counter is reset after every frame. In some cases, the counter is associated with the resource used to transmit reference signals used for positioning and the counter is reset when the resource is reconfigured. In some cases, the counter is associated with a resource set used to transmit reference signals used for positioning and the counter is reset when the resource set is reconfigured. In some cases, the counter is associated with a resource configuration or setting used to transmit reference signals used for positioning and the counter is reset when the resource configuration or setting is reconfigured; or. In some cases, the counter is associated with a report configuration or setting and the counter is reset when the report configuration or setting is reconfigured.

Figure 12:
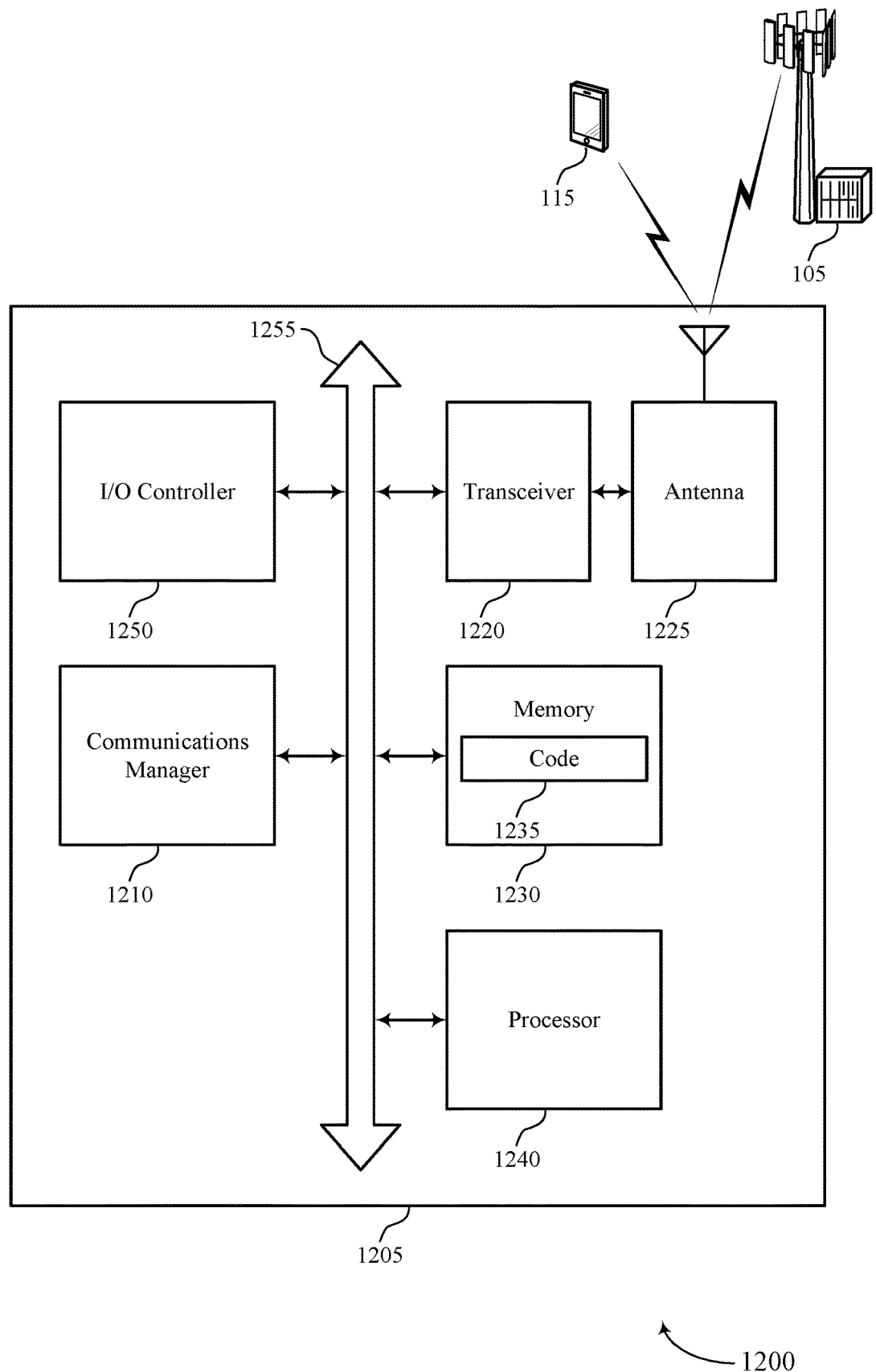
FIG. 12 shows a diagram of a system including a user equipment (UE) that supports patterns for reference signals used for positioning in a wireless communications system in accordance with aspects of the present disclosure.

FIG. 12 shows a diagram of a system 1200 including a device 1205 that supports patterns for reference signals used for positioning in a wireless communications system in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, a transceiver 1220, an antenna 1225, memory 1230, a processor 1240, and an I/O controller 1250. These components may be in electronic communication via one or more buses (e.g., bus 1255).

The communications manager 1210 may determine a pattern for a set of time-frequency resources that includes a set of symbols and a set of frequency tones, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, map the reference signals to a subset of the set of time-frequency resources based on the pattern, and transmit the reference signals via the subset of the set of time-frequency resources.

The communications manager 1210 may also receive a set of reference signals used for positioning via a subset of a set of time-frequency resources, where the set of time-frequency resources includes a set of symbols and a set of frequency tones, identify the set of reference signals based on a pattern for the set of time-frequency resources, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, decode the reference signals, and estimate a location of the receiving device based on the decoded reference signals.

The communications manager 1210 may also determine a pattern for a set of time-frequency resources that includes a set of symbols and a set of frequency tones, where the pattern includes an assignment of a set of reference signals used for positioning to frequency tones for a subset of the set of symbols, map the set of reference signals to a subset of the set of time-frequency resources based on at least partially repeating the pattern across the set of symbols, and transmit the set of reference signals via the subset of the set of time-frequency resources.

The communications manager 1210 may also receive a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols, identify the set of reference signals based on at least partially repeating the pattern across the set of symbols, decode the set of reference signals, and estimate a location of the receiving device based on the decoded reference signals.

Transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or any combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting patterns for reference signals used for positioning in a wireless communications system).

The I/O controller 1250 may manage input and output signals for the device 1205. The I/O controller 1250 may also manage peripherals not integrated into the device 1205. In some cases, the I/O controller 1250 may represent a physical connection or port to an external peripheral. In some cases, the I/O controller 1250 may utilize an operating system such as iOS®, ANDROID®, MS-DOS®, MS-WINDOWS®, OS/2®, UNIX®, LINUX®, or another known operating system. In other cases, the I/O controller 1250 may represent or interact with a modem, a keyboard, a mouse, a touchscreen, or a similar device. In some cases, the I/O controller 1250 may be implemented as part of a processor. In some cases, a user may interact with the device 1205 via the I/O controller 1250 or via hardware components controlled by the I/O controller 1250.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
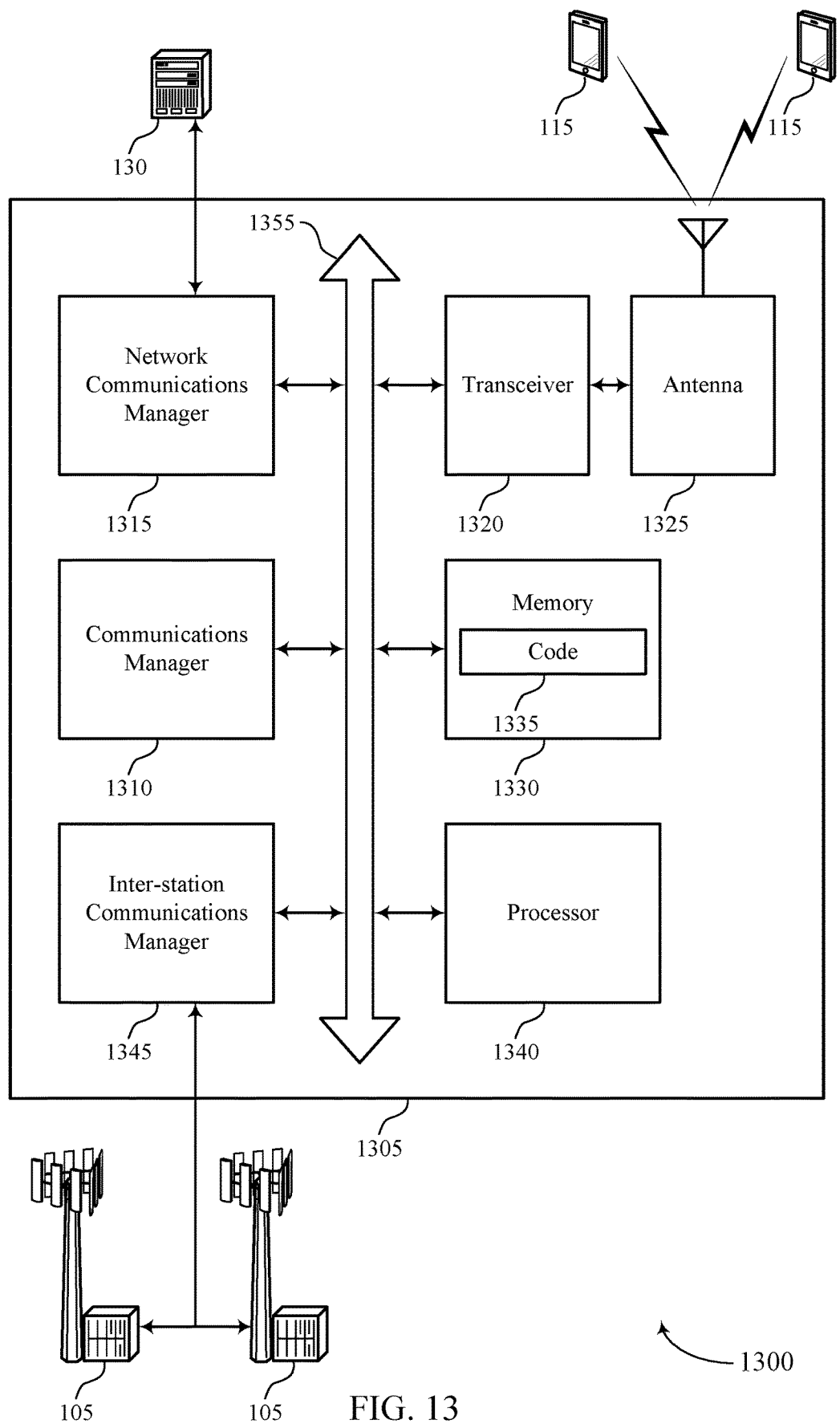
FIG. 13 shows a diagram of a system including a base station that supports patterns for reference signals used for positioning in a wireless communications system in accordance with aspects of the present disclosure.

FIG. 13 shows a diagram of a system 1300 including a device 1305 that supports patterns for reference signals used for positioning in a wireless communications system in accordance with aspects of the present disclosure. The device 1305 may be an example of or include the components of device 905, device 1005, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1355).

The communications manager 1310 may determine a pattern for a set of time-frequency resources that includes a set of symbols and a set of frequency tones, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, map the reference signals to a subset of the set of time-frequency resources based on the pattern, and transmit the reference signals via the subset of the set of time-frequency resources.

The communications manager 1310 may also receive a set of reference signals used for positioning via a subset of a set of time-frequency resources, where the set of time-frequency resources includes a set of symbols and a set of frequency tones, identify the set of reference signals based on a pattern for the set of time-frequency resources, where the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones, decode the reference signals, and estimate a location of the receiving device based on the decoded reference signals.

The communications manager 1310 may also determine a pattern for a set of time-frequency resources that includes a set of symbols and a set of frequency tones, where the pattern includes an assignment of a set of reference signals used for positioning to frequency tones for a subset of the set of symbols, map the set of reference signals to a subset of the set of time-frequency resources based on at least partially repeating the pattern across the set of symbols, and transmit the set of reference signals via the subset of the set of time-frequency resources.

The communications manager 1310 may also receive a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols, identify the set of reference signals based on at least partially repeating the pattern across the set of symbols, decode the set of reference signals, and estimate a location of the receiving device based on the decoded reference signals.

Network communications manager 1315 may manage communications with the core network (e.g., via one or more wired backhaul links). For example, the network communications manager 1315 may manage the transfer of data communications for client devices, such as one or more UEs 115.

Transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or any combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting patterns for reference signals used for positioning in a wireless communications system).

Inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
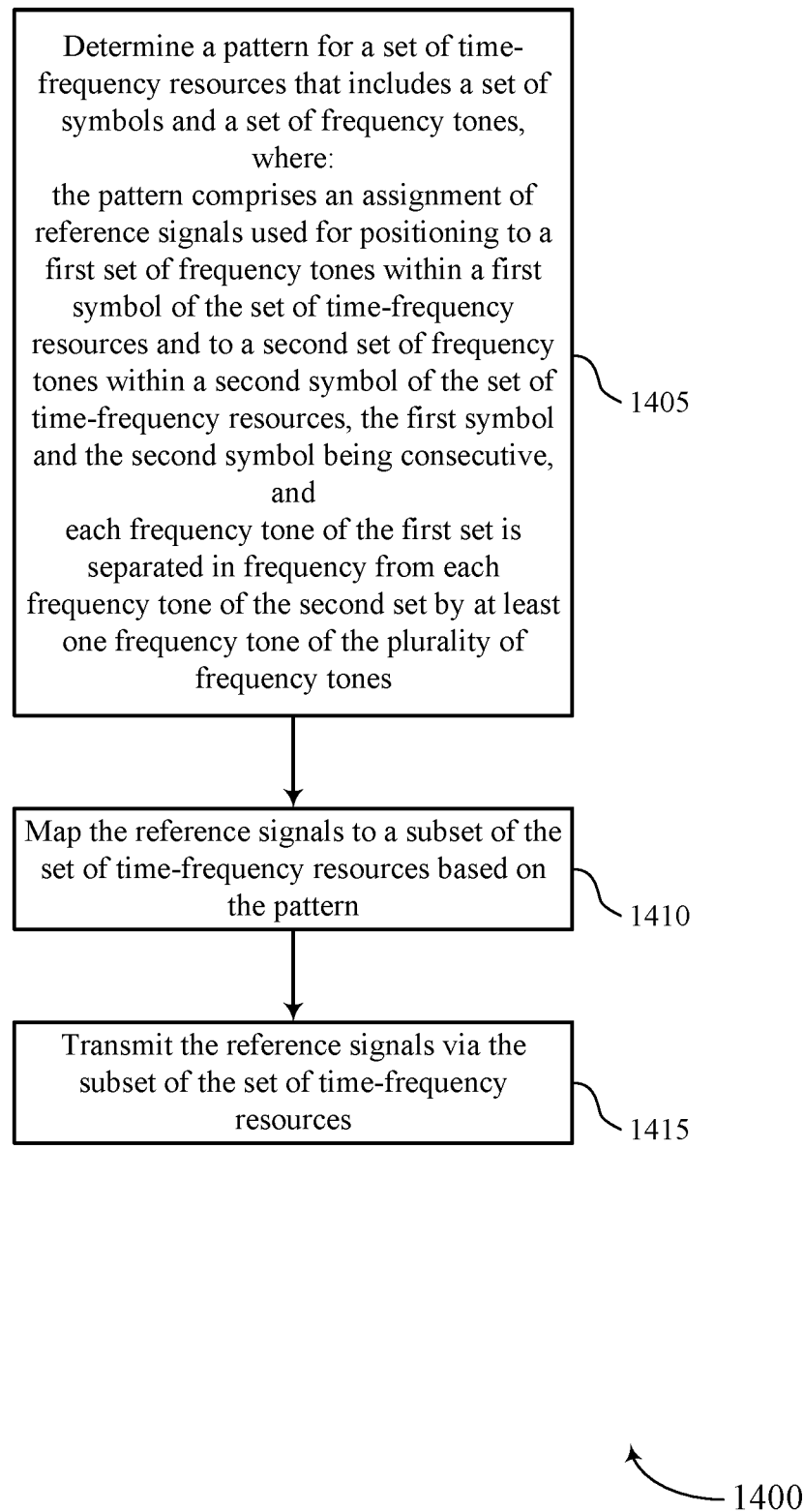
FIGS. 14 through 17 show flowcharts illustrating methods that support patterns for reference signals used for positioning in a wireless communications system in accordance with aspects of the present disclosure.

FIG. 14 shows a flowchart illustrating a method 1400 that supports patterns for reference signals used for positioning in a wireless communications system in accordance with aspects of the present disclosure. The operations of method 1400 may be implemented by a UE 115 or base station 105 or its components as described herein. For example, the operations of method 1400 may be performed by a communications manager as described with reference to FIGS. 9 through 13. In some examples, a UE or base station may execute a set of instructions to control the functional elements of the UE or base station to perform the functions described below. Additionally, or alternatively, a UE or base station may perform aspects of the functions described below using special-purpose hardware.

At 1405, the UE or base station may determine a pattern for a set of time-frequency resources that includes a set of symbols and a set of frequency tones, where. The operations of 1405 may be performed according to the methods described herein. In some examples, aspects of the operations of 1405 may be performed by a reference signal pattern manager as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1410, the UE or base station may map the reference signals to a subset of the set of time-frequency resources based on the pattern. The operations of 1410 may be performed according to the methods described herein. In some examples, aspects of the operations of 1410 may be performed by a mapper as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1415, the UE or base station may transmit the reference signals via the subset of the set of time-frequency resources. The operations of 1415 may be performed according to the methods described herein. In some examples, aspects of the operations of 1415 may be performed by a reference signal manager as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

Figure 15:
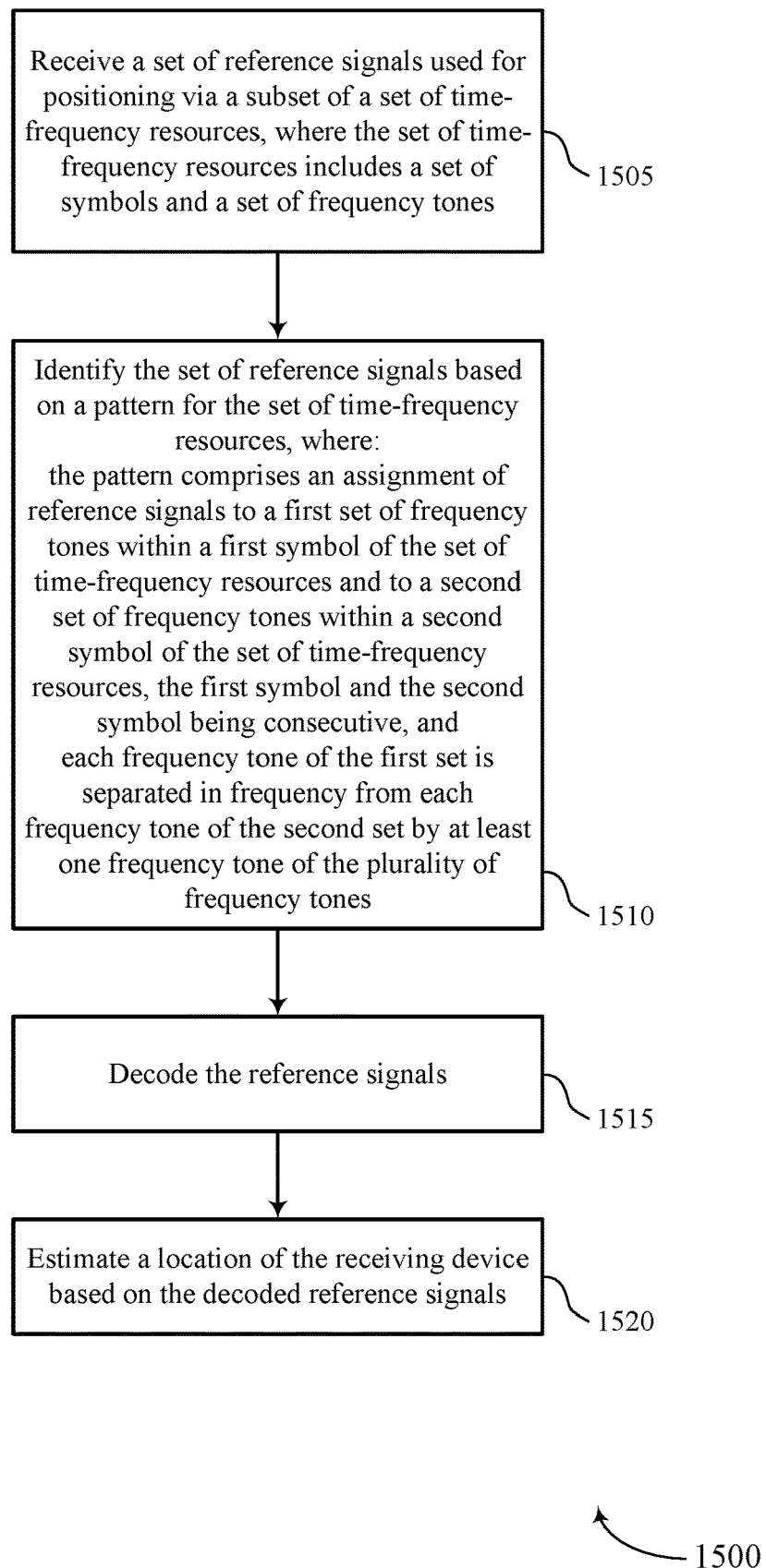

FIG. 15 shows a flowchart illustrating a method 1500 that supports patterns for reference signals used for positioning in a wireless communications system in accordance with aspects of the present disclosure. The operations of method 1500 may be implemented by a UE 115 or base station 105 or its components as described herein. For example, the operations of method 1500 may be performed by a communications manager as described with reference to FIGS. 9 through 13. In some examples, a UE or base station may execute a set of instructions to control the functional elements of the UE or base station to perform the functions described below. Additionally, or alternatively, a UE or base station may perform aspects of the functions described below using special-purpose hardware.

At 1505, the UE or base station may receive a set of reference signals used for positioning via a subset of a set of time-frequency resources, where the set of time-frequency resources includes a set of symbols and a set of frequency tones. The operations of 1505 may be performed according to the methods described herein. In some examples, aspects of the operations of 1505 may be performed by a reference signal manager as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1510, the UE or base station may identify the set of reference signals based on a pattern for the set of time-frequency resources, where. The operations of 1510 may be performed according to the methods described herein. In some examples, aspects of the operations of 1510 may be performed by a reference signal pattern manager as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1515, the UE or base station may decode the reference signals. The operations of 1515 may be performed according to the methods described herein. In some examples, aspects of the operations of 1515 may be performed by a decoder as described with reference to FIGS. 9 through 13. Additionally, or alternatively, means for performing 1405 may, but not necessarily, include, for example, antenna 1225, transceiver 1220, communications manager 1210, memory 1230

(including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1520, the UE or base station may estimate a location of the receiving device based on the decoded reference signals. The operations of 1520 may be performed according to the methods described herein. In some examples, aspects of the operations of 1520 may be performed by a positioning manager as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

Figure 16:
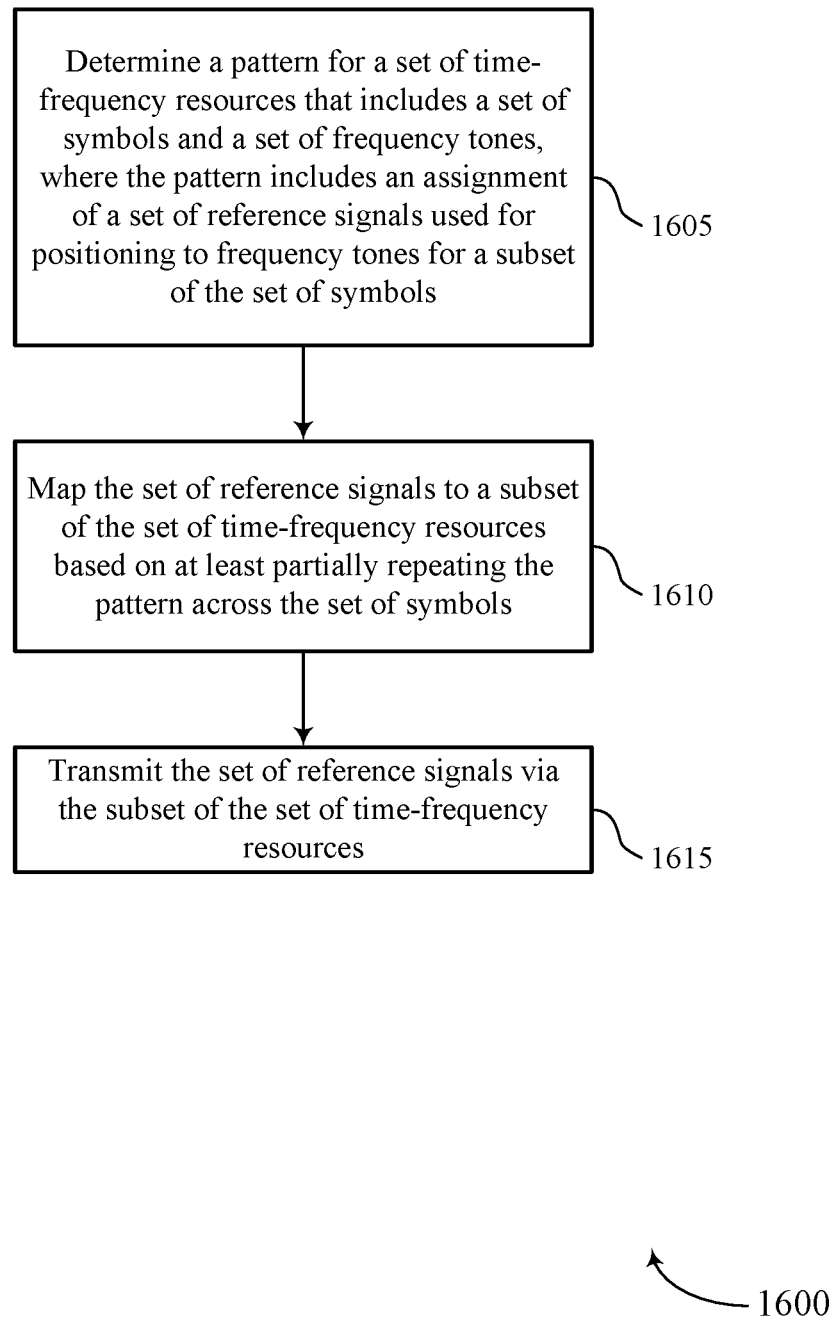

FIG. 16 shows a flowchart illustrating a method 1600 that supports patterns for reference signals used for positioning in a wireless communications system in accordance with aspects of the present disclosure. The operations of method 1600 may be implemented by a UE 115 or base station 105 or its components as described herein. For example, the operations of method 1600 may be performed by a communications manager as described with reference to FIGS. 9 through 13. In some examples, a UE or base station may execute a set of instructions to control the functional elements of the UE or base station to perform the functions described below. Additionally, or alternatively, a UE or base station may perform aspects of the functions described below using special-purpose hardware.

At 1605, the UE or base station may determine a pattern for a set of time-frequency resources that includes a set of symbols and a set of frequency tones, where the pattern includes an assignment of a set of reference signals used for positioning to frequency tones for a subset of the set of symbols. The operations of 1605 may be performed according to the methods described herein. In some examples, aspects of the operations of 1605 may be performed by a reference signal pattern manager as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1610, the UE or base station may map the set of reference signals to a subset of the set of time-frequency resources based on at least partially repeating the pattern across the set of symbols. The operations of 1610 may be performed according to the methods described herein. In some examples, aspects of the operations of 1610 may be performed by a mapper as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1615, the UE or base station may transmit the set of reference signals via the subset of the set of time-frequency resources. The operations of 1615 may be performed according to the methods described herein. In some examples, aspects of the operations of 1615 may be performed by a reference signal manager as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

Figure 17:
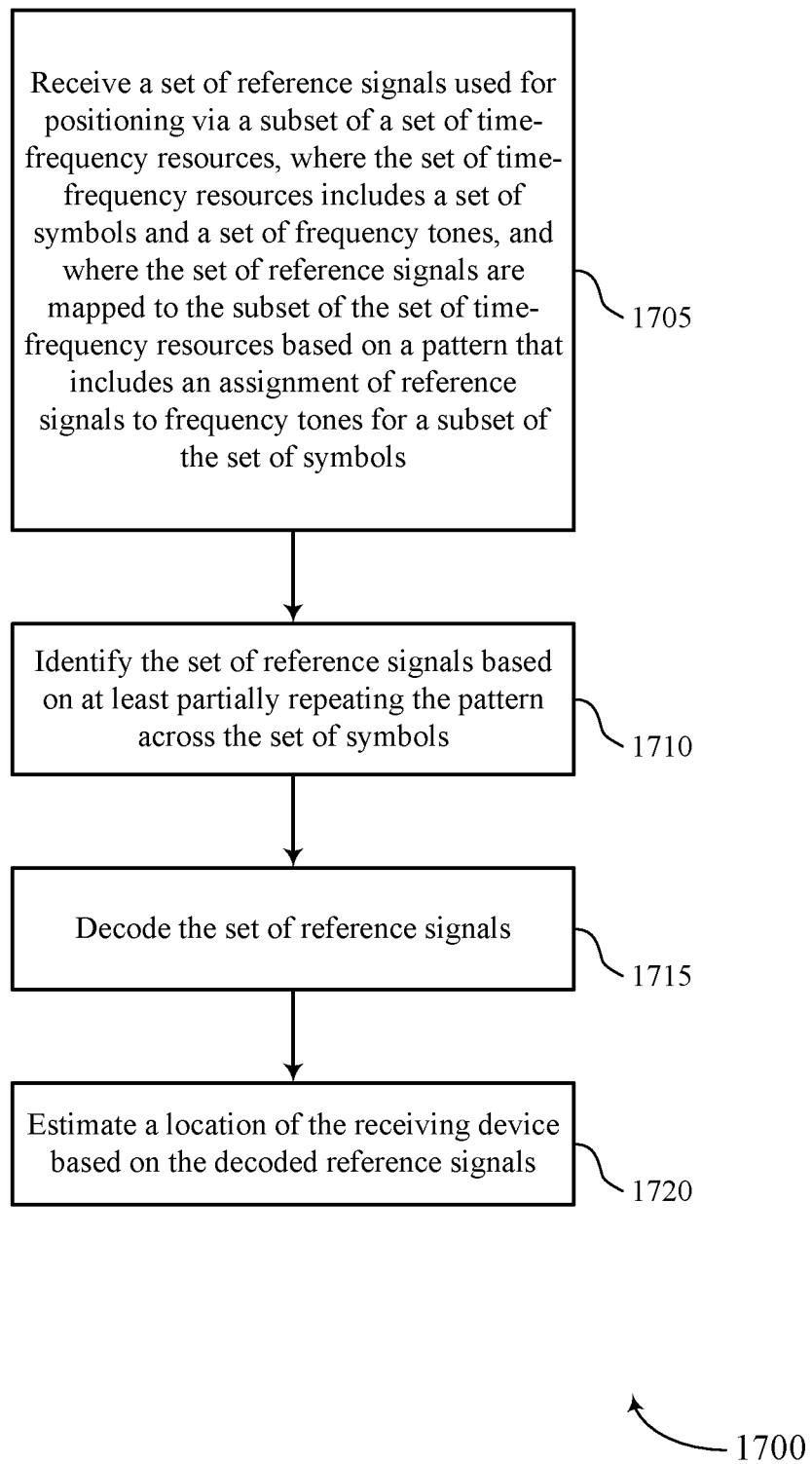

FIG. 17 shows a flowchart illustrating a method 1700 that supports patterns for reference signals used for positioning in a wireless communications system in accordance with aspects of the present disclosure. The operations of method 1700 may be implemented by a UE 115 or base station 105 or its components as described herein. For example, the operations of method 1700 may be performed by a communications manager as described with reference to FIGS. 9 through 13. In some examples, a UE or base station may execute a set of instructions to control the functional elements of the UE or base station to perform the functions described below. Additionally, or alternatively, a UE or base station may perform aspects of the functions described below using special-purpose hardware.

At 1705, the UE or base station may receive a set of reference signals used for positioning via a subset of a set of time-frequency resources, where the set of time-frequency resources includes a set of symbols and a set of frequency tones, and where the set of reference signals are mapped to the subset of the set of time-frequency resources based on a pattern that includes an assignment of reference signals to frequency tones for a subset of the set of symbols. The operations of 1705 may be performed according to the methods described herein. In some examples, aspects of the operations of 1705 may be performed by a reference signal manager as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1710, the UE or base station may identify the set of reference signals based on at least partially repeating the pattern across the set of symbols. The operations of 1710 may be performed according to the methods described herein. In some examples, aspects of the operations of 1710 may be performed by a reference signal pattern manager as described with reference to FIGS. 9 through 13. Additionally, or alternatively, means for performing 1405 may, but not necessarily, include, for example, antenna 1225, transceiver 1220, communications manager 1210, memory 1230

(including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1715, the UE or base station may decode the set of reference signals. The operations of 1715 may be performed according to the methods described herein. In some examples, aspects of the operations of 1715 may be performed by a decoder as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

At 1720, the UE or base station may estimate a location of the receiving device based on the decoded reference signals. The operations of 1720 may be performed according to the methods described herein. In some examples, aspects of the operations of 1720 may be performed by a positioning manager as described with reference to FIGS. 9 through 13. Additionally, or alternatively, means for performing 1405 may, but not necessarily, include, for example, antenna 1225, transceiver 1220, communications manager 1210, memory 1230 (including code 1235), processor 1240 and/or bus 1255. Additionally, or alternatively, means for performing 1405 may, but not necessarily, include, for example, antenna 1325, transceiver 1320, communications manager 1310, memory 1330 (including code 1335), processor 1340, inter-station communications manager 1345, and/or bus 1355.

It should be noted that the methods described herein describe possible implementations, and that the operations and the steps may be rearranged or otherwise modified and that other implementations are possible. Further, aspects from two or more of the methods may be combined.

Example 1: A method for wireless communication at a transmitting device, comprising: determining a pattern for a set of time-frequency resources that includes a plurality of symbols and a plurality of frequency tones, wherein: the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones; mapping the reference signals to a subset of the set of time-frequency resources based at least in part on the pattern; and transmitting the reference signals via the subset of the set of time-frequency resources.

Example 2: The method of example 1, wherein determining the pattern comprises: identifying a comb level configured for transmitting the reference signals; determining a sequence of offsets for the pattern based at least in part on the comb level, wherein each offset in the sequence is used to assign a reference signal to a frequency tone within a symbol; and determining the pattern based at least in part on the sequence of offsets.

Example 3: The method of example 2, wherein determining the sequence of offsets comprises: determining binary representations of each number in a sequence of numbers from zero to one less than a value of the comb level, wherein each binary representation comprises a same number of bits; reversing the binary representation of each number in the sequence of numbers; determining a decimal value corresponding to each reversed binary representation, wherein each decimal value is included in a sequence of decimal values that corresponds to the sequence of numbers from zero to one less than the comb level; and determining the sequence of offsets to be equal to the sequence of decimal values.

Example 4: The method of example 2 or 3, wherein determining the sequence of offsets comprises: identifying a circular buffer comprising a sequence of numbers from zero to one less than a value of the comb level; selecting a first value from the circular buffer to include as a first value in the sequence of offsets; performing a floor or ceiling operation on half of a size of the circular buffer; adding a result of the floor or ceiling operation performed on half of the size of the circular buffer to the first value selected from the circular buffer to identify a second value from the circular buffer to include as a second value in the sequence of offsets; recursively segmenting the circular buffer into segmented circular buffers and performing a floor or ceiling operation on half of a size of each segmented circular buffer to identify a next value from the circular buffer to include as a next value in the sequence of offsets until a size of each segmented circular buffer is equal to one; and including remaining values in the circular buffer as remaining values in the sequence of offsets.

Example 5: The method of example 4, wherein recursively performing the floor or ceiling operation comprises: interchanging between floor operations and ceiling operations in the recursion.

Example 6: The method of any of examples 2 to 5, wherein determining the sequence of offsets comprises: rounding a value of the comb level up or down to a power of two; determining binary representations of each number in a sequence of numbers from zero to one less than the rounded value, wherein each binary representation comprises a same number of bits; reversing the binary representation of each number in the sequence of numbers; determining a decimal value corresponding to each reversed binary representation, wherein each decimal value is included in a sequence of decimal values that corresponds to the sequence of numbers from zero to one less than the comb level; and determining the sequence of offsets to include a subset of the sequence of decimal values that are below the value of the comb level or include the sequence of decimal values and other decimal values that are below the value of the comb level and are excluded from the sequence of decimal values.

Example 7: The method of example 6, wherein rounding the value of the comb level up or down to the power of two comprises: determining that the value of the comb level is closer to a closest higher power of two than to a closest lower power of two; and rounding the value of the comb level up to the closest higher power of two.

Example 8: The method of example 6, wherein rounding the value of the comb level up or down to the power of two comprises: determining that the value of the comb level is closer to a closest lower power of two than to a closest higher power of two; and rounding the value of the comb level down to the closest lower power of two.

Example 9: The method of any of examples 2 to 8, further comprising: identifying a value of a counter used for identifying offset values from the sequence of offsets; indexing the sequence of offsets using the identified counter value; and determining an offset for assigning a reference signal to frequency tones in a symbol based at least in part on the indexing.

Example 10: The method of example 9, wherein the counter is associated with a resource used to transmit the reference signals used for positioning, the counter is associated with a resource set used to transmit the reference signals used for positioning, the counter is associated with a resource configuration or setting used to transmit the reference signals used for positioning, the counter is associated with the transmitting device, or the counter is a shared counter associated with all resource sets used to transmit the reference signals used for positioning.

Example 11: The method of example 9, wherein: the counter is associated with a resource used to transmit reference signals used for positioning and the counter is reset after every slot; the counter is associated with the resource used to transmit reference signals used for positioning and the counter is reset after every resource occasion; the counter is associated with the resource used to transmit reference signals used for positioning and the counter is reset after every frame; the counter is associated with the resource used to transmit reference signals used for positioning and the counter is reset when the resource is reconfigured; the counter is associated with a resource set used to transmit reference signals used for positioning and the counter is reset when the resource set is reconfigured; the counter is associated with a resource configuration or setting used to transmit reference signals used for positioning and the counter is reset when the resource configuration or setting is reconfigured; or the counter is associated with a report configuration or setting and the counter is reset when the report configuration or setting is reconfigured.

Example 12: The method of any of examples 2 to 11, wherein each offset in the sequence of offsets indicates an offset from a reference resource and indicates a location of a resource element on which to transmit a reference signal in the set of time-frequency resources.

Example 13: The method of any of examples 1 to 12, wherein determining the pattern comprises: determining the pattern based at least in part on referencing a look-up table with a comb level configured for transmitting the reference signals.

Example 14: The method of example 13, wherein the pattern is determined based at least in part on any of a set of sequences of offsets in the look-up table including: at least {0, 2, 1, 3} for a configured comb level of four, at least {0, 3, 1, 4, 2, 5} for a configured comb level of six, at least {0, 4, 2, 6, 1, 5, 3, 7} for a configured comb level of eight, or at least {0, 8, 4, 12, 2, 10, 6, 14, 1, 9, 5, 13, 3, 11, 7, 15} for a configured comb level of 16.

Example 15: The method of any of examples 1 to 14, wherein the transmitting device is a user equipment (UE), and determining the pattern comprises: receiving, from a base station, an indication of a sequence of offsets used to determine the pattern.

Example 16: The method of example 15, wherein receiving the indication of the pattern comprises: determining that the sequence of offsets includes one value; and determining to use a default pattern to assign the reference signals used for positioning to the set of time-frequency resources based at least in part on determining that the sequence of offsets includes one value.

Example 17: The method of any of examples 1 to 16, wherein a value of a comb level configured for transmitting the reference signals is greater than four, and frequency tones to which reference signals are assigned in all groups of two consecutive symbols in the set of time-frequency resources are non-adjacent.

Example 18. The method of any of examples 1 to 17, wherein the first set of frequency tones and the second set of frequency tones are uniformly spaced in frequency in the first symbol and the second symbol respectively based on a value of a comb level configured for transmitting the reference signals.

Example 19: The method of any of examples 1 to 18, wherein the first symbol and the second symbol are physically consecutive and consecutive in the pattern or the first symbol and the second symbol are consecutive in the pattern.

Example 20: The method of any of examples 1 to 19, wherein determining the pattern comprises: determining whether the set of time-frequency resources is protected from puncturing, preemption, rate-matching, dropping, or de-prioritization to facilitate transmissions on other physical channels; and determining the pattern based at least in part on whether the set of time-frequency resources is protected.

Example 21: The method of any of examples 1 to 20, wherein the reference signals used for positioning comprise positioning reference signals (PRSs), channel state information reference signals (CSI-RSs), tracking reference signals (TRSs), sounding reference signals (SRSs), or physical random access channel (PRACH) signals.

Example 22: The method of any of examples 1 to 21, wherein mapping the reference signals used for positioning to the subset of the set of time-frequency resources based at least in part on the pattern comprises: mapping the reference signals used for positioning to the subset of the set of time-frequency resources based at least in part on partially repeating the pattern across the plurality of symbols.

Example 23: A method for wireless communication at a receiving device, comprising: receiving a set of reference signals used for positioning via a subset of a set of time-frequency resources, wherein the set of time-frequency resources includes a plurality of symbols and a plurality of frequency tones; identifying the set of reference signals based at least in part on a pattern for the set of time-frequency resources, wherein: the pattern comprises an assignment of reference signals to a first set of frequency tones within a first symbol of the set of time-frequency resources and to a second set of frequency tones within a second symbol of the set of time-frequency resources, the first symbol and the second symbol being consecutive, and each frequency tone of the first set is separated in frequency from each frequency tone of the second set by at least one frequency tone of the plurality of frequency tones; decoding the reference signals; and estimating a location of the receiving device based at least in part on the decoded reference signals.

Example 24: The method of example 23, further comprising: identifying a comb level configured for the set of reference signals; determining a sequence of offsets for the pattern based at least in part on the comb level, wherein each offset in the sequence is used to assign a reference signal to a frequency tone within a symbol; and determining the pattern based at least in part on the sequence of offsets.

Example 25: The method of example 24, wherein determining the sequence of offsets comprises: determining binary representations of each number in a sequence of numbers from zero to one less than a value of the comb level, wherein each binary representation comprises a same number of bits; reversing the binary representation of each number in the sequence of numbers; determining a decimal value corresponding to each reversed binary representation, wherein each decimal value is included in a sequence of decimal values that corresponds to the sequence of numbers from zero to one less than the comb level; and determining the sequence of offsets to be equal to the sequence of decimal values.

Example 26: The method of example 24, wherein determining the sequence of offsets comprises: identifying a circular buffer comprising a sequence of numbers from zero to one less than a value of the comb level; selecting a first value from the circular buffer to include as a first value in the sequence of offsets; performing a floor or ceiling operation on half of a size of the circular buffer; adding a result of the floor or ceiling operation performed on half of the size of the circular buffer to the first value selected from the circular buffer to identify a second value from the circular buffer to include as a second value in the sequence of offsets; recursively segmenting the circular buffer into segmented circular buffers and performing a floor or ceiling operation on half of a size of each segmented circular buffer to identify a next value from the circular buffer to include as a next value in the sequence of offsets until a size of each segmented circular buffer is equal to one; and including remaining values in the circular buffer as remaining values in the sequence of offsets.

Example 27: The method of example 26, wherein recursively performing the floor or ceiling operation comprises: interchanging between floor operations and ceiling operations in the recursion.

Example 28: The method of any of examples 24 to 27, wherein determining the sequence of offsets comprises: rounding a value of the comb level up or down to a power of two; determining binary representations of each number in a sequence of numbers from zero to one less than the rounded value, wherein each binary representation comprises a same number of bits; reversing the binary representation of each number in the sequence of numbers; determining a decimal value corresponding to each reversed binary representation, wherein each decimal value is included in a sequence of decimal values that corresponds to the sequence of numbers from zero to one less than the comb level; and determining the sequence of offsets to include a subset of the sequence of decimal values that are below the value of the comb level or include the sequence of decimal values and other decimal values that are below the value of the comb level and are excluded from the sequence of decimal values.

Example 29: The method of example 28, wherein rounding the value of the comb level up or down to the power of two comprises: determining that the value of the comb level is closer to a closest higher power of two than to a closest lower power of two; and rounding the value of the comb level up to the closest higher power of two.

Example 30: The method of example 28, wherein rounding the value of the comb level up or down to the power of two comprises: determining that the value of the comb level is closer to a closest lower power of two than to a closest higher power of two; and rounding the value of the comb level down to the closest lower power of two.

Example 31: The method of any of examples 24 to 30, further comprising: identifying a value of a counter used for identifying offset values from the sequence of offsets; indexing the sequence of offsets using the identified counter value; and determining an offset for assigning a reference signal to frequency tones in a symbol based at least in part on the indexing.

Example 32: The method of example 31, wherein the counter is associated with a resource on which the receiving device receives at least a subset of the set of reference signals used for positioning, the counter is associated with a resource set including resources on which the receiving device receives at least a subset of the set of reference signals used for positioning, the counter is associated with a resource configuration or setting used to receive at least a subset of the set of reference signals used for positioning, the counter is associated with the receiving device, or the counter is a shared counter associated with all resource sets including resources on which the receiving device receives at least a subset of the set of reference signals used for positioning.

Example 33: The method of example 31, wherein: the counter is associated with a resource used to transmit reference signals used for positioning and the counter is reset after every slot; the counter is associated with the resource used to transmit reference signals used for positioning and the counter is reset after every resource occasion; the counter is associated with the resource used to transmit reference signals used for positioning and the counter is reset after every frame; the counter is associated with the resource used to transmit reference signals used for positioning and the counter is reset when the resource is reconfigured; the counter is associated with a resource set used to transmit reference signals used for positioning and the counter is reset when the resource set is reconfigured; the counter is associated with a resource configuration or setting used to transmit reference signals used for positioning and the counter is reset when the resource configuration or setting is reconfigured; or the counter is associated with a report configuration or setting and the counter is reset when the report configuration or setting is reconfigured.

Example 34: The method of any of examples 24 to 33, wherein each offset in the sequence of offsets indicates an offset from a reference resource and indicates a location of a resource element that includes a reference signal in the set of time-frequency resources.

Example 35: The method of any of examples 23 to 34, further comprising: determining the pattern based at least in part on referencing a look-up table with a comb level configured for the set of reference signals.

Example 36: The method of example 35, wherein the pattern is determined based at least in part on any of a set of sequences of offsets in the look-up table including: at least {0, 2, 1, 3} for a configured comb level of four, at least {0, 3, 1, 4, 2, 5} for a configured comb level of six, at least {0, 4, 2, 6, 1, 5, 3, 7} for a configured comb level of eight, or at least {0, 8, 4, 12, 2, 10, 6, 14, 1, 9, 5, 13, 3, 11, 7, 15} for a configured comb level of 16.

Example 37: The method of any of examples 23 to 36, wherein the receiving device is a user equipment (UE), and determining the pattern comprises: receiving, from a base station, an indication of a sequence of offsets used to determine the pattern.

Example 38: The method of example 37, wherein receiving the indication of the sequence of offsets used to determine the pattern comprises: determining that the sequence of offsets includes one value; and determining to use a default pattern to assign the reference signals used for positioning to the set of time-frequency resources based at least in part on determining that the sequence of offsets includes one value.

Example 39: The method of any of examples 23 to 38, wherein a value of a comb level configured for transmitting the reference signals is greater than four, and frequency tones to which reference signals are assigned in all groups of two consecutive symbols in the set of time-frequency resources are non-adjacent.

Example 40: The method of any of examples 23 to 39, wherein the first set of frequency tones and the second set of frequency tones are uniformly spaced in frequency in the first symbol and the second symbol respectively based on a value of a comb level configured for the set of reference signals.

Example 41: The method of any of examples 23 to 40, wherein the first symbol and the second symbol are physically consecutive and consecutive in the pattern or the first symbol and the second symbol are consecutive in the pattern.

Example 42: The method of any of examples 23 to 41, further comprising: determining whether the set of time-frequency resources is protected from puncturing, preemption, rate-matching, dropping, or de-prioritization to facilitate transmissions on other physical channels; and determining the pattern based at least in part on whether the set of time-frequency resources is protected.

Example 43: The method of any of examples 23 to 42, wherein the reference signals used for positioning comprise positioning reference signals (PRSs), channel state information reference signals (CSI-RSs), tracking reference signals (TRSs), sounding reference signals (SRSs), or physical random access channel (PRACH) signals.

Example 44: The method of any of examples 23 to 43, wherein identifying the set of reference signals comprises: identifying the set of reference signals based at least in part on partially repeating the pattern across the plurality of symbols.

Example 45: A method for wireless communication at a transmitting device, comprising: determining a pattern for a set of time-frequency resources that includes a plurality of symbols and a plurality of frequency tones, wherein the pattern comprises an assignment of a set of reference signals used for positioning to frequency tones for a subset of the plurality of symbols; mapping the set of reference signals to a subset of the set of time-frequency resources based at least in part on at least partially repeating the pattern across the plurality of symbols; and transmitting the set of reference signals via the subset of the set of time-frequency resources.

Example 46: The method of example 45, wherein: the reference signals used for positioning are assigned to a first set of frequency tones within a first symbol of the set of time-frequency resources and to a second set of frequency tones within a second symbol of the set of time-frequency resources, the first symbol and the second symbol being consecutive; and each frequency tone of the first set is separated in frequency from each frequency tone of the second set by at least one frequency tone of the plurality of frequency tones.

Example 47: The method of example 46, wherein determining the pattern comprises: identifying a comb level configured for transmitting the reference signals; determining a sequence of offsets for the pattern based at least in part on the comb level, wherein each offset in the sequence is used to assign a reference signal to a frequency tone within a symbol; and determining the pattern based at least in part on the sequence of offsets.

Example 48: A method for wireless communication at a receiving device, comprising: receiving a set of reference signals used for positioning via a subset of a set of time-frequency resources, wherein the set of time-frequency resources includes a plurality of symbols and a plurality of frequency tones, and wherein the set of reference signals are mapped to the subset of the set of time-frequency resources based at least in part on a pattern that comprises an assignment of reference signals to frequency tones for a subset of the plurality of symbols; identifying the set of reference signals based at least in part on at least partially repeating the pattern across the plurality of symbols; decoding the set of reference signals; and estimating a location of the receiving device based at least in part on the decoded reference signals.

Example 49: The method of example 48, wherein: the reference signals used for positioning are assigned to a first set of frequency tones within a first symbol of the set of time-frequency resources and to a second set of frequency tones within a second symbol of the set of time-frequency resources, the first symbol and the second symbol being consecutive; and each frequency tone of the first set is separated in frequency from each frequency tone of the second set by at least one frequency tone of the plurality of frequency tones.

Example 50: The method of example 49, further comprising: identifying a comb level configured for the set of reference signals; determining a sequence of offsets for the pattern based at least in part on the comb level, wherein each offset in the sequence is used to assign a reference signal to a frequency tone within a symbol; and determining the pattern based at least in part on the sequence of offsets.

Example 51: An apparatus comprising at least one means for performing a method of any of examples 1 to 22.

Example 52: An apparatus comprising at least one means for performing a method of any of examples 23 to 44.

Example 53: An apparatus comprising at least one means for performing a method of any of examples 45 to 47.

Example 54: An apparatus comprising at least one means for performing a method of any of examples 48 to 50.

Example 55: An apparatus for wireless communications comprising a processor; memory in electronic communication with the processor; and instructions stored in the memory and executable by the processor to cause the apparatus to perform a method of any of examples 1 to 22.

Example 56: An apparatus for wireless communications comprising a processor; memory in electronic communication with the processor; and instructions stored in the memory and executable by the processor to cause the apparatus to perform a method of any of examples 23 to 44.

Example 57: An apparatus for wireless communications comprising a processor; memory in electronic communication with the processor; and instructions stored in the memory and executable by the processor to cause the apparatus to perform a method of any of examples 45 to 47.

Example 58: An apparatus for wireless communications comprising a processor; memory in electronic communication with the processor; and instructions stored in the memory and executable by the processor to cause the apparatus to perform a method of any of examples 48 to 50.

Example 59: A non-transitory computer-readable medium storing code for wireless communications, the code comprising instructions executable by a processor to perform a method of any of examples 1 to 22.

Example 60: A non-transitory computer-readable medium storing code for wireless communications, the code comprising instructions executable by a processor to perform a method of any of examples 23 to 44.

Example 61: A non-transitory computer-readable medium storing code for wireless communications, the code comprising instructions executable by a processor to perform a method of any of examples 45 to 47.

Example 62: A non-transitory computer-readable medium storing code for wireless communications, the code comprising instructions executable by a processor to perform a method of any of examples 48 to 50.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a transmitting device, comprising:
    determining a pattern for a set of time-frequency resources that includes a plurality of symbols and a plurality of frequency tones, wherein:
        the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive;
        each frequency tone of the first set is separated in frequency from each frequency tone of the second set by at least one frequency tone of the plurality of frequency tones; and
        the pattern is based at least in part on any of a set of sequences of offsets including: {0, 2, 1, 3} for a comb level of four, {0, 3, 1, 4, 2, 5} for a comb level of six, {0, 4, 2, 6, 1, 5, 3, 7} for a comb level of eight, or {0, 8, 4, 12, 2, 10, 6, 14, 1, 9, 5, 13, 3, 11, 7, 15} for a comb level of 16;
    mapping the reference signals to a subset of the set of time-frequency resources based at least in part on the pattern; and
    transmitting the reference signals via the subset of the set of time-frequency resources.

2. The method of claim 1, wherein determining the pattern comprises:
    identifying a configured comb level for transmitting the reference signals;
    determining a sequence of offsets for the pattern from the set of sequences of offsets based at least in part on the configured comb level, wherein each offset in the sequence is used to assign a reference signal to a frequency tone within a symbol; and
    determining the pattern based at least in part on the sequence of offsets.

3. The method of claim 2, wherein determining the sequence of offsets comprises:
    determining binary representations of each number in a sequence of numbers from zero to one less than a value of the configured comb level, wherein each binary representation comprises a same number of bits;
    reversing the binary representation of each number in the sequence of numbers;
    determining a decimal value corresponding to each reversed binary representation, wherein each decimal value is included in a sequence of decimal values that corresponds to the sequence of numbers from zero to one less than the configured comb level; and
    determining the sequence of offsets to be equal to the sequence of decimal values.

4. The method of claim 2, wherein determining the sequence of offsets comprises:
    identifying a circular buffer comprising a sequence of numbers from zero to one less than a value of the configured comb level;
    selecting a first value from the circular buffer to include as a first value in the sequence of offsets;
    performing a floor or ceiling operation on half of a size of the circular buffer;
    adding a result of the floor or ceiling operation performed on half of the size of the circular buffer to the first value selected from the circular buffer to identify a second value from the circular buffer to include as a second value in the sequence of offsets;
    recursively segmenting the circular buffer into segmented circular buffers and performing a floor or ceiling operation on half of a size of each segmented circular buffer to identify a next value from the circular buffer to include as a next value in the sequence of offsets until the size of each segmented circular buffer is equal to one; and
    including remaining values in the circular buffer as remaining values in the sequence of offsets.

5. The method of claim 4, wherein recursively performing the floor or ceiling operation comprises:
    interchanging between floor operations and ceiling operations in the recursion.

6. The method of claim 2, wherein determining the sequence of offsets comprises:
rounding a value of the configured comb level up or down to a power of two;
determining binary representations of each number in a sequence of numbers from zero to one less than the rounded value, wherein each binary representation comprises a same number of bits;
reversing the binary representation of each number in the sequence of numbers;
determining a decimal value corresponding to each reversed binary representation, wherein each decimal value is included in a sequence of decimal values that corresponds to the sequence of numbers from zero to one less than the configured comb level; and
determining the sequence of offsets to include a subset of the sequence of decimal values that are below the value of the configured comb level or include the sequence of decimal values and other decimal values that are below the value of the configured comb level and are excluded from the sequence of decimal values.

7. The method of claim 6, wherein rounding the value of the configured comb level up or down to the power of two comprises:
determining that the value of the configured comb level is closer to a closest higher power of two than to a closest lower power of two; and
rounding the value of the configured comb level up to the closest higher power of two.

8. The method of claim 6, wherein rounding the value of the configured comb level up or down to the power of two comprises:
determining that the value of the configured comb level is closer to a closest lower power of two than to a closest higher power of two; and
rounding the value of the configured comb level down to the closest lower power of two.

9. The method of claim 2, further comprising:
identifying a value of a counter used for identifying offset values from the sequence of offsets;
indexing the sequence of offsets using the identified counter value; and
determining an offset for assigning a reference signal to frequency tones in a symbol based at least in part on the indexing.

10. The method of claim 9, wherein the counter is associated with a resource used to transmit the reference signals used for positioning, the counter is associated with a resource set used to transmit the reference signals used for positioning, the counter is associated with a resource configuration or setting used to transmit the reference signals used for positioning, the counter is associated with the transmitting device, or the counter is a shared counter associated with all resource sets used to transmit the reference signals used for positioning.

11. The method of claim 9, wherein:
the counter is associated with a resource used to transmit the reference signals used for positioning and the counter is reset after every slot;
the counter is associated with the resource used to transmit the reference signals used for positioning and the counter is reset after every resource occasion;
the counter is associated with the resource used to transmit the reference signals used for positioning and the counter is associated with the resource used to transmit the reference signals used for positioning and the counter is reset when the resource is reconfigured;
the counter is associated with a resource set used to transmit the reference signals used for positioning and the counter is reset when the resource set is reconfigured;
the counter is associated with a resource configuration or setting used to transmit the reference signals used for positioning and the counter is reset when the resource configuration or setting is reconfigured; or; and
the counter is associated with a report configuration or setting and the counter is reset when the report configuration or setting is reconfigured.

12. The method of claim 1, wherein determining the pattern comprises:
determining the pattern based at least in part on referencing a look-up table, the referencing based at least in part on a configured comb level for transmitting the reference signals.

13. The method of claim 1, wherein the transmitting device is a user equipment (UE), and determining the pattern comprises:
receiving, from a base station, an indication of a sequence of offsets used to determine the pattern.

14. The method of claim 1, wherein a value of a configured comb level for transmitting the reference signals is greater than four, and frequency tones to which the reference signals are assigned in all groups of two consecutive symbols in the set of time-frequency resources are non-adjacent.

15. The method of claim 1, wherein the reference signals used for positioning comprise positioning reference signals (PRSs), channel state information reference signals (CSI-RSs), tracking reference signals (TRSs), sounding reference signals (SRSs), or physical random access channel (PRACH) signals.

16. The method of claim 1, wherein the first symbol is a first orthogonal frequency division multiplexed (OFDM) symbol or a first discrete Fourier transform spread OFDM (DFT-s-OFDM) symbol, and wherein the second symbol is a second OFDM symbol or a second DFT-s-OFDM symbol.

17. A method for wireless communication at a receiving device, comprising:
receiving a set of reference signals used for positioning via a subset of a set of time-frequency resources, wherein the set of time-frequency resources includes a plurality of symbols and a plurality of frequency tones;
identifying the set of reference signals based at least in part on a pattern for the set of time-frequency resources, wherein:
the pattern comprises an assignment of reference signals to a first set of frequency tones within a first symbol of the set of time-frequency resources and to a second set of frequency tones within a second symbol of the set of time-frequency resources, the first symbol and the second symbol being consecutive;
each frequency tone of the first set is separated in frequency from each frequency tone of the second set by at least one frequency tone of the plurality of frequency tones; and
the pattern is based at least in part on any of a set of sequences of offsets including: {0, 2, 1, 3} for a comb level of four, {0, 3, 1, 4, 2, 5} for a comb level of six, {0, 4, 2, 6, 1, 5, 3, 7} for a comb level of eight, or {0, 8, 4, 12, 2, 10, 6, 14, 1, 9, 5, 13, 3, 11, 7, 15} for a comb level of 16;

decoding the reference signals; and
estimating a location of the receiving device based at least in part on the decoded reference signals.

18. The method of claim 17, further comprising:
identifying a configured comb level for the set of reference signals;
determining a sequence of offsets for the pattern from the set of sequences of offsets based at least in part on the configured comb level, wherein each offset in the sequence is used to assign a reference signal to a frequency tone within a symbol; and
determining the pattern based at least in part on the sequence of offsets.

19. The method of claim 18, wherein determining the sequence of offsets comprises:
determining binary representations of each number in a sequence of numbers from zero to one less than a value of the configured comb level, wherein each binary representation comprises a same number of bits;
reversing the binary representation of each number in the sequence of numbers;
determining a decimal value corresponding to each reversed binary representation, wherein each decimal value is included in a sequence of decimal values that corresponds to the sequence of numbers from zero to one less than the configured comb level; and
determining the sequence of offsets to be equal to the sequence of decimal values.

20. The method of claim 18, wherein determining the sequence of offsets comprises:
identifying a circular buffer comprising a sequence of numbers from zero to one less than a value of the configured comb level;
selecting a first value from the circular buffer to include as a first value in the sequence of offsets;
performing a floor or ceiling operation on half of a size of the circular buffer;
adding a result of the floor or ceiling operation performed on half of the size of the circular buffer to the first value selected from the circular buffer to identify a second value from the circular buffer to include as a second value in the sequence of offsets;
recursively segmenting the circular buffer into segmented circular buffers and performing a floor or ceiling operation on half of a size of each segmented circular buffer to identify a next value from the circular buffer to include as a next value in the sequence of offsets until the size of each segmented circular buffer is equal to one; and
including remaining values in the circular buffer as remaining values in the sequence of offsets.

21. The method of claim 18, further comprising:
identifying a value of a counter used for identifying offset values from the sequence of offsets;
indexing the sequence of offsets using the identified counter value; and
determining an offset for assigning a reference signal to frequency tones in a symbol based at least in part on the indexing.

22. The method of claim 18, wherein each offset in the sequence of offsets indicates an offset from a reference resource and indicates a location of a resource element that includes a reference signal in the set of time-frequency resources.

23. The method of claim 17, further comprising:
determining the pattern based at least in part on referencing a look-up table, the referencing based at least in part on a configured comb level for the set of reference signals.

24. The method of claim 17, wherein a value of a configured comb level for transmitting the reference signals is greater than four, and frequency tones to which reference signals are assigned in all groups of two consecutive symbols in the set of time-frequency resources are non-adjacent.

25. The method of claim 17, wherein the first symbol is a first orthogonal frequency division multiplexed (OFDM) symbol or a first discrete Fourier transform spread OFDM (DFT-s-OFDM) symbol and the second symbol is a second OFDM symbol or a second DFT-s-OFDM symbol.

26. An apparatus for wireless communication at a transmitting device, comprising:
one or more transceivers,
one or more memory, and
one or more processors electronically coupled to the one or more memory and the one or more transceivers, the one or more processors configured to:
determine a pattern for a set of time-frequency resources that includes a plurality of symbols and a plurality of frequency tones, wherein:
the pattern comprises an assignment of reference signals used for positioning to a first set of frequency tones within a first symbol of the set of time-frequency resources and to a second set of frequency tones within a second symbol of the set of time-frequency resources, the first symbol and the second symbol being consecutive;
each frequency tone of the first set is separated in frequency from each frequency tone of the second set by at least one frequency tone of the plurality of frequency tones; and
the pattern is based at least in part on any of a set of sequences of offsets including: {0, 2, 1, 3} for a comb level of four, {0, 3, 1, 4, 2, 5} for a comb level of six, {0, 4, 2, 6, 1, 5, 3, 7} for a comb level of eight, or {0, 8, 4, 12, 2, 10, 6, 14, 1, 9, 5, 13, 3, 11, 7, 15} for a comb level of 16;
map the reference signals to a subset of the set of time-frequency resources based at least in part on the pattern; and
transmit, via the one or more transceivers, the reference signals via the subset of the set of time-frequency resources.

27. The apparatus of claim 26, wherein the one or more processors are configured to determine the pattern based at least in part on:
identifying a configured comb level for transmitting the reference signals;
determining a sequence of offsets for the pattern from the set of sequences of offsets based at least in part on the configured comb level, wherein each offset in the sequence for assigning a reference signal to a frequency tone within a symbol; and
determining the pattern based at least in part on the sequence of offsets.

28. The apparatus of claim 26, wherein the first symbol is a first orthogonal frequency division multiplexed (OFDM) symbol or a first discrete Fourier transform spread OFDM (DFT-s-OFDM) symbol and the second symbol is a second OFDM symbol or a second DFT-s-OFDM symbol.

29. An apparatus for wireless communication at a receiving device, comprising:

one or more transceivers, one or more memory, and one or more processors electronically coupled to the one or more memory and the one or more transceivers, the one or more processors configured to:

receive, via the one or more transceivers, a set of reference signals used for positioning via a subset of a set of time-frequency resources, wherein the set of time-frequency resources includes a plurality of symbols and a plurality of frequency tones;

identify the set of reference signals based at least in part on a pattern for the set of time-frequency resources, wherein:

the pattern comprises an assignment of reference signals to a first set of frequency tones within a first symbol of the set of time-frequency resources and to a second set of frequency tones within a second symbol of the set of time-frequency resources, the first symbol and the second symbol being consecutive;

each frequency tone of the first set is separated in frequency from each frequency tone of the second set by at least one frequency tone of the plurality of frequency tones; and the pattern is based at least in part on any of a set of sequences of offsets including: {0, 2, 1, 3} for a comb level of four, {0, 3, 1, 4, 2, 5} for a comb level of six, {0, 4, 2, 6, 1, 5, 3, 7} for a comb level of eight, or {0, 8, 4, 12, 2, 10, 6, 14, 1, 9, 5, 13, 3, 11, 7, 15} for a comb level of 16;

decode the reference signals; and estimate a location of the receiving device based at least in part on the decoded reference signals.

30. The apparatus of claim 29, wherein the one or more processors are further configured to:

identify a configured comb level for the set of reference signals;

determine a sequence of offsets for the pattern from the set of sequences of offsets based at least in part on the configured comb level, wherein each offset in the sequence is used to assign a reference signal to a frequency tone within a symbol; and determine the pattern based at least in part on the sequence of offsets.

\* \* \* \* \*